(12) United States Patent
Shevchenko et al.

(10) Patent No.: US 11,620,566 B1
(45) Date of Patent: Apr. 4, 2023

(54) ARTIFICIAL INTELLIGENCE COMMUNICATION ASSISTANCE FOR IMPROVING THE EFFECTIVENESS OF COMMUNICATIONS USING REACTION DATA

(71) Applicant: Grammarly, Inc., San Francisco, CA (US)

(72) Inventors: Oleksiy Shevchenko, West Vancouver (CA); Ayan Mandal, Oakdale, CA (US); Bradley Jon Hoover, San Francisco, CA (US); Joel Tetreault, New York, NY (US); Maksym Lytvyn, West Vancouver (CA); Dmytro Lider, Kyiv (UA)

(73) Assignee: GRAMMARLY, INC., San Francsico, CA (US)

( * ) Notice: Subject to any disclaimer, the term of this patent is extended or adjusted under 35 U.S.C. 154(b) by 1134 days.

(21) Appl. No.: 16/055,031

(22) Filed: Aug. 4, 2018

Related U.S. Application Data

(60) Provisional application No. 62/541,203, filed on Aug. 4, 2017.

(51) Int. Cl.
| | |
|---|---|
| *G06N 20/00* | (2019.01) |
| *G06F 17/18* | (2006.01) |
| *H04L 67/306* | (2022.01) |
| *G06K 9/62* | (2022.01) |
| *G06V 40/20* | (2022.01) |

(52) U.S. Cl.
CPC ............ *G06N 20/00* (2019.01); *G06F 17/18* (2013.01); *G06K 9/6256* (2013.01); *G06V 40/20* (2022.01); *H04L 67/306* (2013.01)

(58) Field of Classification Search
CPC ......... G06N 20/00; G06F 17/18; G06F 15/16; G06K 9/6256; G06K 9/00335; H04L 67/306; H04L 51/16; H04L 51/04; H04L 51/23; G06Q 10/107; G06Q 10/109; G06Q 10/10; G06V 40/20
See application file for complete search history.

(56) References Cited

U.S. PATENT DOCUMENTS

| | | | |
|---|---|---|---|
| 6,047,277 A | 4/2000 | Parry et al. | |
| 6,477,239 B1 | 11/2002 | Ohki et al. | |
| 7,529,804 B1 | 5/2009 | Lu et al. | |
| 8,095,613 B1 * | 1/2012 | Perkowitz | G06Q 10/109 |
| | | | 709/206 |
| 8,898,098 B1 | 11/2014 | Luechtefeld | |
| 9,471,564 B1 | 10/2016 | Flores et al. | |
| 10,594,757 B1 | 3/2020 | Shevchenko et al. | |

(Continued)

FOREIGN PATENT DOCUMENTS

WO 2008052239 A1 5/2008

OTHER PUBLICATIONS

U.S. Appl. No. 16/782,850, filed Feb. 5, 2020, Pending.

(Continued)

*Primary Examiner* — Jungwon Chang
(74) *Attorney, Agent, or Firm* — GTC Law Group PC & Affiliates

(57) ABSTRACT

In embodiments of the present invention improved capabilities are described for an artificial intelligence communication assistant improving the effectiveness of communications with user reaction data.

20 Claims, 27 Drawing Sheets

(56) References Cited

U.S. PATENT DOCUMENTS

| | | |
|---|---|---|
| 10,764,534 B1 | 9/2020 | Shevchenko et al. |
| 10,771,529 B1 | 9/2020 | Shevchenko et al. |
| 10,922,483 B1 | 2/2021 | Shevchenko et al. |
| 11,032,229 B2 | 6/2021 | Nesbitt |
| 11,146,609 B1 | 10/2021 | Shevchenko et al. |
| 11,228,731 B1 | 1/2022 | Shevchenko et al. |
| 11,258,734 B1 | 2/2022 | Shevchenko et al. |
| 11,321,522 B1 | 5/2022 | Shevchenko et al. |
| 11,463,500 B1 | 10/2022 | Shevchenko et al. |
| 2002/0032591 A1 | 3/2002 | Mahaffy et al. |
| 2002/0158850 A1 | 10/2002 | Sun |
| 2004/0001090 A1* | 1/2004 | Brown ............... G06Q 10/107 715/752 |
| 2005/0002503 A1 | 1/2005 | Owens et al. |
| 2006/0053001 A1 | 3/2006 | Brockett et al. |
| 2007/0213076 A1 | 9/2007 | Mian et al. |
| 2007/0213077 A1 | 9/2007 | Mian et al. |
| 2007/0233787 A1 | 10/2007 | Pagan |
| 2008/0134282 A1 | 6/2008 | Fridman et al. |
| 2009/0198488 A1 | 8/2009 | Vigen |
| 2009/0271486 A1 | 10/2009 | Ligh et al. |
| 2010/0036917 A1 | 2/2010 | Mccaffrey et al. |
| 2010/0082751 A1* | 4/2010 | Meijer ............... G06F 15/16 709/206 |
| 2010/0223341 A1 | 9/2010 | Manolescu et al. |
| 2010/0280828 A1* | 11/2010 | Fein ............... G10L 15/26 704/246 |
| 2012/0036147 A1 | 2/2012 | Borst et al. |
| 2012/0271627 A1 | 10/2012 | Danielyan et al. |
| 2012/0290299 A1 | 11/2012 | Basson et al. |
| 2013/0091551 A1 | 4/2013 | Rajakarunanayake et al. |
| 2013/0185051 A1 | 7/2013 | Buryak et al. |
| 2013/0297216 A1 | 11/2013 | Hirst et al. |
| 2013/0305169 A1 | 11/2013 | Gold |
| 2014/0074952 A1 | 3/2014 | White et al. |
| 2014/0095151 A1 | 4/2014 | Sakamoto et al. |
| 2014/0163957 A1 | 6/2014 | Tesch et al. |
| 2014/0280316 A1 | 9/2014 | Ganick et al. |
| 2014/0280659 A1 | 9/2014 | Siram et al. |
| 2014/0337438 A1 | 11/2014 | Govande et al. |
| 2015/0039295 A1 | 2/2015 | Soschen |
| 2015/0058242 A1 | 2/2015 | Bucciarelli |
| 2015/0172242 A1 | 6/2015 | Goncalves |
| 2015/0242391 A1 | 8/2015 | Goel et al. |
| 2015/0278196 A1 | 10/2015 | Dua et al. |
| 2015/0286943 A1 | 10/2015 | Wang et al. |
| 2016/0105386 A1 | 4/2016 | Anders et al. |
| 2016/0110422 A1 | 4/2016 | Roytman et al. |
| 2016/0119274 A1 | 4/2016 | Ghafourifar et al. |
| 2016/0173428 A1 | 6/2016 | Balasubramanian et al. |
| 2016/0217140 A1 | 7/2016 | Delaney et al. |
| 2016/0224803 A1 | 8/2016 | Frank et al. |
| 2016/0283860 A1 | 9/2016 | Pycock et al. |
| 2016/0294746 A1 | 10/2016 | Boothroyd et al. |
| 2016/0294755 A1 | 10/2016 | Prabhu |
| 2016/0300252 A1 | 10/2016 | Frank et al. |
| 2016/0306792 A1 | 10/2016 | Flores et al. |
| 2016/0314408 A1 | 10/2016 | Gulwani et al. |
| 2016/0342583 A1 | 11/2016 | Cunico et al. |
| 2016/0381533 A1 | 12/2016 | Fogelson |
| 2017/0032377 A1 | 2/2017 | Navaratnam |
| 2017/0061966 A1 | 3/2017 | Marcheret et al. |
| 2017/0109340 A1 | 4/2017 | Chen et al. |
| 2017/0124064 A1 | 5/2017 | Lu et al. |
| 2017/0140260 A1 | 5/2017 | Manning et al. |
| 2017/0140563 A1 | 5/2017 | No et al. |
| 2017/0142211 A1 | 5/2017 | Shaw |
| 2017/0147202 A1 | 5/2017 | Donohue |
| 2017/0147682 A1 | 5/2017 | Alaqeeli et al. |
| 2017/0154030 A1 | 6/2017 | Moorjani et al. |
| 2017/0180294 A1 | 6/2017 | Milligan et al. |
| 2017/0206545 A1 | 7/2017 | Gupta et al. |
| 2017/0249291 A1 | 8/2017 | Patel |
| 2017/0257329 A1 | 9/2017 | Tetreault et al. |
| 2017/0289069 A1 | 10/2017 | Plumb et al. |
| 2017/0351330 A1 | 12/2017 | Gordon et al. |
| 2018/0006979 A1 | 1/2018 | Barsness et al. |
| 2018/0012231 A1 | 1/2018 | Sapoznik et al. |
| 2018/0020078 A1 | 1/2018 | Laufenberg et al. |
| 2018/0032576 A1 | 2/2018 | Romero |
| 2018/0032610 A1 | 2/2018 | Cameron et al. |
| 2018/0063262 A1 | 3/2018 | Balasubramanian et al. |
| 2018/0083901 A1 | 3/2018 | Mcgregor et al. |
| 2018/0101776 A1* | 4/2018 | Osotio ............... G06F 16/258 |
| 2018/0109482 A1 | 4/2018 | Deluca et al. |
| 2018/0129651 A1 | 5/2018 | Latvala et al. |
| 2018/0130372 A1 | 5/2018 | Vinkers et al. |
| 2018/0181854 A1* | 6/2018 | Koukoumidis ........ G06N 20/00 |
| 2018/0189017 A1 | 7/2018 | Ghafourifar et al. |
| 2018/0210874 A1* | 7/2018 | Fuxman ............... G06F 40/35 |
| 2018/0219822 A1 | 8/2018 | Bikumala et al. |
| 2018/0226070 A1 | 8/2018 | Gorzela et al. |
| 2018/0254914 A1 | 9/2018 | Bastide et al. |
| 2018/0302362 A1* | 10/2018 | Abedini ............... H04L 51/20 |
| 2018/0302363 A1 | 10/2018 | Abedini et al. |
| 2018/0357306 A1 | 12/2018 | Osotio et al. |
| 2018/0375807 A1 | 12/2018 | Krans et al. |
| 2019/0005406 A1 | 1/2019 | Malevich et al. |
| 2019/0007356 A1 | 1/2019 | Loi et al. |
| 2019/0026601 A1 | 1/2019 | Packalen et al. |
| 2019/0057297 A1 | 2/2019 | Barri et al. |
| 2019/0114569 A1 | 4/2019 | Palmer et al. |
| 2019/0297042 A1 | 9/2019 | Prabhu |
| 2019/0379614 A1* | 12/2019 | Cosentino ............... G06F 40/35 |
| 2019/0394147 A1 | 12/2019 | Rodriguez et al. |
| 2020/0053111 A1 | 2/2020 | Jakobsson |
| 2020/0057487 A1 | 2/2020 | Sicconi et al. |

OTHER PUBLICATIONS

U.S. Appl. No. 16/905,050, filed Jun. 18, 2020, Pending.
U.S. Appl. No. 16/944,344, filed Jul. 31, 2020, Pending, Oleksiy Shevchenko.
U.S. Appl. No. 17/141,402, filed Jan. 5, 2021 Pending, Oleksiy Shevchenko.
Hewlett, William R., et al., "An email assistant that learns to suggest reusable replies", In AAAI Workshop, Technical Report WS-08-04, 2008, pp. 28-35.
U.S. Appl. No. 16/055,027, filed Aug. 4, 2018, Pending.
U.S. Appl. No. 16/055,029, filed Aug. 4, 2018, Pending.
U.S. Appl. No. 16/055,030, filed Aug. 4, 2018, Pending.
U.S. Appl. No. 16/055,032, filed Aug. 4, 2018, Pending.
U.S. Appl. No. 16/055,034, filed Aug. 4, 2018, Pending.
U.S. Appl. No. 16/055,036, filed Aug. 4, 2018, Pending.
U.S. Appl. No. 16/055,037, filed Aug. 4, 2018, Pending.
Liu, et al., "Multimodal video classification with stacked contractive autoencoders", Signal Processing 120,, 2016, pp. 761-766.
Klopfenstein, et al., "The Rise of the Bots", 2017, pp. 555-565.

* cited by examiner

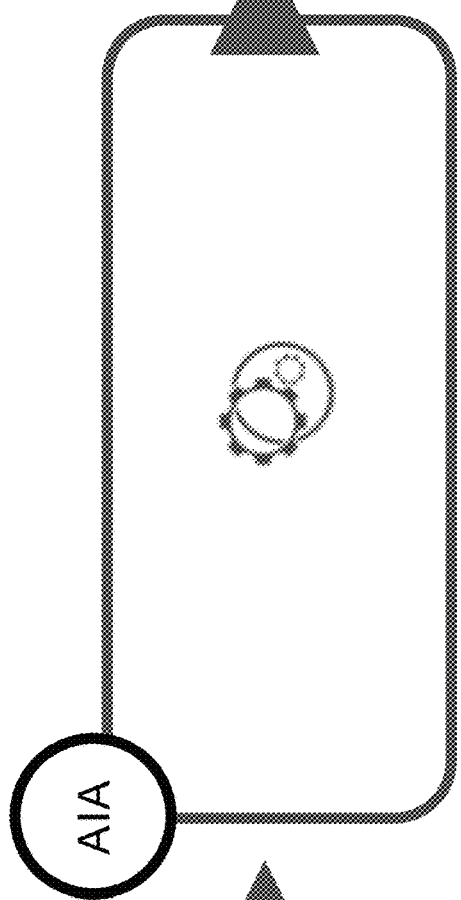
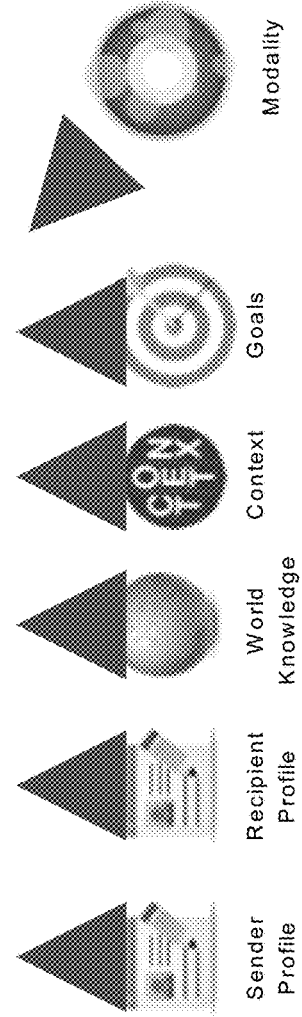
FIG. 2

ARTIFICIAL INTELLIGENCE COMMUNICATION ASSISTANCE FOR IMPROVING THE EFFECTIVENESS OF COMMUNICATIONS USING REACTION DATA

CLAIM OF PRIORITY

This application claims the benefit of U.S. Provisional App. Ser. No. 62/541,203, filed Aug. 4, 2017, titled ARTIFICIAL INTELLIGENT ASSISTANT, which is incorporated by reference in its entirety.

FIELD

The present application relates to a digital assistant. In particular, the present application relates to methods and systems for providing an artificial intelligent assistant to increase the effectiveness of communications.

BACKGROUND

Current digital writing assistants provide simple aids to sending communications, such as illustrated in FIG. 1, where the text of an electronically composed communication is evaluated by a 'writing assistant' to correct content errors, such as spelling or grammatical errors. However, these simple aids are very limited, generally only addressing corrections to content. What is needed is an intelligent digital assistant system that is able to incorporate knowledge and context surrounding the communication exchanges in order to make a communication exchange more effective.

SUMMARY

In embodiments, a method of electronic communication assistance may include receiving a partial electronic communication at an artificial intelligence assistant computing facility from a first electronic identifier associated with a first user, the partial electronic communication comprising a communication content and comprising or associated with the first electronic identifier associated with the first user and a second electronic identifier associated with a second user; extracting a communication context from the partial electronic communication; encoding the partial electronic communication for processing creating an encoded partial electronic communication; retrieving from a communication profile database a first communication profile for the first user using the first electronic identifier associated with the first user, wherein the first communication profile comprises a first user communication attribute; retrieving from the communication profile database a second communication profile for the second user using the second electronic identifier associated with the second user, wherein the second communication profile comprises a second user communication attribute; processing the encoded partial electronic communication with a processor to generate a compositional change for the communication content of the partial electronic communication using at least one of the communication context, the first user communication attribute, or the second user communication attribute to generate the compositional change; and generating a changed electronic communication from the partial electronic communication and the compositional change.

In embodiments, a method of electronic communication assistance may include receiving a partial electronic communication at an artificial intelligence assistant computing facility from a first electronic identifier associated with a first user, the partial electronic communication comprising a communication content and comprising or associated with the first electronic identifier and a second electronic identifier associated with a second user; retrieving a first communication profile, wherein the first communication profile comprises a first user communication attribute; retrieving a second communication profile, wherein the second communication profile comprises a second user communication attribute; processing the partial electronic communication with a processor to generate a compositional change for the communication content of the partial electronic communication using at least one of the first user communication attribute or the second user communication attribute to generate the compositional change; and generating a changed electronic communication from the partial electronic communication and the compositional change.

In embodiments, the method may further include transmitting the changed electronic communication to the first electronic identifier associated with the first user, and/or transmitting the changed electronic communication to the second electronic identifier associated with the second user. The compositional change may be derived from representations of previous content and context from a plurality of user profiles stored in the communication profile database which are similar to at least one of the first communication profile or the second communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion; the auto-generated textual completion may be a phrasal completion, and the processor may generate the compositional change by optimizing generated language as determined by the processor from the second user communication attribute. The processor may generate the compositional change by replicating a communication style of the first user as determined by the processor from the first user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model, deep learning model, or statistical learning algorithm to score the plurality of communication templates based at least in part on the communication content, communication context, first user communication attribute, or second user communication attribute, communication context, first user communication attribute, or second user communication attribute.

In embodiments, a method of electronic communication assistance may include receiving a partial electronic communication at an artificial intelligence assistant computing facility from an electronic identifier associated with a user, the partial electronic communication comprising a communication content and comprising or associated with the electronic identifier associated with the user; extracting a communication context from the partial electronic communication; encoding the partial electronic communication for processing creating an encoded partial electronic communication; retrieving from a communication profile database a communication profile for the user using the electronic identifier associated with the user, wherein the communication profile comprises a user communication attribute; processing the encoded partial electronic communication with a processor to generate a compositional change for the communication content of the partial electronic communication using at least one of the communication context or the user communication attribute; and generating a changed electronic communication from the partial electronic communication and the compositional change.

In embodiments, the method may include transmitting the changed electronic communication to the electronic identifier associated with the user, or transmitting the changed electronic communication to a second electronic identifier associated with a second user. The compositional change may be derived from representations of previous content and context from a plurality of user profiles stored in the communication profile database which are similar to the communication. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language of a user as determined by the processor from a user communication attribute, may generate the compositional change by replicating a communication style of the user as determined by the processor from the user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion, the processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a method of electronic communication assistance may include receiving a partial electronic communication at an artificial intelligence assistant computing facility from an electronic identifier associated with a user, the partial electronic communication comprising a communication content and comprising or associated with the electronic identifier; retrieving a communication profile, wherein the communication profile comprises a user communication attribute; processing the partial electronic communication with a processor to generate a compositional change for the communication content of the partial electronic communication using the user communication attribute to generate the compositional change; and generating a changed electronic communication from the partial electronic communication and the compositional change.

In embodiments, the method may include transmitting the changed electronic communication to the electronic identifier associated with the user, or transmitting the changed electronic communication to a second electronic identifier associated with a second user. The compositional change may be derived from representations of previous content and context from a plurality of user profiles which are similar to at least one of the communication profile. The processor may be trained on large-scale data mixed with prior communication and effective communications from the plurality of user profiles, the processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language of a user as determined by the processor from a user communication attribute. The processor may generate the compositional change by replicating a communication style of the user as determined by the processor from the user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a method of electronic communication assistance may include receiving a partial electronic communication at an artificial intelligence assistant computing facility from an electronic identifier associated with a user, the partial electronic communication comprising a communication content and comprising or associated with the electronic identifier associated with the user and a second electronic identifier associated with a second user; extracting a communication context from the partial electronic communication; encoding the partial electronic communication for processing creating an encoded partial electronic communication; retrieving from a communication profile database a communication profile for the second user using the second electronic identifier associated with the second user, wherein the communication profile comprises a second user communication attribute; processing the encoded partial electronic communication with a processor to generate a compositional change for the communication content of the partial electronic communication using at least one of the communication context or the second user communication attribute to generate the compositional change; and generating a changed electronic communication from the partial electronic communication and the compositional change.

In embodiments, the method may include transmitting the changed electronic communication to the electronic identifier associated with the user, or transmitting the changed electronic communication to a second electronic identifier associated with a second user. The compositional change may be derived from representations of previous content and context from a plurality of user profiles stored in a communication profile database which are similar to at least one of the communication profiles of the first or second user. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the user. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a method of electronic communication assistance may include: receiving a partial electronic communication at an artificial intelligence assistant computing facility from an electronic identifier associated with a user, the partial electronic communication comprising a communication content and comprising or associated with the electronic identifier and a second electronic identifier associated with a second user; retrieving a second communication profile, wherein the second communication profile comprises a second user communication attribute; processing the partial electronic communication with a processor to generate a compositional change for the communication content of the partial electronic communication using the second user communication attribute to generate the compositional change; and generating a changed electronic communication from the partial electronic communication and the compositional change.

In embodiments, the method may include transmitting the changed electronic communication to the electronic identifier associated with the user, or transmitting the changed electronic communication to a second electronic identifier associated with a second user. The compositional change may be derived from representations of previous content and context from a plurality of user profiles which are similar to at least one of the communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the user as determined by the processor from the user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system may include a server computer comprising a processor and a computer-readable storage device that stores instructions that, when executed by the processor, cause the processor to perform operations comprising: receiving a partial electronic communication at an artificial intelligence assistant computing facility from a first electronic identifier associated with a first user, the partial electronic communication comprising a communication content and comprising or associated with the first electronic identifier associated with the first user and a second electronic identifier associated with a second user; extracting a communication context from the partial electronic communication; encoding the partial electronic communication for processing creating an encoded partial electronic communication; retrieving from a communication profile database a first communication profile for the first user using the first electronic identifier associated with the first user, wherein the first communication profile comprises a first user communication attribute; retrieving from the communication profile database a second communication profile for the second user using the second electronic identifier associated with the second user, wherein the second communication profile comprises a second user communication attribute; processing the encoded partial electronic communication with a processor to generate a compositional change for the communication content of the partial electronic communication using at least one of the communication context, the first user communication attribute, or the second user communication attribute to generate the compositional change; and generating a changed electronic communication from the partial electronic communication and the compositional change.

In embodiments, the system computer may be enabled to perform operations including transmitting the changed electronic communication to the electronic identifier associated with the user, and/or transmitting the changed electronic communication to a second electronic identifier associated with a second user. The compositional change may be derived from representations of previous content and context from a plurality of user profiles stored in the communication profile database which are similar to at least one of the first communication profile or the second communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the first user as determined by the processor from the first user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system may include: a server computer comprising a processor and a computer-readable storage device that stores instructions that, when executed by the processor, cause the processor to perform operations comprising: receiving a partial electronic communication at an artificial intelligence assistant computing facility from a first electronic identifier associated with a first user, the partial electronic communication comprising a communication content and comprising or associated with the first electronic identifier and a second electronic identifier associated with a second user; retrieving a first communication profile, wherein the first communication profile comprises a first user communication attribute; retrieving a second communication profile, wherein the second communication profile comprises a second user communication attribute; processing the partial electronic communication with a processor to generate a compositional change for the communication content of the partial electronic communication using at least one of the first user communication attribute or the second user communication attribute to generate the compositional change; and generating a changed electronic communication from the partial electronic communication and the compositional change.

In embodiments, the system computer may be enabled to perform operations including transmitting the changed electronic communication to the first electronic identifier associated with the first user, or transmitting the changed electronic communication to a second electronic identifier associated with a second user. The compositional change may be derived from representations of previous content and context from a plurality of user profiles which are similar to at least one of the first communication profile or the second communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the first user as determined by the processor from the first user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system may include a server computer comprising a processor and a computer-readable storage device that stores instructions that, when executed by the processor, cause the processor to perform operations comprising: receiving a partial electronic communication at an artificial intelligence assistant computing facility from an electronic identifier associated with a user, the partial electronic communication comprising a communication content and comprising or associated with the electronic identifier associated with the user; extracting a communication context from the partial electronic communication; encoding the partial electronic communication for processing creating an encoded partial electronic communication; retrieving from a communication profile database a communication profile for the user using the electronic identifier associated with the user, wherein the communication profile comprises a user communication attribute; processing the encoded partial electronic communication with a processor to generate a compositional change for the communication content of the partial electronic communication using at least one of the communication context or the user communication attribute; and generating a changed electronic communication from the partial electronic communication and the compositional change.

In embodiments, the system computer may be enabled to perform operations including transmitting the changed electronic communication to the electronic identifier associated with the user, or transmitting the changed electronic communication to a second electronic identifier associated with a second user. The compositional change may be derived from representations of previous content and context from a plurality of user profiles stored in the communication profile database which are similar to the communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language of a user as determined by the processor from a user communication attribute. The processor may generate the compositional change by replicating a communication style of the user as determined by the processor from the user communication attribute. The partial electronic communication further comprises a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system may include a server computer comprising a processor and a computer-readable storage device that stores instructions that, when executed by the processor, cause the processor to perform operations comprising: receiving a partial electronic communication at an artificial intelligence assistant computing facility from an electronic identifier associated with a user, the partial electronic communication comprising a communication content and comprising or associated with the electronic identifier; retrieving a communication profile, wherein the communication profile comprises a user communication attribute; processing the partial electronic communication with a processor to generate a compositional change for the communication content of the partial electronic communication using the user communication attribute to generate the compositional change; and generating a changed electronic communication from the partial electronic communication and the compositional change.

In embodiments, the system computer may be enabled to perform operations including transmitting the changed electronic communication to the electronic identifier associated with the user, or transmitting the changed electronic communication to a second electronic identifier associated with a second user. The compositional change may be derived from representations of previous content and context from a plurality of user profiles which are similar to at least one of the communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language of a user as determined by the processor from a user communication attribute. The processor may generate the compositional change by replicating a communication style of the user as determined by the processor from the user communication attribute. The partial electronic communication further comprises a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system may include a server computer comprising a processor and a computer-readable storage device that stores instructions that, when executed by the processor, cause the processor to perform operations comprising: receiving a partial electronic communication at an artificial intelligence assistant computing facility from an electronic identifier associated with a user, the partial electronic communication comprising a communication content and comprising or associated with the electronic identifier associated with the user and a second electronic identifier associated with a second user; extracting a communication context from the partial electronic communication; encoding the partial electronic communication for processing creating an encoded partial electronic communication; retrieving from a communication profile database a second communication profile for the second user using the second electronic identifier associated with the second user, wherein the second communication profile comprises a second user communication attribute; processing the encoded partial electronic communication with a processor to generate a compositional change for the communication content of the partial electronic communication using at least one of the communication context or the second user communication attribute to generate the compositional change; and generating a changed electronic communication from the partial electronic communication and the compositional change.

In embodiments, the system computer may be enabled to perform operations including transmitting the changed electronic communication to the electronic identifier associated with the user, or transmitting the changed electronic communication to a second electronic identifier associated with a second user. The compositional change may be derived from representations of previous content and context from a plurality of user profiles stored in a communication profile database which are similar to the communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the user as determined by the processor from the user communication attribute. The partial electronic communication further comprises a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a system of electronic communication assistance may perform the following: receiving a partial electronic communication at an artificial intelligence assistant computing facility from an electronic identifier associated with a user, the partial electronic communication comprising a communication content and comprising or associated with the electronic identifier and a second electronic identifier associated with a second user; retrieving a second communication profile, wherein the second communication profile comprises a second user communication attribute; processing the partial electronic communication with a processor to generate a compositional change for the communication content of the partial electronic communication using the second user communication attribute to generate the compositional change; and generating a changed electronic communication from the partial electronic communication and the compositional change.

In embodiments, the system computer may be enabled to perform operations including transmitting the changed electronic communication to the electronic identifier associated with the user, or transmitting the changed electronic communication to a second electronic identifier associated with a second user. The compositional change may be derived from representations of previous content and context from a plurality of user profiles which are similar to at least one of the communication profile or the second communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion. The auto-generated textual completion may be a phrasal completion. The processor may generate the compositional change by optimizing generated language as determined by the processor from the second user communication attribute. The processor may generate the compositional change by replicating a communication style of the user as determined by the processor from the user communication attribute. The partial electronic communication further comprises a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model to score the plurality of communication templates based at least in part on the communication content, communication context, first user communication attribute, or second user communication attribute.

In embodiments, a method of electronic communication assistance may include intercepting an electronic communication from further transmission at an artificial intelligence assistant computing facility, wherein the electronic communication was transmitted from a first electronic identifier associated with a first user to second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a first communication profile for the first user using the first user identifier, wherein the first communication profile comprises a first user communication attribute; retrieving from the communication profile database a second communication profile for the second user using the second electronic identifier, wherein the second communication profile comprises a second user communication attribute; processing the encoded electronic communication with a processor to generate a compositional change for the communication content of the electronic communication using at least one of the communication context, the first user communication attribute, or the second user communication attribute to generate the compositional change; and generating a changed electronic communication from the electronic communication and the compositional change, wherein the changed electronic communication comprises annotations to indicate the compositional change to the electronic communication.

In embodiments, the method may include transmitting the changed electronic communication to the first electronic identifier associated with the first user or transmitting the changed electronic communication to the second electronic identifier associated with the second user. The compositional change may be derived from representations of previous content and context from a plurality of user profiles stored in the communication profile database which are similar to at least one of the first communication profile or the second communication profile. The processor may be trained on large-scale data mixed with prior communication and effective communications from the plurality of user profiles. The processor may use at least one of a machine learning language model or a statistical algorithm for creating the compositional change. The processor may generate the compositional change by optimizing generated language of the second user as determined by the processor from the second user communication attribute. The processor may generate the compositional change by replicating a communication style of the first user as determined by the processor from the first user communication attribute. The electronic communication further comprises a communication goal, and the processor may generate the compositional change by optimizing for impact and effectiveness of generated language with respect to the communication goal.

In embodiments, a method of electronic communication assistance may include: intercepting an electronic communication from further transmission at an artificial intelligence assistant computing facility, wherein the electronic communication was transmitted from a first electronic identifier associated with a first user to second electronic identifier associated with a second user, the electronic communication comprising a communication content and comprising or associated with the first electronic identifier associated with the first user; retrieving a first communication profile for the first user using the first user identifier, wherein the first communication profile comprises a first user communication attribute; retrieving a second communication profile for the second user using the second electronic identifier, wherein the second communication profile comprises a second user communication attribute; processing the electronic communication with a processor to generate a compositional change for the communication content of the electronic communication using at least one of the first user communication attribute or the second user communication attribute to generate the compositional change; and generating a changed electronic communication from the electronic communication and the compositional change, wherein the changed electronic communication comprises annotations to indicate the compositional change to the electronic communication.

In embodiments, a method of electronic communication assistance may include: intercepting an electronic communication from further transmission at an artificial intelligence assistant computing facility, wherein the electronic communication was transmitted from an electronic identifier associated with a user, the electronic communication comprising a communication content and comprising or associated with the electronic identifier associated with the user; extracting a communication context from the electronic communication; encoding the electronic communication for processing creating an encoded electronic communication; retrieving from a communication profile database a communication profile for the user using the user identifier, wherein the communication profile comprises a user communication attribute; processing the encoded electronic communication with a processor to generate a compositional change for the communication content of the electronic communication using at least one of the communication context or the user communication attribute to generate the compositional change; and generating a changed electronic communication from the electronic communication and the compositional change, wherein the changed electronic communication comprises annotations to indicate the compositional change to the electronic communication.

In embodiments, a method of electronic communication assistance may include: intercepting an electronic communication from further transmission at an artificial intelligence assistant computing facility, wherein the electronic communication was transmitted from an electronic identifier associated with a user, the electronic communication comprising a communication content and comprising or associated with the electronic identifier associated with the user; retrieving a communication profile for the user using the user identifier, wherein the communication profile comprises a user communication attribute; processing the electronic communication with a processor to generate a compositional change for the communication content of the electronic communication using the user communication attribute to generate the compositional change; and generating a changed electronic communication from the electronic communication and the compositional change, wherein the changed electronic communication comprises annotations to indicate the compositional change to the electronic communication.

In embodiments, a method of electronic communication assistance may include: intercepting an electronic communication from further transmission at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a communication profile for the second user using the second electronic identifier, wherein the communication profile comprises a second user communication attribute; processing the encoded electronic communication with a processor to generate a compositional change for the communication content of the electronic communication using at least one of the communication context or the second user communication attribute to generate the compositional change; and generating a changed electronic communication from the electronic communication and the compositional change, wherein the changed electronic communication comprises annotations to indicate the compositional change to the electronic communication.

In embodiments, a method of electronic communication assistance may include: intercepting an electronic communication from further transmission at an artificial intelligence assistant computing facility, wherein the electronic communication was transmitted to a second electronic identifier associated with a second user, the electronic communication comprising a communication content and comprising or associated with the first electronic identifier associated with the first user; retrieving from a communication profile database a communication profile for the second user using the second electronic identifier, wherein the communication profile comprises a second user communication attribute; processing the electronic communication with a processor to generate a compositional change for the communication content of the electronic communication using the second user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted from a first electronic identifier associated with a first user to second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a first communication profile for the first user using the first user identifier, wherein the first communication profile comprises a first user communication attribute; retrieving from the communication profile database a second communication profile for the second user using the second electronic identifier, wherein the second communication profile comprises a second user communication attribute; processing the encoded electronic communication with a processor to generate a compositional change for the communication content of the electronic communication using at least one of the communication context, the first user communication attribute, or the second user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted from a first electronic identifier associated with a first user to second electronic identifier associated with a second user, the electronic communication comprising a communication content and comprising or associated with the first electronic identifier associated with the first user; retrieving a first communication profile for the first user using the first user identifier, wherein the first communication profile comprises a first user communication attribute; retrieving a second communication profile for the second user using the second electronic identifier, wherein the second communication profile comprises a second user communication attribute; processing the electronic communication with a processor to generate a compositional change for the communication content of the electronic communication using at least one of the first user communication attribute or the second user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted from an electronic identifier associated with a user, the electronic communication comprising a communication content and comprising or associated with the electronic identifier associated with the user; extracting a communication context from the electronic communication; encoding the electronic communication for processing creating an encoded electronic communication; retrieving from a communication profile database a communication profile for the user using the user identifier, wherein the communication profile comprises a user communication attribute; processing the encoded electronic communication with a processor to generate a compositional change for the communication content of the electronic communication using at least one of the communication context or the user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted from a electronic identifier associated with a user, the electronic communication comprising a communication content and comprising or associated with the electronic identifier associated with the user; retrieving a communication profile for the user using the user identifier, wherein the communication profile comprises a user communication attribute; processing the electronic communication with a processor to generate a compositional change for the communication content of the electronic communication using the user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted from a first electronic identifier associated with a first user to second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a communication profile for the second user using the second electronic identifier, wherein the communication profile comprises a second user communication attribute; processing the encoded electronic communication with a processor to generate a compositional change for the communication content of the electronic communication using at least one of the communication context or the second user communication attribute to generate the compositional change; and generating a changed electronic communication from the electronic communication and the compositional change, wherein the changed electronic communication comprises annotations to indicate the compositional change to the electronic communication.

In embodiments, a system may include a server computer comprising a processor and a computer-readable storage device that stores instructions that, when executed by the processor, cause the processor to perform operations comprising: intercepting an electronic communication from further transmission at an artificial intelligence assistant computing facility, wherein the electronic communication was transmitted to second electronic identifier associated with a second user, the electronic communication comprising a communication content and comprising or associated with the first electronic identifier associated with the first user; retrieving from a communication profile database a communication profile for the second user using the second electronic identifier, wherein the communication profile comprises a second user communication attribute; processing the electronic communication with a processor to generate a compositional change for the communication content of the electronic communication using the second user communication attribute to generate the compositional change; and generating a changed electronic communication from the electronic communication and the compositional change, wherein the changed electronic communication comprises annotations to indicate the compositional change to the electronic communication.

In embodiments, a method of electronic communication assistance may include: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; extracting a communication context from the electronic communication information; retrieving from a communication profile database a first communication profile for the first user using the first electronic identifier, wherein the first communication profile comprises a first user communication attribute; retrieving from the communication profile database a second communication profile for the second user using the second electronic identifier, wherein the second communication profile comprises a second user communication attribute; processing the electronic communication information with a processor to generate a compositional recommendation for developing a communication content related to the electronic communication information using at least one of the communication context, the first user communication attribute, or the second user communication attribute to generate the compositional recommendation; and transmitting the compositional recommendation to the first electronic identifier.

In embodiments, the method may further include intercepting an electronic communication from the first electronic identifier, the electronic communication relating to the electronic communication information and the compositional recommendation; encoding the electronic communication to create an encoded electronic communication; processing the encoded electronic communication with the processor to extract an additional communication attribute from the electronic communication; and updating the first communication profile for the first user based on the additional communication attribute. The compositional recommendation may be derived from representations of previous content and context from a plurality of user profiles stored in the communication profile database which are similar to at least one of the first communication profile or the second communication profile. The processor may calculate weighted scores for predicted reaction outcome and expected reaction outcome, and derives the compositional recommendation based on a comparison of the calculated weighted scores. The processor may use at least one of a machine learning mode, deep learning model, or statistical learning algorithm for creating the compositional recommendation. The processor may generate the compositional recommendation by evaluating a communication style of the first user as determined by the processor from the first user communication attribute. The processor may generate the compositional recommendation further using a communication recommendation template selected from a plurality of communication recommendation templates. The processor may select the communication recommendation template using at least one of a machine learning model, deep learning model, or statistical learning model to find a most effective communication recommendation template based at least in part on the electronic communication information. The plurality of communication recommendation templates may include at least one automatically generated template generated by the processor. The processor may select the communication recommendation template by using a machine learning model to score the plurality of communication recommendation templates based at least in part on the electronic communication information. The electronic communication information may include a communication goal. The communication goal may be used in generating the compositional recommendation.

In embodiments, a method of electronic communication assistance may include: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; retrieving a first communication profile for the first user using the first electronic identifier, wherein the first communication profile comprises a first user communication attribute; retrieving a second communication profile for the second user using the second electronic identifier, wherein the second communication profile comprises a second user communication attribute; processing the electronic communication information with a processor to generate a compositional recommendation for developing a communication content related to the electronic communication information using at least one of the first user communication attribute or the second user communication attribute to generate the compositional recommendation; and transmitting the compositional recommendation to the first electronic identifier.

In embodiments, a method of electronic communication assistance may include: receiving electronic communication information as an electronic communication is composed at an artificial intelligence assistant computing facility from a electronic identifier associated with a user, the electronic communication information comprising a communication content and comprising or associated with the electronic identifier associated with the user; extracting a communication context from the electronic communication information; retrieving from a communication profile database a communication profile for the user using the electronic identifier, wherein the communication profile comprises a user communication attribute; processing the electronic communication information with a processor to generate a compositional recommendation for developing a communication content related to the electronic communication information using at least one of the communication context or the user communication attribute to generate the compositional recommendation; and transmitting the compositional recommendation to the electronic identifier.

In embodiments, a method of electronic communication assistance may include: receiving electronic communication information as an electronic communication is composed at an artificial intelligence assistant computing facility from a electronic identifier associated with a user, the electronic communication information comprising a communication content and comprising or associated with the electronic identifier associated with the user; retrieving a communication profile for the user using the electronic identifier, wherein the communication profile comprises a user communication attribute; processing the electronic communication information with a processor to generate a compositional recommendation for developing a communication content related to the electronic communication information using the user communication attribute; and transmitting the compositional recommendation to the electronic identifier.

In embodiments, a method of electronic communication assistance may include: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; extracting a communication context from the electronic communication information; retrieving a communication profile for the second user using the second electronic identifier, wherein the communication profile comprises a second user communication attribute; processing the electronic communication information with a processor to generate a compositional recommendation for developing a communication content related to the electronic communication information using at least one of the communication context or the second user communication attribute to generate the compositional recommendation; and transmitting the compositional recommendation to the first electronic identifier.

In embodiments, a method of electronic communication assistance may include receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; retrieving a communication profile for the second user using the second electronic identifier, wherein the communication profile comprises a second user communication attribute; processing the electronic communication information with a processor to generate a compositional recommendation for developing a communication content related to the electronic communication information using the second user communication attribute to generate the compositional recommendation; and transmitting the compositional recommendation to the first electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; extracting a communication context from the electronic communication information; retrieving from a communication profile database a first communication profile for the first user using the first electronic identifier, wherein the first communication profile comprises a first user communication attribute; retrieving from the communication profile database a second communication profile for the second user using the second electronic identifier, wherein the second communication profile comprises a second user communication attribute; processing the electronic communication information with a processor to generate a compositional recommendation for developing a communication content related to the electronic communication information using at least one of the communication context, the first user communication attribute, or the second user communication attribute to generate the compositional recommendation; and transmitting the compositional recommendation to the first electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; retrieving a first communication profile for the first user using the first electronic identifier, wherein the first communication profile comprises a first user communication attribute; retrieving a second communication profile for the second user using the second electronic identifier, wherein the second communication profile comprises a second user communication attribute; processing the electronic communication information with a processor to generate a compositional recommendation for developing a communication content related to the electronic communication information using at least one of the first user communication attribute or the second user communication attribute to generate the compositional recommendation; and transmitting the compositional recommendation to the first electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from a electronic identifier associated with a user, the electronic communication information comprising a communication content and comprising or associated with the electronic identifier; extracting a communication context from the electronic communication information; retrieving from a communication profile database a communication profile for the user using the electronic identifier, wherein the communication profile comprises a user communication attribute; processing the electronic communication information with a processor to generate a compositional recommendation for developing a communication content related to the electronic communication information using at least one of the communication context or the user communication attribute to generate the compositional recommendation; and transmitting the compositional recommendation to the electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from an electronic identifier associated with a user, the electronic communication information comprising a communication content and comprising or associated with the electronic identifier associated with the user; retrieving a communication profile for the user using the electronic identifier, wherein the communication profile comprises a user communication attribute; processing the electronic communication information with a processor to generate a compositional recommendation for developing a communication content related to the electronic communication information using the user communication attribute to generate the compositional recommendation; and transmitting the compositional recommendation to the electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; extracting a communication context from the electronic communication information; retrieving from a communication profile database a communication profile for the second user using the second electronic identifier, wherein the communication profile comprises a second user communication attribute; processing the electronic communication information with a processor to generate a compositional recommendation for developing a communication content related to the electronic communication information using at least one of the communication context or the second user communication attribute to generate the compositional recommendation; and transmitting the compositional recommendation to the first electronic identifier.

In embodiments, a system may include a server computer comprising a processor and a computer-readable storage device that stores instructions that, when executed by the processor, cause the processor to perform operations comprising: receiving electronic communication information as an electronic communication is composed at an artificial intelligence assistant computing facility from a first electronic identifier associated with a first user, the electronic communication information comprising a communication content and comprising or associated with the first electronic identifier associated with the first user and a second electronic identifier associated with a second user; retrieving a communication profile for the second user using the second electronic identifier, wherein the communication profile comprises a second user communication attribute; processing the electronic communication information with a processor to generate a compositional recommendation for developing a communication content related to the electronic communication information using the second user communication attribute to generate the compositional recommendation; and transmitting the compositional recommendation to the first electronic identifier.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user and the second electronic identifier associated with the second user; encoding the electronic communication for processing creating an encoded electronic communication; retrieving from a communication profile database a first communication profile for the first user using the first electronic identifier, wherein the first communication profile comprises a first user communication attribute; retrieving from the communication profile database a second communication profile for the second user using the second electronic identifier, wherein the second communication profile comprises a second user communication attribute that identifies a receiving communication preference; processing the encoded electronic communication with a processor to generate a modified electronic communication that is a modified version of the electronic communication, wherein the processor uses at least one of the communication content, the first user communication attribute, or the second user communication attribute to process the encoded electronic communication; and transmitting the modified electronic communication to the second electronic identifier.

In embodiments, the processor may generate the modified electronic communication by removing or replacing language from the electronic communication based at least in part on the second user communication attribute. The removed or replaced language may be offensive or abusive language. The processor may generate the modified electronic communication by summarizing language from the electronic communication based at least in part on the second user communication attribute. The processor may generate the modified electronic communication by reformatting the electronic communication based at least in part on the second user communication attribute. The processor may generate the modified electronic communication by recomposing language from the electronic communication based at least in part on the second user communication attribute. The processor may generate the modified electronic communication by incorporating explanatory text associated with phases based at least in part on the second user communication attribute. The processor may generate the modified electronic communication derived at least in part from representations of previous electronic communications from a plurality of user profiles stored in the communication profile database that are similar to at least one of the first communication profile or the second communication profile. The processor may be trained on large-scale data mixed with prior communication and effective communications from the plurality of user profiles. The processor may use at least one of a machine learning model, deep learning model, or statistical learning model for generating the modified electronic communication. The modified electronic communication may be used to generate at least one of an updated first communication profile or an updated second communication profile. Prior to transmitting the modified electronic communication to the second electronic identifier, receiving a request by the second user may be received to provide the modified electronic communication.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user using the first electronic identifier, wherein the first communication profile comprises a first user communication attribute; retrieving a second communication profile for the second user using the second electronic identifier, wherein the second communication profile comprises a second user communication attribute that identifies a receiving communication preference; processing the electronic communication with a processor to generate a modified electronic communication that is a modified version of the electronic communication, wherein the processor uses at least one of the communication content, the first user communication attribute, or the second user communication attribute to process the electronic communication; and transmitting the modified electronic communication to the second electronic identifier.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; encoding the electronic communication for processing creating an encoded electronic communication; retrieving from a communication profile database a first communication profile for the first user using the first electronic identifier, wherein the first communication profile comprises a first user communication attribute; processing the encoded electronic communication with a processor to generate a modified electronic communication that is a modified version of the electronic communication, wherein the processor uses at least one of the communication content or the first user communication attribute to process the encoded electronic communication; and transmitting the modified electronic communication to the second electronic identifier.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user using the first electronic identifier, wherein the first communication profile comprises a first user communication attribute; processing the electronic communication with a processor to generate a modified electronic communication that is a modified version of the electronic communication, wherein the processor uses at least one of the communication content or the first user communication attribute to process the electronic communication; and transmitting the modified electronic communication to the second electronic identifier.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; encoding the electronic communication for processing creating an encoded electronic communication; retrieving from a communication profile database a second communication profile for the second user using the second electronic identifier, wherein the second communication profile comprises a second user communication attribute that identifies a receiving communication preference; processing the encoded electronic communication with a processor to generate a modified electronic communication that is a modified version of the electronic communication, wherein the processor uses at least one of the communication content or the second user communication attribute to process the encoded electronic communication; and transmitting the modified electronic communication to the second electronic identifier.

In embodiments, a method of electronic communication assistance may include: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a second communication profile for the second user using the second electronic identifier, wherein the second communication profile comprises a second user communication attribute that identifies a receiving communication preference; processing the electronic communication with a processor to generate a modified electronic communication that is a modified version of the electronic communication, wherein the processor uses at least one of the communication content or the second user communication attribute to process the electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user and the second electronic identifier associated with the second user; encoding the electronic communication for processing creating an encoded electronic communication; retrieving from a communication profile database a first communication profile for the first user using the first electronic identifier, wherein the first communication profile comprises a first user communication attribute; retrieving from the communication profile database a second communication profile for the second user using the second electronic identifier, wherein the second communication profile comprises a second user communication attribute that identifies a receiving communication preference; processing the encoded electronic communication with a processor to generate a modified electronic communication that is a modified version of the electronic communication, wherein the processor uses at least one of the communication content, the first user communication attribute, or the second user communication attribute to process the encoded electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user using the first electronic identifier, wherein the first communication profile comprises a first user communication attribute; retrieving a second communication profile for the second user using the second electronic identifier, wherein the second communication profile comprises a second user communication attribute that identifies a receiving communication preference; processing the electronic communication with a processor to generate a modified electronic communication that is a modified version of the electronic communication, wherein the processor uses at least one of the communication content, the first user communication attribute, or the second user communication attribute to process the electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; encoding the electronic communication for processing creating an encoded electronic communication; retrieving from a communication profile database a first communication profile for the first user using the first electronic identifier, wherein the first communication profile comprises a first user communication attribute; processing the encoded electronic communication with a processor to generate a modified electronic communication that is a modified version of the electronic communication, wherein the processor uses at least one of the communication content or the first user communication attribute to process the encoded electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user using the first electronic identifier, wherein the first communication profile comprises a first user communication attribute; processing the electronic communication with a processor to generate a modified electronic communication that is a modified version of the electronic communication, wherein the processor uses at least one of the communication content or the first user communication attribute to process the electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; encoding the electronic communication for processing creating an encoded electronic communication; retrieving from a communication profile database a second communication profile for the second user using the second electronic identifier, wherein the second communication profile comprises a second user communication attribute that identifies a receiving communication preference; processing the encoded electronic communication with a processor to generate a modified electronic communication that is a modified version of the electronic communication, wherein the processor uses at least one of the communication content or the second user communication attribute to process the encoded electronic communication; and transmitting the modified electronic communication to the second electronic identifier.

In embodiments, a system may include a server computer comprising a processor and a computer-readable storage device that stores instructions that, when executed by the processor, cause the processor to perform operations comprising: intercepting a electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a second communication profile for the second user using the second electronic identifier, wherein the second communication profile comprises a second user communication attribute that identifies a receiving communication preference; processing the electronic communication with a processor to generate a modified electronic communication that is a modified version of the electronic communication, wherein the processor uses at least one of the communication content or the second user communication attribute to process the electronic communication; and transmitting the modified electronic communication to the second electronic identifier.

In embodiments, a method of electronic communication assistance may include: receiving an audio-visual electronic communication at an artificial intelligence assistant computing platform from a first user, the first user identified by a first electronic identifier, the audio-visual electronic communication comprising an audio communication content and a video communication content and comprising or associated with the first electronic identifier associated with the first user and a second electronic identifier associated with a second user, wherein the intended recipient of the audio-visual electronic communication is the second user; encoding the audio communication content for processing creating an encoded audio communication; extracting an audio communication information from the encoded audio communication content; encoding the video communication content for processing creating an encoded video communication; extracting a video communication information from the encoded video communication content; processing the audio-visual electronic communication with a processor to generate an audio-visual compositional change for the communication content of the audio-visual electronic communication using at least one of the audio communication content, the video communication content, audio communication information, video communication information, a sensor input from a wearable user device, a first user communication attribute retrieved from a communication profile for the first user using the first electronic identifier or a second user communication attribute retrieved from a communication profile for the second user using the second electronic identifier to generate the compositional change; generating a changed electronic communication from the audio-visual electronic communication and the compositional change; and providing the changed electronic communication.

In embodiments, the compositional change may be derived from representations of previous content and context from a plurality of user profiles stored in a communication profile database which are similar to at least one of the first communication profile or the second communication profile. The processor may be trained on large-scale data mixed with prior communication and effective communications from a plurality of user profiles. The processor may use at least one of a machine learning model, deep learning model, or statistical learning algorithm for creating the compositional change. The processor may generate the compositional change by optimizing generated language of the first user as determined by the processor from the first user communication attribute. The processor may generate the compositional change by replicating a communication style of the first user as determined by the processor from the first user communication attribute. The audio-visual electronic communication may include a communication goal, and the processor generates the compositional change by optimizing in respect of the communication goal. The method may further include providing a textual representation of the audio-visual electronic communication within a graphical user interface on a screen of a computing device worn by the first user and providing the changed electronic communication on the screen.

In embodiments, a method of electronic communication assistance may include: receiving an audio-visual electronic communication at an artificial intelligence assistant computing platform from a first user, the audio-visual electronic communication comprising an audio communication content and a video communication content, wherein the intended recipient of the audio-visual electronic communication is a second user; extracting an audio communication information from the audio communication content; extracting a video communication information from the video communication content; processing the audio-visual electronic communication with a processor to generate an audio-visual compositional change for the communication content of the audio-visual electronic communication using at least one of the audio communication content, the video communication content, audio communication information, video communication information, a sensor input from a wearable user device, a first user communication attribute retrieved from a communication profile for the first user or a second user communication attribute retrieved from a communication profile for the second user to generate the compositional change; generating a changed electronic communication from the audio-visual electronic communication and the compositional change; and providing the changed electronic communication.

In embodiments, a system may include a server computer comprising a processor and a computer-readable storage device that stores instructions that, when executed by the processor, cause the processor to perform operations comprising: receiving an audio-visual electronic communication at an artificial intelligence assistant computing platform from a first user, the first user identified by a first electronic identifier, the audio-visual electronic communication comprising an audio communication content and a video communication content and comprising or associated with the first electronic identifier associated with the first user and a second electronic identifier associated with a second user, wherein the intended recipient of the audio-visual electronic communication is the second user; encoding the audio communication content for processing creating an encoded audio communication; extracting an audio communication information from the encoded audio communication content; encoding the video communication content for processing creating an encoded video communication; extracting a video communication information from the encoded video communication content; processing the audio-visual electronic communication with a processor to generate an audio-visual compositional change for the communication content of the audio-visual electronic communication using at least one of the audio communication content, the video communication content, audio communication information, video communication information, a sensor input from a wearable user device, a first user communication attribute retrieved from a communication profile for the first user using the first electronic identifier or a second user communication attribute retrieved from a communication profile for the second user using the second electronic identifier to generate the compositional change; generating a changed electronic communication from the audio-visual electronic communication and the compositional change; and providing the changed electronic communication.

In embodiments, a system may include a server computer comprising a processor and a computer-readable storage device that stores instructions that, when executed by the processor, cause the processor to perform operations including: receiving an audio-visual electronic communication at an artificial intelligence assistant computing platform from a first user, the audio-visual electronic communication comprising an audio communication content and a video communication content, wherein the intended recipient of the audio-visual electronic communication is a second user; extracting an audio communication information from the audio communication content; extracting a video communication information from the video communication content; processing the audio-visual electronic communication with a processor to generate an audio-visual compositional change for the communication content of the audio-visual electronic communication using at least one of the audio communication content, the video communication content, audio communication information, video communication information, a sensor input from a wearable user device, a first user communication attribute retrieved from a communication profile for the first user or a second user communication attribute retrieved from a communication profile for the second user to generate the compositional change; generating a changed electronic communication from the audio-visual electronic communication and the compositional change; and providing the changed electronic communication.

In embodiments, a method of electronic communication assistance may include: obtaining a copy of an in-transit audio-visual electronic communication at an artificial intelligence assistant computing platform from a first user, the first user identified by a first electronic identifier, the audio-visual electronic communication comprising an audio communication content and a video communication content and comprising or associated with the first electronic identifier associated with the first user and a second electronic identifier associated with a second user, wherein the intended recipient of the audio-visual electronic communication is the second user; encoding the audio communication content for processing creating an encoded audio communication; extracting an audio communication context from the encoded audio communication content; encoding the video communication content for processing creating an encoded video communication; extracting a video communication context from the encoded video communication content; processing the audio-visual electronic communication with a processor to generate a communication feedback related to the audio-visual electronic communication using at least one of the audio communication content, the video communication content, audio communication context, video communication context, a sensor input from a wearable device, a first user communication attribute retrieved from a communication profile for the first user using the first electronic identifier or a second user communication attribute retrieved from a communication profile for the second user using the second electronic identifier to generate the communication feedback, wherein the communication feedback provides communication information directed to the first user concerning the audio-visual communication; and providing the audio communication content and the communication feedback. In embodiments, the communication feedback may be derived from representations of previous content and context from a plurality of user profiles stored in a communication profile database which are similar to at least one of the first communication profile or the second communication profile. The processor may be trained on large-scale data mixed with prior communication and effective communications from a plurality of user profiles. The processor may use at least one of a machine learning model, deep learning model, or statistical learning algorithm for creating the communication feedback. The processor may generate the communication feedback by optimizing generated language of the first user as determined by the processor from the first user communication attribute. The processor may generate the communication feedback by optimizing a next electronic communication with respect to the second user communication attribute. The audio-visual electronic communication may include a communication goal, and the processor may generate the communication feedback by optimizing in respect of the communication goal. The communication feedback may provide communication information directed to the first user concerning the audio-visual communication related to generating a next audio-visual communication. A textual representation of the audio-visual electronic communication may be provided within a graphical user interface on a screen of a wearable computing device worn by the first user and providing the audio communication content and the communication feedback on the screen.

In embodiments, a method of electronic communication assistance may include: obtaining a copy of an in-transit audio-visual electronic communication at an artificial intelligence assistant computing platform from a first user, the audio-visual electronic communication comprising an audio communication content and a video communication content, wherein the intended recipient of the audio-visual electronic communication is a second user; extracting an audio communication context from the audio communication content; extracting a video communication context from the video communication content; processing the audio-visual electronic communication with a processor to generate a communication feedback related to the audio-visual electronic communication using at least one of the audio communication content, the video communication content, audio communication context, video communication context, a sensor input from a wearable device, a first user communication attribute retrieved from a communication profile for the first user or a second user communication attribute retrieved from a communication profile for the second user to generate the communication feedback, wherein the communication feedback provides communication information directed to the first user concerning the audio-visual communication; and providing the audio communication content and the communication feedback.

In embodiments, a system may include a server computer comprising a processor and a computer-readable storage device that stores instructions that, when executed by the processor, cause the processor to perform operations including: obtaining a copy of an in-transit audio-visual electronic communication at an artificial intelligence assistant computing platform from a first user, the first user identified by a first electronic identifier, the audio-visual electronic communication comprising an audio communication content and a video communication content and comprising or associated with the first electronic identifier associated with the first user and a second electronic identifier associated with a second user, wherein the intended recipient of the audio-visual electronic communication is the second user; encoding the audio communication content for processing creating an encoded audio communication; extracting an audio communication context from the encoded audio communication content; encoding the video communication content for processing creating an encoded video communication; extracting a video communication context from the encoded video communication content; processing the audio-visual electronic communication with a processor to generate a communication feedback related to the audio-visual electronic communication using at least one of the audio communication content, the video communication content, audio communication context, video communication context, a sensor input from a wearable device, a first user communication attribute retrieved from a communication profile for the first user using the first electronic identifier or a second user communication attribute retrieved from a communication profile for the second user using the second electronic identifier to generate the communication feedback, wherein the communication feedback provides communication information directed to the first user concerning the audio-visual communication; and providing the audio communication content and the communication feedback.

In embodiments, a system may include a server computer comprising a processor and a computer-readable storage device that stores instructions that, when executed by the processor, cause the processor to perform operations including: obtaining a copy of an in-transit audio-visual electronic communication at an artificial intelligence assistant computing platform from a first user, the audio-visual electronic communication comprising an audio communication content and a video communication content, wherein the intended recipient of the audio-visual electronic communication is a second user; extracting an audio communication context from the audio communication content; extracting a video communication context from the video communication content; processing the audio-visual electronic communication with a processor to generate a communication feedback related to the audio-visual electronic communication using at least one of the audio communication content, the video communication content, audio communication context, video communication context, a sensor input from a wearable device, a first user communication attribute retrieved from a communication profile for the first user or a second user communication attribute retrieved from a communication profile for the second user to generate the communication feedback, wherein the communication feedback provides communication information directed to the first user concerning the audio-visual communication; and providing the audio communication content and the communication feedback.

In embodiments, a method of electronic communication assistance may include: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user and the second electronic identifier associated with the second user; extracting a communication context from the electronic communication; encoding the electronic communication for processing creating an encoded electronic communication; retrieving from a communication profile database a first communication profile for the first user utilizing the first electronic identifier, wherein the first communication profile comprises a first user communication attribute; retrieving from the communication profile database a second communication profile for the second user utilizing the second electronic identifier, wherein the second communication profile comprises a second user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context, the first user communication attribute, or the second user communication attribute; and sending the response feedback communication to the first electronic identifier.

In embodiments, the response feedback communication may be derived at least in part from representations of previous electronic communications from a plurality of user profiles stored in the communication profile database which are similar to at least one of the first communication profile or the second communication profile. The processor may be trained on large-scale data mixed with prior communication and effective communications from the plurality of user profiles. The processor may utilize at least one of a machine learning language model or a statistical algorithm for creating the response feedback communication. The electronic communication may include a communication goal, and the processor generates the response feedback communication at least in part by computing and utilizing a reaction difference attribute derived from determined differences between the communication goal and the electronic reaction data. The electronic reaction data may include at least one of location information for the second user, response time between the second user receiving the electronic communication and reading the electronic communication, or an action taken by the second user. The reaction context may include an emotional state of the second user. The electronic reaction data may be used to generate at least one of an updated first communication profile or an updated second communication profile. At least one of the updated first communication profile or the updated second communication profile may be used to predict a most likely reaction outcome in a second electronic communication. The electronic reaction data may be used to train a machine learning model that is configured to at least one of generate a communication content or modify a communication content.

In embodiments, a method of electronic communication assistance may include: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user utilizing the first electronic identifier, wherein the first communication profile comprises a first user communication attribute; retrieving a second communication profile for the second user utilizing the second electronic identifier, wherein the second communication profile comprises a second user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content, the first user communication attribute, or the second user communication attribute; and sending the response feedback communication to the first electronic identifier.

In embodiments, a method of electronic communication assistance may include: obtaining a copy of an in-transit electronic communication at an artificial intelligence assistant computing facility, wherein the electronic communication was transmitted from a electronic identifier associated with a user, the electronic communication comprising a communication content and comprising or associated with the electronic identifier associated with the user; extracting a communication context from the electronic communication; encoding the electronic communication for processing creating an encoded electronic communication; retrieving from a communication profile database a communication profile for the user utilizing the electronic identifier, wherein the communication profile comprises a user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context, or the user communication attribute; and sending the response feedback communication to the electronic identifier.

In embodiments, a method of electronic communication assistance may include: obtaining a copy of an in-transit electronic communication at an artificial intelligence assistant computing facility, wherein the electronic communication was transmitted from a electronic identifier associated with a user, the electronic communication comprising a communication content and comprising or associated with the electronic identifier associated with the user; retrieving a communication profile for the user utilizing the electronic identifier, wherein the communication profile comprises a user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content or the user communication attribute; and sending the response feedback communication to the electronic identifier.

In embodiments, a method of electronic communication assistance may include: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a communication profile for the second user utilizing the second electronic identifier, wherein the communication profile comprises a second user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context, or the second user communication attribute; and sending the response feedback communication to the first electronic identifier.

In embodiments, a method of electronic communication assistance may include: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a communication profile for the second user utilizing the second electronic identifier, wherein the communication profile comprises a second user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content or the second user communication attribute; and sending the response feedback communication to the first electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user and the second electronic identifier associated with the second user; extracting a communication context from the electronic communication; encoding the electronic communication for processing creating an encoded electronic communication; retrieving from a communication profile database a first communication profile for the first user utilizing the first electronic identifier, wherein the first communication profile comprises a first user communication attribute; retrieving from the communication profile database a second communication profile for the second user utilizing the second electronic identifier, wherein the second communication profile comprises a second user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context, the first user communication attribute, or the second user communication attribute; and sending the response feedback communication to the first electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a first communication profile for the first user utilizing the first electronic identifier, wherein the first communication profile comprises a first user communication attribute; retrieving a second communication profile for the second user utilizing the second electronic identifier, wherein the second communication profile comprises a second user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content, the first user communication attribute, or the second user communication attribute; and sending the response feedback communication to the first electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a electronic identifier associated with a user, the electronic communication comprising a communication content and comprising or associated with the electronic identifier associated with the user; extracting a communication context from the electronic communication; encoding the electronic communication for processing creating an encoded electronic communication; retrieving from a communication profile database a communication profile for the user utilizing the electronic identifier, wherein the communication profile comprises a user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context or the user communication attribute; and sending the response feedback communication to the electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a electronic identifier associated with a user, the electronic communication comprising a communication content and comprising or associated with the electronic identifier associated with the user; retrieving from a communication profile database a communication profile for the user utilizing the electronic identifier, wherein the communication profile comprises a user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content, the extracted communication context or the user communication attribute; and sending the response feedback communication to the electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; extracting a communication context from the electronic communication; encoding the electronic communication for processing creating an encoded electronic communication; retrieving from a communication profile database a communication profile for the second user utilizing the second electronic identifier, wherein the communication profile comprises a second user communication attribute; receiving electronic reaction data from a second electronic identifier of the second user, wherein the electronic reaction data is generated in response to the second user receiving the electronic communication; encoding the electronic reaction data for processing creating an encoded electronic reaction data; processing the encoded electronic communication and the encoded electronic reaction data to extract a reaction context with a processor to generate a response feedback communication using at least one of the communication content, the extracted communication context or the second user communication attribute; and sending the response feedback communication to the first electronic identifier.

In embodiments, a system may include a server computer comprising a processor and a computer-readable storage device that stores instructions that, when executed by the processor, cause the processor to perform operations including: obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user; retrieving a communication profile for the second user utilizing the second electronic identifier, wherein the communication profile comprises a second user communication attribute; receiving electronic reaction data from a second electronic identifier of the second user, wherein the electronic reaction data is generated in response to the second user receiving the electronic communication; processing the electronic communication and the electronic reaction data to extract a reaction context with a processor to generate a response feedback communication using at least one of the communication content or the second user communication attribute; and sending the response feedback communication to the first electronic identifier.

In embodiments, a computer-implemented method for modifying an incoming communication through a graphical user interface may include: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; displaying the first electronic communication within a graphical user interface on a screen of a computing device of the second user, wherein the displaying the first electronic communication comprises displaying the communication content and displaying a communication transformation query directed to the second user to determine if the first electronic communication should be transformed; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and displaying the modified electronic communication within the graphical user interface on the screen of the computing device.

In embodiments, the processor may transform the first electronic communication by removing language from the first electronic communication based at least in part on the second user communication attribute. The removed language may be offensive language. The processor may transform the first electronic communication by summarizing language from the first electronic communication based at least in part on the second user communication attribute. The processor may transform the first electronic communication by reformatting the first electronic communication based at least in part on the second user communication attribute. The processor may transform the first electronic communication by recomposing language from the first electronic communication based at least in part on the second user communication attribute. The processor may transform the first electronic communication by incorporating explanatory text associated with phases based at least in part on the second user communication attribute. The processor may transform the first electronic communication derived at least in part from representations of previous electronic communications from a plurality of user profiles stored in the communication profile database which are similar to the second communication profile. The processor may be trained on large-scale data mixed with prior communication and effective communications from the plurality of user profiles. The processor may use at least one of a machine learning language model or a statistical algorithm to transform the first electronic communication. The transformed first electronic communication may be used to generate an updated second communication profile. The updated second communication profile may be used to predict a most likely modification outcome in a second electronic communication. Transformation data may be extracted from the transformation to the first electronic communication, wherein the transformation data is used to train a language model used by the processor.

In embodiments, a computer-implemented method for modifying a transmitted communication through a graphical user interface may include: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; displaying the first electronic communication within a graphical user interface on a screen of a computing device of the first user, wherein the displaying the first electronic communication comprises displaying the communication content and displaying a communication transformation query directed to the first user to determine if the first electronic communication should be transformed and resent; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and transmitting the modified electronic communication to the second electronic identifier.

In embodiments, the processor may transform the first electronic communication derived at least in part from representations of previous electronic communications from a plurality of user profiles stored in the communication profile database which are similar to the second communication profile. The processor may be trained on large-scale data mixed with prior communication and effective communications from the plurality of user profiles. The processor may use at least one of a machine learning language model or a statistical algorithm to transform the first electronic communication. The transformed first electronic communication may be used to generate an updated second communication profile. The updated second communication profile may be used to predict a most likely modification outcome in a second electronic communication. Transformation data may be extracted from the transformation to the first electronic communication, wherein the transformation data is used to train a language model used by the processor.

In embodiments, a computer-implemented method for modifying a transmitted communication through a graphical user interface may include: intercepting a first electronic communication from further transmission at an artificial intelligence assistant computing facility wherein, the first electronic communication was transmitted from a first electronic identifier associated with a first user to a second electronic identifier associated with a second user, the electronic communication comprising a communication content and comprising or associated with the first electronic identifier associated with the first user; retrieving a communication profile for a user using the second electronic identifier, wherein the communication profile comprises a second user communication attribute that identifies a receiving communication preference; processing the first electronic communication with a processor; displaying the first electronic communication within a graphical user interface on a screen of a second computing device of the second user; displaying a communication transformation query directed to the second user; receiving a communication transformation indication from a first computing device of the first user that directs the processor to transform the electronic communication to a modified electronic communication; and displaying the modified electronic communication within the graphical user interface on the screen of the second computing device.

In embodiments, a computer-implemented method for modifying a transmitted communication through a graphical user interface may include: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; retrieving a communication profile for the second user using the second electronic identifier, wherein the communication profile comprises a second user communication attribute that identifies a receiving communication preference; processing the first electronic communication with a processor; displaying the first electronic communication within a graphical user interface on a screen of a computing device of the first user; displaying a communication transformation query directed to the first user to determine if the first electronic communication should be transformed and resent; receiving a communication transformation indication from the computing device that directs the processor to transform the first electronic communication to a modified electronic communication; and transmitting the modified electronic communication to the second electronic identifier.

In embodiments, a system may include a server computer comprising a processor and a computer-readable storage device that stores instructions that, when executed by the processor, cause the processor to perform operations including: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; displaying the first electronic communication within a graphical user interface on a screen of a computing device of the second user, wherein the displaying the first electronic communication comprises displaying the communication content and displaying a communication transformation query directed to the second user to determine if the first electronic communication should be transformed; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and displaying the modified electronic communication within the graphical user interface on the screen of the computing device.

In embodiments, a system may include a server computer comprising a processor and a computer-readable storage device that stores instructions that, when executed by the processor, cause the processor to perform operations including: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; displaying the first electronic communication within a graphical user interface on a screen of a computing device of the first user, wherein the displaying the first electronic communication comprises displaying the communication content and displaying a communication transformation query directed to the first user to determine if the first electronic communication should be transformed and resent; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and transmitting the modified electronic communication to the second electronic identifier.

In embodiments, a system may include a server computer comprising a processor and a computer-readable storage device that stores instructions that, when executed by the processor, cause the processor to perform operations including: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; retrieving from a communication profile database a communication profile for the second user using the second electronic identifier, wherein the communication profile comprises a second user communication attribute that identifies a receiving communication preference; processing the first electronic communication with a processor; displaying the first electronic communication within a graphical user interface on a screen of a second computing device of the second user; displaying a communication transformation query directed to the second user; receiving a communication transformation indication from a first computing device of the first user that directs the processor to transform the first electronic communication to a modified electronic communication; and displaying the modified electronic communication within the graphical user interface on the screen of the second computing device.

In embodiments, a system may include a server computer comprising a processor and a computer-readable storage device that stores instructions that, when executed by the processor, cause the processor to perform operations including: intercepting a first electronic communication from further transmission at an artificial intelligence assistant computing facility, wherein the first electronic communication was transmitted from a first electronic identifier associated with a first user to a second electronic identifier associated with a second user, the first electronic communication comprising a communication content and comprising or associated with the first electronic identifier associated with the first user; retrieving a communication profile for the second user using the second electronic identifier, wherein the communication profile comprises a second user communication attribute that identifies a receiving communication preference; processing the first electronic communication with a processor; displaying the first electronic communication within a graphical user interface on a screen of a computing device of the first user; displaying a communication transformation query directed to the first user to determine if the first electronic communication should be transformed and resent; receiving a communication transformation indication from the computing device that directs the processor to transform the first electronic communication to a modified electronic communication; and transmitting the modified electronic communication to the second electronic identifier.

In embodiments, a computer-implemented method for modifying an incoming communication through a graphical user interface may include: receiving a first electronic communication at an artificial intelligence assistant computing facility, wherein the first electronic communication is associated with a first electronic identifier associated with a first user and directed to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; presenting the first electronic communication through an electronic communication link within a graphical user interface on a screen of a computing device of the second user, wherein the first electronic communication comprises displaying the communication content and displaying a communication transformation query directed to the second user to determine if the first electronic communication should be transformed; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and presenting the modified electronic communication through the electronic communication link within the graphical user interface on the screen of the computing device of the second user.

In embodiments, a computer-implemented method for modifying an incoming communication through a graphical user interface may include: receiving a first electronic communication at an artificial intelligence assistant computing facility, wherein the first electronic communication is associated with a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; presenting the first electronic communication through an electronic communication link within a graphical user interface on a screen of a computing device of the first user, wherein the first electronic communication comprises displaying the communication content and displaying a communication transformation query directed to the first user to determine if the first electronic communication should be transformed and resent; receiving a communication transformation indication from the computing device of the first user that directs the processor to transform the first electronic communication to a modified electronic communication that is a modified version of the first electronic communication, wherein the processor uses at least one of input from the first user, the communication content, or the second user communication attribute to transform the first electronic communication; and presenting the modified electronic communication through the electronic communication link to the second electronic identifier.

In embodiments, a computer-implemented method for modifying an incoming communication through a graphical user interface may include: receiving a first electronic communication at an artificial intelligence assistant computing facility, wherein the first electronic communication is associated with a first electronic identifier associated with a first user and directed to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier; processing the encoded first electronic communication with a processor; presenting the first electronic communication through an electronic communication link within a graphical user interface on a screen of a computing device of the second user; receiving a communication transformation indication from the computing device that directs the processor to transform the first electronic communication to a modified electronic communication that is a modified version of the first electronic communication; and presenting the modified electronic communication through the electronic communication link within the graphical user interface on the screen of the computing device of the second user.

In embodiments, a computer-implemented method for modifying an incoming communication through a graphical user interface may include: receiving a first electronic communication at an artificial intelligence assistant computing facility, wherein the first electronic communication is associated with a first electronic identifier associated with a first user to a second electronic identifier associated with a second user, the first electronic communication comprising a communication content and comprising or associated with the first electronic identifier associated with the first user; retrieving a second communication profile for the second user using the second electronic identifier, wherein the second communication profile comprises a second user communication attribute that identifies a receiving communication preference; processing the first electronic communication with a processor; presenting the first electronic communication through an electronic communication link within a graphical user interface on a screen of a computing device of the first user; receiving a communication transformation indication from the computing device of the first user that directs the processor to transform the first electronic communication to a modified electronic communication that is a modified version of the first electronic communication; and presenting the modified electronic communication through the electronic communication link to the second electronic identifier.

In embodiments, a system may include a server computer comprising a processor and a computer-readable storage device that stores instructions that, when executed by the processor, cause the processor to perform operations including: receiving a first electronic communication at an artificial intelligence assistant computing facility, wherein the first electronic communication is associated with a first electronic identifier associated with a first user and directed to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; presenting the first electronic communication through an electronic communication link within a graphical user interface on a screen of a computing device of the second user, wherein the first electronic communication comprises displaying the communication content and displaying a communication transformation query directed to the second user to determine if the first electronic communication should be transformed; receiving a communication transformation indication from the computing device that directs the processor to transform the first electronic communication to a modified electronic communication that is a modified version of the first electronic communication, wherein the processor uses the communication content and the second user communication attribute to transform the first electronic communication; and presenting the modified electronic communication through the electronic communication link within the graphical user interface on the screen of the computing device of the second user.

In embodiments, a system may include a server computer comprising a processor and a computer-readable storage device that stores instructions that, when executed by the processor, cause the processor to perform operations including: receiving a first electronic communication at an artificial intelligence assistant computing facility, wherein the first electronic communication is associated with a first electronic identifier associated with a first user to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier, wherein the second communication profile comprises a second user communication attribute that identifies a receiving communication preference; processing the encoded first electronic communication with a processor; presenting the first electronic communication through an electronic communication link within a graphical user interface on a screen of a computing device of the first user, wherein the first electronic communication comprises displaying the communication content and displaying a communication transformation query directed to the first user to determine if the first electronic communication should be transformed and resent; receiving a communication transformation indication from the computing device of the first user that directs the processor to transform the first electronic communication to a modified electronic communication that is a modified version of the first electronic communication, wherein the processor uses at least one of input from the first user, the communication content, or the second user communication attribute to transform the first electronic communication; and presenting the modified electronic communication through the electronic communication link to the second electronic identifier.

In embodiments, a system may include a server computer comprising a processor and a computer-readable storage device that stores instructions that, when executed by the processor, cause the processor to perform operations including: receiving a first electronic communication at an artificial intelligence assistant computing facility, wherein the first electronic communication is associated with a first electronic identifier associated with a first user and directed to a second electronic identifier associated with a second user, the first electronic communication comprising a communication content and comprising or associated with the first electronic identifier associated with the first user; encoding the first electronic communication for processing creating an encoded first electronic communication; retrieving from a communication profile database a second communication profile for the second user using the second electronic identifier; processing the encoded first electronic communication with a processor; presenting the first electronic communication through an electronic communication link within a graphical user interface on a screen of a computing device of the second user; receiving a communication transformation indication from the computing device that directs the processor to transform the first electronic communication to a modified electronic communication that is a modified version of the first electronic communication; and presenting the modified electronic communication through the electronic communication link within the graphical user interface on the screen of the computing device of the second user.

In embodiments, a system may include a server computer comprising a processor and a computer-readable storage device that stores instructions that, when executed by the processor, cause the processor to perform operations including: receiving a first electronic communication at an artificial intelligence assistant computing facility, wherein the first electronic communication is associated with a first electronic identifier associated with a first user to a second electronic identifier associated with a second user, the first electronic communication comprising a communication content and comprising or associated with the first electronic identifier associated with the first user; retrieving a second communication profile for the second user using the second electronic identifier, wherein the second communication profile comprises a second user communication attribute that identifies a receiving communication preference; processing the first electronic communication with a processor; presenting the first electronic communication through an electronic communication link within a graphical user interface on a screen of a computing device of the first user; receiving a communication transformation indication from the computing device of the first user that directs the processor to transform the first electronic communication to a modified electronic communication that is a modified version of the first electronic communication; and presenting the modified electronic communication through the electronic communication link to the second electronic identifier.

In any system or method embodiments described herein, the system or method may further include any of the described features, such as, but not limited to, transmitting the changed electronic communication to the first electronic identifier associated with the first user, and/or transmitting the changed electronic communication to the second electronic identifier associated with the second user. The compositional change may be derived from representations of previous content and context from a plurality of user profiles stored in the communication profile database which are similar to at least one of the first communication profile or the second communication profile. The processor may be trained on large-scale data mixed with prior communication and effective communications from the plurality of user profiles. The processor may use at least one of a machine learning model, deep learning model, or other statistical learning algorithm for creating the compositional change. The compositional change may be an auto-generated textual completion; the auto-generated textual completion may be a phrasal completion, and the processor may generate the compositional change by optimizing generated language as determined by the processor from the second user communication attribute. The processor may generate the compositional change by replicating a communication style of the first user as determined by the processor from the first user communication attribute. The partial electronic communication may include a communication goal, and the processor may generate the compositional change by optimizing for impact and effectiveness of generated language with respect to the communication goal. The processor may generate the compositional change further using a communication template selected from a plurality of communication templates comprising at least one of prepared text or placeholder locations for defining structural elements for user completion. The processor may select the communication template using at least one of a machine learning model, deep learning model, or statistical learning model to find a most effective communication template based at least in part on the communication content. The plurality of communication templates may include at least one automatically generated template generated by the processor. The processor may select the communication template by using a machine learning model, deep learning model, or statistical learning algorithm to score the plurality of communication templates based at least in part on the communication content, communication context, first user communication attribute, or second user communication attribute, communication context, first user communication attribute, or second user communication attribute.

BRIEF DESCRIPTION OF THE DRAWINGS

The drawings illustrate generally, by way of example, but not by way of limitation, a detailed description of certain embodiments discussed in the present document.

FIG. 2 illustrates a functional flow diagram of an artificial intelligent assistant according to exemplary and non-limiting embodiments.

DETAILED DESCRIPTION

Figure 1:
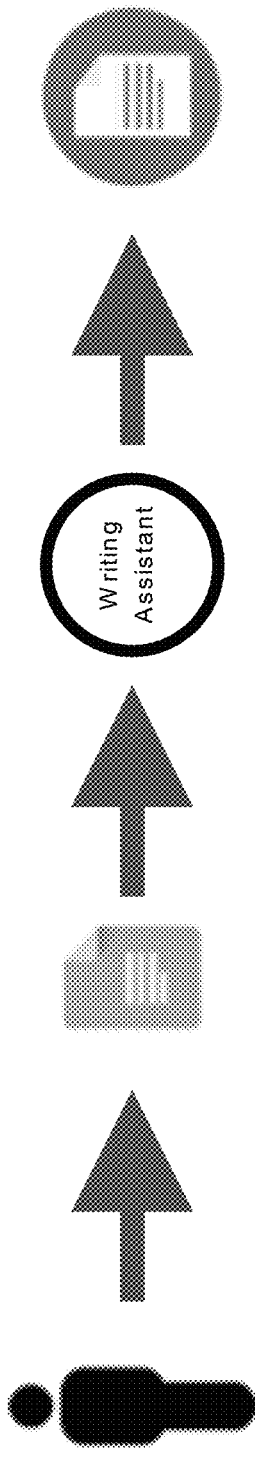
FIG. 1 depicts a prior art example of a writing assistant.

Effective communication requires much more than corrections to spelling and grammar. It requires attention to the audience of the communication as well as to context surrounding the conversation. Therefore, in order to increase the effectiveness of communications, a writing assistant needs to incorporate an intelligent facility. The present disclosure describes an artificial intelligent assistant (AIA), which is able to utilize information about the participants and the surrounding context and other environments to generate more effective communications. The AIA thus provides a valuable facility to users in communication amongst a diverse population.

A communication may be understood to be a communicative act between entities, such as between a user as a sender and a user as receiver, where there is content and context associated with the communication. Although embodiments herein describe communications between two users, such as from a user as a sender and a second user as a receiver, communications described herein should also be understood to encompass embodiments where communications are sent from a user or group or audience, published from a user to a group or audience (e.g., where something is not sent directly but published or posted online, such as including when it may visible to anybody but is intended and/or optimized for a specific audience), between a group of user senders (e.g., sharing the creation of a communication) and a user receiver, and between multiple users and a group or audience. Users may also be administrators or other individuals that provide services for another user (e.g., administrating or aiding in communications of individuals, helping to create and maintain user profiles, and the like). Users may also be a computing entity, such as computing platform, a software agent, a bot, an online page, a webpage, and the like. Users have certain goals, intentions and meaning that they try to convey through content. A users' ability to express those in content accurately and in a way that a specific receiver or audience would understand is limited, and receivers perceive the content with distortions and can react to it in different ways (e.g., actions, inactions, responses, emotions, conclusions, and the like). Receivers' ability to recover the meaning intended by the user is limited. Content can be classified into communication types and can take different formats and forms. A larger context may include the use case, user intents and goals, the environment (e.g., communication channel, platform, conditions, and the like), the current state of the parties (e.g., availability, emotional state, or physical state, such as whether they're a hurry, in commute, on vacation, under stress, tired, happy, upset, and the like), implicit or unconscious signals (e.g., tone, pauses, and the like), prior communication history (e.g., previous communications in the same thread, previous threads involving the same users, and the like), knowledge of the parties (e.g., who they are, their schedules, and the like), general world knowledge (e.g., recent news, public facts, and the like), and the like.

The AIA may have access to user information through a user communication profile (e.g., knowledge of the user), receiver communication profile (e.g. knowledge of the receiver(s), group profiles, and/or target audience profiles, where profiles may include information pertaining to professional vs. informal communication styles, communication preferences, native language, emotional characteristics, and the like), goals (e.g., knowledge of what the user wants to accomplish, and the like), communication history (e.g., prior communication (e.g., email thread, conversation, and the like), shared documents, current state of user (e.g., emotions, focused or distracted, and the like), relationship between them, environment (e.g., home, office, or commute, and the like), past communications, shared context (e.g., current news, pop culture, and the like), individual context (e.g., vocabulary, emotions, and the like), modes of communication (e.g., email history, digital history, or chats), survey information, and the like), reactions to previous or similar communications, world knowledge (e.g., concepts and relations, logic, facts, current news and events, pop culture, and the like), modality (e.g., communications channels available, such as email, texting, voice, video, augmented reality, virtual reality, and the like), may be utilized to modify a user's communication, either directly (e.g., making or providing explicit options for changes to a communication) or indirectly (e.g., prompting the user for ways to improve the communication). Although the present disclosure applies the AIA to improvements of a user's communication, the AIA may similarly be applied to improving a receiver's communications, such as re-writing incoming communications for them in a way that they prefer or understand.

The AIA may help to optimize a communication for a specific receiver or group of receivers, assist in a real-time conversation, support multiple modalities of language and communication, be adaptive to individual users, learn over time based on how participants communicate, and the like. The AIA may be continuously updated, have access and insights about individuals and groups that a user has never communicated with, and have the ability to perform in real-time. The AIA, with access to a wide range of continuously updated data and modeled communication behavior, may be enabled with an automated means of determining perception and predicting reaction of a receiver, where the system is able to learn the patterns it observes in the interactions between participants to predict how a specific communication will be perceived and reacted to. In embodiments, prediction of perception and reaction of a receiver may be enabled through models of language effectiveness and/or impact, as described herein, including general, group-domain specific, and receiver-specific modeling, such as trained on a corpus of previously observed communications and reactions.

The AIA may suggest changes related to communication structure, language, style, and the like, that relate to a specific receiver, group of receivers, or broad audience. The AIA may suggest recomposing or rewriting a communication based on a goal, context, communication style of a user, prior communication that achieved similar goals and effects, and the like, such as stored in a user communication profile. The AIA may provide assistance during a real-time dialog, such as on a display of a computing device while a conversation is ongoing (e.g., displaying feedback to the user during a texting exchange, providing audio prompting (e.g., via a speaker in the user's ear), providing haptic feedback during a conversation on a smart phone or augmented reality glasses, and the like). In embodiments, the AIA may be able to provide iterative real-time feedback that is visible to the user as a sender but not to the receiver, taking the reaction to the previous communication as additional input.

FIG. 2 illustrates an AIA communication system model, where a user generates a communication as an input to the MA, such as a written electronic text (e.g., email, text message, document, and the like), voice communication (e.g., voice input to a telecommunications system), and the like. The MA receives and processes the communication input with respect to a user communication profile, receiver communication profile, goals, context, world knowledge, and modality, and generates an output in the form of a modified communication or feedback to the user that is directed at optimizing the effectiveness, clarity, and correctness of the communication. Input and training data to the system may also consider the current communication (e.g., a draft communication), revisions of communications, targets for a communication (e.g., goal, intended impact, audience, desired style, and the like), 'lookalike' communications (e.g., similar communications between similar parties in the past that are predictive to the current communication, and the like), context (e.g., domain, topic, type of communication, prior communication history, user emotional state, and the like), user's communication profile (e.g., user's preferred style, user's vocabulary, user's proficiency, and the like), receiver's communication profile, relationship between users, communication constraints (e.g., time, length, medium, and the like), world knowledge, domain knowledge, shared documents between users, reaction to previous communication (e.g., textual response, verbal response, video recorded body language (e.g., posture), and the like), geography with respect to language (e.g., different spellings, different idioms, and the like) and usage combined with geography to determine a language variation (e.g., U.S. vs. Australia or dialect (e.g., different regions within a country)), geography with respect to context (e.g., service representative providing feedback to a customer with respect to geography in order to incorporate 'relatedness' into a communication), information from wearable devices (e.g., biosensors, cameras, microphones, and the like), and the like.

The AIA may utilize user communication profiles in the process of optimizing a communication, where communication profiles contain properties and communication preferences of users. A communication profile may be described as a set of characteristics, traits, features, and the like, that can be used to characterize and represent an individual either independently or to cluster them as part of a larger cohort. Communication profiles may be records consisting of at least one property expressing characteristics related to communication, such as language proficiency, vocabulary, style, topics, preferences, reactions, behavior, and the like. Communication profiles may change over time (e.g., with respect to vocabulary, language proficiency, triggers, interaction preferences, and the like). A communication profile of a person can be learned and updated by analyzing their outgoing communication and reactions to incoming communication, by asking them questions, having them fill in some of the profile properties, by using communication profiles of similar users as an approximation, and the like. Communication profiles of groups of users or larger audiences can be formed by aggregating individual profiles or by getting statistics on communication with a certain group/audience.

Profiles may be associated with certain communication parties (e.g., entities that can be senders or receivers). These may be individuals, clusters of individuals with similar socio-demographic or psychological properties, clusters of individuals with similar communication profile properties (e.g., similar vocabulary, topics, style, communication preferences, behavior, and the like), groups of connected individuals (e.g., coworkers within one team sharing a certain context), larger populations (e.g., children audience, non-native English speakers, clusters of individuals with similar socio-demographic or psychological properties, clusters of individuals with similar communication profiles, groups of connected individuals (e.g., teams), audiences/audience types, and the like). Communication profiles may contain records. Records of communication parties may include their socio-demographic and psychological properties, descriptions and properties that define or unify a group, and the like. Individuals may belong to multiple clusters, groups, and audiences, such as native English speakers, IT professionals, teenagers, certain geographies, and the like. Individuals may be connected as a graph with links denoting familiarity level and types of relationships. Familiarity may be initiated and updated based on the frequency of observed communication and its tone, among other signals. Relationship may be specified by users or inferred by the AIA from observed communication between them.

Profiles may include properties such as language proficiency level, native language, characteristics of the party's communication such as vocabulary (e.g., word lists with frequencies) and frequently used phrases (e.g., word and phrase frequency counters updated on each communication session processed by the system by extracting most frequent collocations and language patterns), other characteristics of writing/speech, such as style, structure (e.g., including vector representation of a sample of writing, individual language models, frequency counters on different aspects of style, structure, tone, and the like), topics (e.g., list of topics with frequency counters updated on each communication session processed and/or classified by the system), negative and positive triggers (e.g., specified by the user or inferred from observed reactions), communication behaviors and preferences (e.g., activity hours, time to respond, communication channels, low-context vs. high-context, verbose vs. concise, emotions vs. facts, format (e.g., plain-rich, short-long, bullets-prose, and the like), and the like. Triggers may be communication elements or characteristics (e.g., words, phrases, errors, topics, formatting, and the like) that an individual or members of a group consistently like or dislike. Triggers may cause strong emotions. Negative triggers carry the risk of tension or conflicts in communication.

The AIA may learn communication properties directly from a user (e.g., through surveys, prompts to fill in properties or state preferences), by observing and analyzing their communication, by analyzing/processing their reactions to incoming communications. For instance, communication parties may inherit the properties of groups or audiences to which they belong. Properties of more granular parties may override the equivalent properties of (e.g., larger) groups or audiences. Communication profiles may include reaction data, such as in a corpus of communications and documents (e.g., original or vector representations) and the corresponding reactions from different communication parties (e.g., used to train AIA to predict reactions of a receiver). Profiles may be initialized with user input through surveys, iterative questions, by analyzing records of prior communication, and the like. In embodiments, communication profiles of the receivers who do not have an existing communication profile in the system (e.g., not a registered user of AIA) may be have a communication profile generated in runtime and not stored persistently or stored in de-identified clusters.

Data sources for communication profiles may include results of researching characteristics of certain populations, user surveys, explicitly stated user preference (e.g., filled-in part of the profile), observed outgoing communication (e.g., sampling aggregated representation, data extracted through analysis/inference, observed communication behavior (e.g., schedule, channels, and the like), observed reactions to incoming communications (e.g., responses, actions/inactions, and the like), data from biometric sensors (e.g., to track the current state, emotional reactions to various communication, and the like), integrations with other systems holding relevant data, and the like.

Communication profiles may be taken from public and private sources, such as from databases, academic datasets, demographic information (can be inferred by joining the different DBs), psychological profiles, author profiling, usage guidelines, relevant data sets (e.g., psychological profiles, demographic data, social media status updates), and the like. Communication profile collections and usage may utilize various methods such as authorship attribution (e.g., word distribution from social media), clustering, deep learning (e.g., language modeling, author vectors, comparison, and the like), text classification (e.g., with respect to gender), authorship score calculation, author profiling, user profiles (e.g., from e-commerce, social media, articles, and the like), user embeddings (e.g., factor adaption, user content, user type embeddings, and the like), personalized natural language processing, personality assessment, linguistic homophily, linguistic style, and the like.

Communication profiles may include information about the user of communications, such as their age, gender, race and ethnicity, professional concentration, occupation, past employment, current employment, workplace hierarchy and dynamics, residential geographic location, professional/work geographic location, current geographic location, geographic location of origin (e.g., home country, city, nationhood), primary and secondary communication languages, religious heritage, religious views, political views, personal preferences, social hierarchy dynamics, personal psychological type (e.g., neuroticism, extraversion, openness, agreeableness, conscientiousness, and the like), personal human values (e.g., self-transcendence, self-enhancement, conservation, openness-to-change, hedonism, and the like), Meyers-Briggs Type Indicator (MBTI), cognitive style(s), contextual emotional states (e.g., under what conditions the individual experiences general positive emotions, optimism, general negative emotions, depression, anxiety, anger, and the like), and the like.

Communication profiles may include an individual's lexical writing features, such as lexical features at the character-level (e.g., character n-grams (e.g., labeled char-n-grams), percent of characters per document (e.g., ratios between upper case characters, emoticons, periods, ellipses, return characters, commas, parentheses, exclamations, colons, digits, semicolons, hyphens and quotation marks and the total number of characters in a communication, and the like), at the character-level (e.g., number of words, mean number of characters per word, mean number of characters per word, and the like), at the sentence-level (e.g., mean number of words per sentence, standard deviation of words per sentence, difference between the maximum and minimum number of words per sentence), emoticons (e.g., number of emoticons, number of emotions per word, sentence, document, and the like), special characters (e.g., '$', '%', '@', and the like), vocabulary richness (e.g., percentage of distinct words, type-token ratio, hapax legomena, Yule's K, dis legomena, and the like), readability (e.g., metrics (e.g., Flesch-Kincaid metric), word length distribution (e.g., word-lengths per sentence, email selection, document, and the like), sentence length distribution (e.g., sentence-length per email selection, or document)), and the like.

Communication profiles may include an individual's syntactic features, such as parts of speech (POS) features (e.g., POS n-grams (e.g., fine-grained and coarse-grained), relative frequency of comparative and superlative adjectives and adverbs, relative frequency of the present and past tenses, phrase structure of general grammatical categories (e.g., noun-phrase, verb-phrase, and the like)), dependency features (e.g., frequency of each individual dependency relation per sentence, percent of modifier relations used per tree, frequency of adverbial dependencies (e.g., providing information on manner, direction, purpose, and the like), ratio of modal verbs with respect to the total number of verbs, percent of verbs that appear in complex tenses referred to as "verb chains" (VCs)), tree features (e.g., tree width, tree depth, branching factor (e.g., mean number of children per level)), function words, filler words, stop-words, punctuation, formality, and the like.

Communication profiles may include an individual's discourse features. For instance, to obtain a discourse structure, the system may use a discourse parser, which receives as input a raw text, divides it into elementary discourse units (EDUs) and links them via discourse relations that follow a rhetorical structure. The system may then compute the frequency of each discourse relation per EDU (e.g., dividing the number of occurrences of each discourse relation by the number of EDUs per text). The system may also determine the shape of the discourse trees (e.g., with respect to depth, width, branching factor, and the like), ratios of discourse markers, interjections, abbreviations, curse words, polar words (e.g., positive and negative words in polarity dictionaries with respect to the total number of words in a text), and the like.

Communication profiles may include an individual's idiosyncratic features, such as spelling errors, syntactically classified punctuation (e.g., end-of-sentence period, comma separating main and dependent clauses, comma in list, and the like), grammatical errors, (e.g., sentence fragments, run-on sentences, subject-verb mismatch, repeated words, missing word errors, all-caps words, abbreviated words, letter inversions, only one of doubled letters, repeated letters, missing hyphen, wrong singular/plural, wrong tense, wrong verb form, wrong article, wrong preposition, repeated non-letter/non-numeric characters (e.g., ???, or !!!), and the like.

Communication profiles may include an individual's communicative structural features, such as at the communication-level (e.g., has greeting, signature, URL, quoted content, body length, subject length, and the like), paragraph-level (e.g., mean number of paragraphs per email, paragraph lengths, mean number of sentences per paragraph, mean number of words per paragraph, and the like), in technical structure (e.g., attachments, fonts, use of images, and the like), and the like.

Communication profiles may include information about what a user may write, such as the results of statistical analysis of the user's content (e.g., word n-grams, word and document embeddings, term frequency—inverse document frequency (tf-idf), acronyms, first-person pronouns, slangs, leetspeak (e.g., 133t, pwn3d, and the like), emoji, dictionaries, use of stock phrases (e.g., idiomatic expressions, metaphors, support verb constructions, names of persons, locations, and other entities, dates, domain-based technical terms (e.g., academic, legal, medical, scientific, administrative, and the like).

Communication profiles may be constantly updated, such as with respect to communications between participants, documents that the user generates or edits, writing style, errors encountered, previously stated goals, business associations, preferences, and the like. User communication profiles may then be used by the AIA to help modify new communications based on the latest information available for the user(s).

Communication profiles may include representations of typical reactions and interactions extracted from communications, such as information extracted from previous responses (e.g., using sentiment analysis and other natural language tools), extracted non-verbal reactions from speech and/or video (e.g., tone, facial expressions, posture, and the like), received interactions with other systems (e.g., views, clicks, reaction time, and the like), inputs explicitly reported by a user (e.g., in the setup or update of a communication profile, through a survey, use of emoji, and the like), inputs reported by a user (e.g., through a product survey), lookalike communications, and the like.

Communication profile data may be used in training data for transformation processes. In addition to data associated with the content of communications, other factors may be considered. For example, a video stream of a receiver may be evaluated for body language during a video-call, capturing the gesture and posture of the receiver. For instance, this data may be correlated to geographic location in order to account for different body language for different countries/cultures, where the information about geography is mapped to the posture in a reaction (e.g., posture mapping to anger or acknowledgment).

In embodiments, when a communication is addressed to a plurality of receivers, the communication profiles for those targeted receivers may be used individually to generate unique communications by the AIA for each receiver, to generate a single audience targeted communication, or a combination of individual and group targeted communications. In embodiments, the user may be able to specify how a plurality of individuals in a targeted audience population is to be communicated with, such as individually or as a group. For instance, the user may generate a single communication, but intends it to be transmitted to an audience of ten individuals, where three may be targeted for individual communications and the rest targeted for a group communication. The individual communications may utilize the receiver's individual communication profiles to process the user's communication into unique communications, and the rest of the communication profiles may be used to generate some 'average' response (e.g., a weighted averaging of receiver characteristics from the group's communication profiles) from the user's communication. The AIA may enable the user to generate a single communication that is customized per the target audience.

Figure 3:
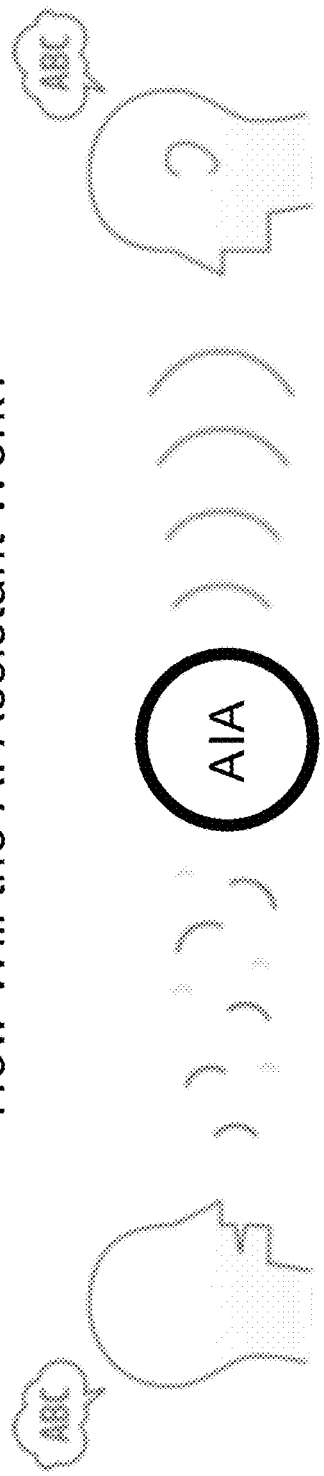
FIG. 3 illustrates aspects of an artificial intelligent assistant according to exemplary and non-limiting embodiments.

The AIA may utilize communication profiles to transfer meaning to a user communication. As illustrated in FIG. 3, a user, generating a communication, may interact with the AIA, and the AIA may in turn access the user's communication profile in addition to the receiver's communication profile. Communication profiles may comprise characteristics such as writing style, speaking style, communicative emotions employed in past communications, vocabulary usage, the user's native language, contextual information, and the like. This information from users may then be used by the AIA to predict perception related to how the communication could be received; provide editing suggestions, composition suggestions, and coaching; assess how goals may be met; how lookalike communications (e.g., templates) may be used to compose a new communication; and the like. The AIA may assist the user in composing communications that transfer meaning to the receiver as intended. The process may begin with the AIA processing and determining the user's goals, communication draft and key points, processing and incorporating the user's communication profiles, structuring a communication to achieve a goal, determining the best structure and tone to meet the goals, and the like. For instance, the AIA may add a clarifying point to a communication based on email history and context of the receiver, use language and style that relates with the receiver, change the tone of an emotionally charged communication so it's less likely to offend the receiver, use a different word the receiver will understand, make the text written by a non-native speaker less idiomatic, and the like.

In embodiments, the AIA may operate on a plurality of computer-based platforms, such as on laptop/desktop computers (e.g., native applications, editor integrations, and the like), Web (e.g., standalone, browser extension, and the like), mobile computing devices (e.g., smart phone, tablet, and the like), augmented or virtual reality glasses, home and office interactive assistant augmentation, video conferencing, voice assistance, wearables, and the like. The AIA's ability to imbibe information, context, and global knowledge into a communication may be applied to a great diversity of applications, including personal and professional communications (e.g. adapting to different genres, styles, formalities, and the like), individual and group communications (e.g., targeting individuals, groups, or a combination of individuals and groups, and the like), real-time conversational assistance (e.g., aiding a user during a live conversation), interactive communication generation (e.g., aiding the user in drafting an email or text prior to sending), entertainment (e.g., applying a humor filter to a communication), business services (e.g., modifying a communication with a client), and the like. For example, the AIA may help a user generate a communication through an interactive exchange, where the AIA interjects feedback associated with different target audience characteristics (e.g., composing an email to your mother, versus to a friend or professional associate). In another example, the AIA may aid a user during a conversation, such as during a voice conversation or a text exchange (e.g., where the AIA provides feedback during the conversation on a smart phone through a displayed dialog box, on a pair of augmented reality glasses, and the like). The MA may also be applied to entertainment. For example, a user may want to add a personal anecdote (e.g., to lighten the tone of the communication) or turn a benign communication into a funny one (e.g., applying a humor filter, such as in a similar fashion as people applying a humor filter to a photo).

The AIA may be applied to a plurality of use-cases, such as for grammar and fluency correction, clarity and effectiveness in combination with context and communication profiles, improving human-computer interaction effectiveness, augmenting outgoing voice and video messages, augmenting conversations, augmenting incoming communications, providing communication analytics and coaching, providing conversational agent modality, and the like.

The AIA may be able to predict the reaction of a receiver, such as alerting the user if a communication doesn't match the target receiver's preferences and suggest revisions. Given a communication and a goal or desired reaction (e.g., where the goal is to entertain, where the target reaction is to produce a smile or a laugh, and the like) the system may predict whether the communication is likely to cause this reaction, based on the corresponding component of the receiver's communication profile (e.g., what he or she tends to find entertaining). Then the AIA may generate revisions that make the communication more likely to spark the desired reaction (i.e., make it more similar to other communications that the system has seen that triggered a similar reaction from this specific receiver or group). Once the communication has been sent and a response has been received, the MA may help the user understand a particular reaction, such as detecting tone and other non-verbal signals in the incoming communication, generate advice on how to reinforce desirable reaction and mitigate an undesirable reaction, and the like. The AIA may utilize or generate a communication template given the goal and context of a communication, such as based on patterns learned from other communications with the same goal and similar context that the system has seen, or suggest a communication format and modality based on the goals, context, and communication profile of the receiver, such as converting the communication into a different modality, picking a delivery channel, and the like.

In embodiments, the AIA may improve human-computer interaction effectiveness, such as with an API for a third-party system that allows rewriting an automatically generated communication to look more like it was drafted by a human or appealing to a given target audience or receiver, and effective for a given goal. AIA may customize the communication for each receiver based on their communication profiles and select an appropriate delivery channel, such as based on an automatically generated communication with context, goals, a list of receivers and the like.

In embodiments, the AIA may provide communication analytics and coaching. For instance, the AIA may provide coaching based on observed communication, where the system generates personalized advice on what the user could do to improve communication and be more effective or productive (e.g., develop active listening or non-violent communication skills, expand vocabulary, brush up on grammar, be more concise, improve pronunciation, speak slower, use questions instead of directives, limit social media use, and the like), avoid common mistakes the user typically makes (e.g., in order to gradually reduce repetitive errors or behavior), and the like. The AIA may capture not only outgoing communication or conversations but also consumed information, such as using a camera or microphone feed from a wearable device, such as on smart glasses, analyze the receiver's reactions to various content and conversations using data from sensors, such as wearable and biosensors (e.g., temporal data, and the like), and use this to build or augment the receiver's communication profile and for communication coaching. Coaching may be provided in real-time, as feedback, provided off-line, and the like. In embodiments, this information may also be used as training data for communication models.

In embodiments, the AIA may provide a facility for conversational agent modality, where the AIA may vary the type of interaction system utilized. For instance, a "highlight and suggest" interaction may be utilized, or the AIA may rewrite a sentence or passage given different constraints (e.g., goals, proofing, clarity, effectiveness, and the like), or in a 'more forward thinking' mode, where the system chats with the user to work with them interactively to improve their communication, such as a friend or tutor would. For example, a user may generate a message, and receive an interactive dialog, such as "Hi! I've read your communication and have some tips! Your grammar is fine, but I am concerned about organization. Can we start?" Once the user agrees, the AIA may provide guidance and dialog, such as "I've highlighted what I believe is the thesis statement of your message. I think this would make more sense moved up. Let me show you."

The AIA may provide a host of messaging improvement facilities, where any number of them may be utilized and combined. For example, a user may utilize the AIA to write an email for applying for a job. The person may write a first pass email and then the AIA chooses the best modality to give them feedback. Maybe the user is a proficient writer and can look at comments made on the side, maybe the user is embarking on their first job search and the AIA may select a "conversational agent" mode and walk the user through why certain things should be changed and what is good, and why. With a modality selected, such as for "automatic rewrite", AIA may review the draft, use language modules to check for grammatical errors, recognize that the goal of the email is to impress the receiver (e.g., a hiring manager), and elect to transform the text into a more formal style. The AIA may access receiver communication profiles and determine that the receiver likes a certain pop culture reference and likes attachments in PDFs, so a subtle reference to a popular movie is slipped into the cover letter and the cover letter is converted from a word processing format into a PDF format. In addition, given the goal, the AIA may make sure to open the email with some ebullience to show that the user is really interested in the job and pulls content from their cover letter that would back up their enthusiasm for the job. For example, if they were applying for a job in a particular company, the system may pull out an internship at that company from last summer and use that as an example. The system may also check for missing information, such as a signature at the bottom of the email and phone number where they can be reached. In this interchange, the AIA may utilize a number of communication improvement facilities in combination, such as modality selection, proofreading, effectiveness, style transformation (e.g., includes vocabulary shifting), goal detection and optimization, receiver communication profile scanning (e.g., inclusion of pop culture reference, affinity for a certain file format, and the like), effectiveness (e.g., some parts are made more persuasive to show interest), argumentation (e.g., supported by pulling facts from different sources automatically), check for missing information (e.g., system has an idea of what a good letter looks like for this task), and the like.

In embodiments, the AIA may be utilized in an educational environment, such as where a user is a student that is provided suggestions with respect to writing structure and style, with prompts to inappropriate tone, with additional context associated with new concepts, and the like. For instance, a student may be writing a paper on the civil war, and the AIA not only suggests modifications to the text with respect to improving the student's quality of writing, but also suggests context to aid in the support for a student's theme or bring related current events to the student's attention.

In embodiments, the AIA may be used for grammar and fluency correction. For instance, the AIA may utilize context to improve grammar and fluency, such as applying a different dictionary and grammar based on a user's location, the specified audience (e.g., use Australian English spelling and grammar norms by default if the users are (mostly) Australian), and the like. The AIA may utilize communication profiles to improve grammar and fluency, such as applying a different grammatical error correction model depending on the user's native language (e.g., applying a model trained on text with errors typical for Chinese learners of English to improve the accuracy of correction), adjusting spelling and grammar correction according to a receiver's sensitivity or opinion on certain writing issues. For example, based on an observed communication profile of the receiver, the system may know that he or she gets annoyed by lowercasing in short text messages or by sentences ending with prepositions, and enable the corresponding checks and applications of corrections if a user is writing to this person.

In embodiments, the AIA may be used to improve clarity and effectiveness, such as through context and communication profiles. For instance, an alert of readability or vocabulary mismatch may be provided to a user based on the target audience (e.g., too many idioms in a text for non-native speakers or inclusion of complex language in a text for children), a suggestion for an improvement to or automatic rewrite of the text may be provided to adjust readability and vocabulary, a rewrite of an email may be provided to maximize a positive outcome, and the like. For a given email, the AIA may suggest or apply the structure and revisions that increase the chance of a positive response or rewrite the text to make it more effective (e.g., targeting specific sentences or generating a new email from scratch). A communication profile, prior communication, documents, calendar information, and the like, may be taken into account, such as were shared in the thread or elsewhere. For example, a sales email may be rewritten using a model trained on a corpus of similar sales emails with response and/or click data. In another example, improvements or a rewrite may be suggested to a support email so that a specific customer (receiver) is satisfied, such as using a model that is trained on a corpus of similar support emails tagged with satisfaction ratings, and possibly also the receiver's communication profile.

The AIA may have the capability to modify a communication to appeal to a specific receiver, such as generating revisions or rewriting the communication using the vocabulary that the receiver would understand or using the structure and language that the receiver tends to use or reacts positively to (e.g., based on his or her communication profile). Adding or removing content may be suggested, such as depending on the user's goals and receiver's background, such as using individual and shared context available to the system, or adding references and content from documents (e.g., previous interactions with the receiver), pop culture, current news or other kind of world knowledge.

The AIA may have the capability to detect biased or inflammatory language, and suggest more balanced rewrites when possible, such as warning the user if a specific receiver can be annoyed by certain forms of language (e.g., structure, tone, certain terms, and the like), based on his or her communication profile. The AIA may detect a user's emotional or physiological state to correlate with their current writing style, such as through biometric data from the user (e.g., from a wearable device), visual indicators (e.g., from facial indicators analyzed from a user-facing camera, such as mounted on a user's laptop or smartphone), changes in writing style with respect past messaging and responses, and the like. For instance, a user may be wearing a smart watch that monitors temperature, heart rate, galvanic skin response, voice data (e.g., vocal inflections, volume, speech patterns, and the like), and blood sugar, where changes in these levels are matched to emotional profile data, such as stored on the user's communication profile, as determined from similar measurements in a population, and the like. The AIA may then be able to determine if these indicators are adversely affecting the user's communications, such as when a spike in body temperature, heart rate and low blood sugar are detected, making a person more likely to communicate in a frustrated or angry manner. The AIA may then prompt the user to be aware of such potential influences, offer communication suggestions related to same or revise a communication. The AIA may also correlate detected emotions with the content and/or communication the user deals with and use this as training data for modules that predict reactions and also for updating communication profiles.

Figure 4:
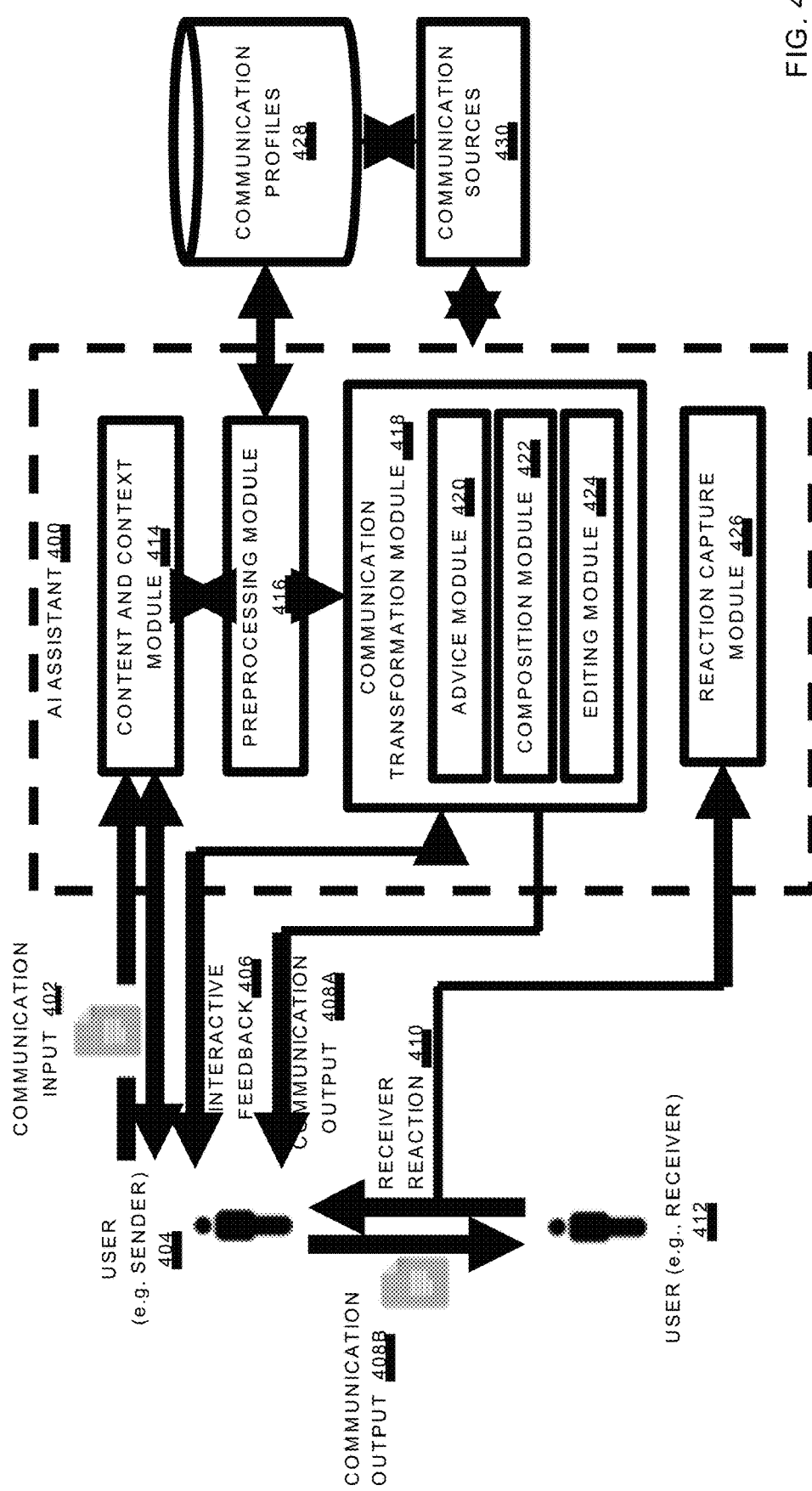
FIG. 4 illustrates an overview of a comprehensive communication assistance workflow according to exemplary and non-limiting embodiments.

In embodiments, communication profiles and available context may be utilized to compose and/or edit user content (e.g., an electronic communication) in a way that maximizes the probability of the receiver(s) perceiving the received content as intended by the user and reacting positively. FIG. 4 depicts a workflow of asynchronous communication, including general advice to a user generating a communication, and compositional and editing assistance to the user for the communication. The workflow begins with the user 404 (e.g., a user sender) providing a communication input 402 to the AIA 400, where the AIA receives the communication input 402 with a content and context module 414. The user 404 may provide an initial communication input 402 (e.g. draft a message, upload a document, or just start typing or dictating). The user 404 may provide context by specifying the use case, goals, intent, desired reaction, and the like. The user 404 may provide prior communication history by opening a thread and/or granting AIA access to their inbox. AIA may infer more context from the communication environment, integrated systems, recent user activity (e.g., channel, schedule, user's current state, and the like). AIA may classify the communication type and use case based on initial content and/or prior history. Techniques for classification may include rule-based, machine learning, deep learning, statistical models, and the like. MA may present (at least in part) inferred context to the user 404 to confirm or override. The AIA may apply default context values (e.g., default goals for a certain use case) if they are not provided by the user 704 and cannot be reliably inferred.

The user 404 may specify a second user 412 (e.g., a user receiver), such as by selecting from a contact list or picking applicable audience types, as described herein. The AIA may identify the use case through interaction with the user 404, such as the goals of communication and desired/undesired reactions. The AIA may begin the session as pre-configured or be launched with a certain use case parameter, infer the use case from the environment or prior communication, prompt the user 404 to specify the use case (e.g., "feedback", "personal request", "confirmation", "greeting", "formal application", "report", and the like). Based on the use case, the AIA may infer the goals and communication objectives and prompt the user 404 to confirm or modify them (e.g., "convince", "impress", "entertain", "inform", "express gratitude", and the like). Based on the use case and goals, the AIA may identify or prompt the user 404 to specify desired and undesired reactions of the user 412 (e.g., emotions, actions, and the like). For instance, a default desired reaction could be "a (positive) response". A default undesired reaction could be "no response", "negative response", "anger", "frustration", and the like. The MA may provide for a default set of messaging goals, such as that a communication should be accurate (e.g., error-free), not ambiguous (e.g., clear), not harmful or offensive, doesn't cause or escalate conflict, minimizes the risk of misunderstanding, and the like. In embodiments, the goals of communication and desired/undesired reactions may be updated at any time throughout the interaction with the user, as described herein, based on updated inputs (e.g., as the user 404 enters the subject for the communication or proceeds to type or dictate the communication).

The AIA may identify other communication context, such as a communication channel, platform, or medium (e.g., web, mobile, specific communication clients and collaborative editors, chat, text/voice, and the like), a communication type, form, genre (e.g., email thread, short/instant message, shared document, social media post/comment, voice message, and the like), prior communications between the user 404 and user 412, location and time of day/week for the user(s), and the like. The AIA may identify that the channel, time or the form of the communication are not optimal given the receiver and the use case/goals and suggest alternatives, such as based on the preferences explicitly provided by the user 412 or derived from receiver's previous communication patterns observed and learned by the AIA, such as statistics of the receiver's use of channels for different use cases, availability or schedule (e.g., extracted from receiver's calendar), typical time they're checking and responding to incoming communication, communication forms they tend to respond to better, and the like. This recommendation may be updated as the user 404 works on the communication (e.g., suggest an email or document form instead of an instant message if it exceeds certain size, suggest a short video recording if the communication is more informal). Extracted content and context obtained by the content and context module 414 is then passed to the preprocessing module 416, which encodes it into a common representation (e.g., as a vector or matrix) to be used as an input into machine-learning models, deep-learning models, other statistical modes, and the like, within the communication transformation module 418.

The preprocessing module 416 prepares content and context, such as in association with accessed communication profiles 428 (e.g., users and/or group profiles), for use by the communication transformation module 418. In embodiments, the AIA 400 may interface with third-party communication platforms (or may be integrated with the third-party communication platform) to retrieve information about the user 412, such as a receiver ID (e.g., email address) derived through extraction from the receiver field, from the thread or conversation (if it's a response), and the like, from the user's communication input 402. For example, accessing the receiver field through a Gmail API or browser extension. Alternatively, the AIA may prompt the user 404 to specify the receiver/audience, such as by entering an email, selecting a contact from the list, selecting the audience or group from the list (e.g., team X, family members, industry group Y), selecting the receiver or audience type from the list (e.g., a close friend, a boss, expert audience, children audience, or native/non-native speakers), and the like. The AIA may infer the receiver type or target group or audience based on the environment or context of the communication input 402, such as the communication client, user account, prior content of the thread or conversation, communication content, and the like, where for instance, the automatically identified receiver type or audience is presented to the user. The user 402 may be presented this information, and be provided an option to override, specify, narrow down, and the like, the selection. If the user 412 is known to the AIA, the preprocessing module 416 pulls the corresponding communication profile 428. If not, it may create a new one. The preprocessing module 416 may also associate the user 412 with relevant group communication profiles 428. In embodiments, communication profile creation and visibility may be restricted to members of a certain group (e.g., members of a corporate email domain, contacts specified by the user, and the like).

The preprocessing module 416 passes the encoded content and context, and the information accessed in communication profiles 428, to the communication transformation module 418 for optional processing, including general advice to the user through the advice module 420, communication composition assistance through the composition module 422, and editing of communication versions through the editing module 424, such as in conjunction with communication sources 430 as described herein. For instance, as part of providing general advice through the advice module, once the communication profile 428 is identified, AIA may display general characteristics of the receiver or audience and provide recommendations on how to communicate with them. Characteristics may include receiver's occupation or role, location, knowledge and interest areas, receiver's language proficiency (e.g., native or non-native English speaker), expected or average response time, availability, personality type or traits, and the like. Characteristics may be explicitly provided to AIA by the receiver (e.g., as part of filling in AIA user profile), learned through surveys (e.g., personality type or traits can be learned through a personality survey delivered to the receiver by AIA), which may be in-product surveys, obtained from external systems accessible to AIA (e.g., receiver's occupation may be extracted from a public personal information directory, professional contact network, web search and the like; receiver's availability may be obtained from a calendar) or extracted by AIA from receiver's observed communication (e.g., receiver's knowledge and interests can be learned by analyzing the receiver's communication through topic classification or keyword extraction algorithms and identifying the most frequent topics or keywords; receiver's language proficiency can be identified by analyzing receiver's vocabulary or running receiver's communication through a statistical learning algorithm classifying input communication as native or non-native (produced by a native or a non-native speaker); expected response time may be based on historic data on receiver's typical response time in the same or similar communication scenarios). Recommendations may include preferences and other information explicitly provided by the receiver such as preferred communication channels (such as email, instant messages, voice messages, specific communication platforms or applications), preferred communication format and style (such as formal or informal, brief or detailed, plain or rich text, logical or emotional, and the like), preferred communication time (e.g., separately for different communication use cases, such as personal and business) and the like. Recommendations may also be derived by AIA through analyzing a receiver's communication patterns (e.g., AIA may recommend formats and styles that the receiver responds to most positively and consistently (based on the sentiment analysis of responses and the distribution of time to respond); alternatively, AIA may recommend formats and styles that match/mimic the receiver's prevalent communication styles and format).

As a part of general advice, the MA may suggest a different time to send a communication, such as if the receiver is determined to be occupied (e.g., based on a retrieved schedule if the AIA has access to it), if the receiver is more likely to provide sufficient attention at the current time where the receiver may better respond to an incoming communication sent at a different time (e.g., based on their stated preferences or past behavior recorded in their communication profile, such as when the receiver most frequently checks and responds to incoming communication). Suggested time may be different for different communication use cases, such as personal and business (e.g., if receiver's explicit preferences or observed behavior differ in these use cases). The AIA may suggest a different channel to send a communication (e.g., email, instant messages, voice messages, specific communication platforms or applications), such as if the receiver is likely to see it and respond faster through a different channel (based on their stated preferences or past behavior recorded in their communication profile, such as the frequency of use of different channels for different communication use cases (among the channels AIA integrates with or has access to)), if the topic, structure, or length of the communication are a better fit for a different communication channel (e.g., sensitive topics may better be discussed over phone or longer communications may better be sent over email rather than IM), and the like.

As part of general advice, given a message produced by the user, the AIA may inform the user of predicted receiver's reaction to such message. AIA may alert the user in case the predicted reaction differs significantly from a desired/expected reaction. The desired/expected reaction may be derived from the user's intent or pre-defined in the MA for certain communication use cases (e.g., if the user's intent is "persuade", MA may consider "response with a confirmation" as desired/expected reaction; if the use case is a social media post, AIA may have likes, shares and comments pre-defined as desired/expected reactions).

In embodiments, the AIA may provide for advice to a user who has sent a communication with feedback from the receiver of the communication, such as described herein. For instance, a user may be provided with reaction feedback, where the AIA provides advice on how to follow up with a second communication to the receiver, such as changing the tone of the communication, adding more information, providing less information, making the communication less formal, removing language identified as undesirable, abusive, or offensive by the feedback, and the like. The feedback may also be included in an update to the user and/or the receiver's profile, so that any preferences or issues raised in the feedback can be incorporated into future communications.

The communication transformation module 418 may provide interactive feedback 706, such as to prompt the user to specify a user/audience and the context that AIA cannot get or infer from the environment, prior user input, user settings, available communication draft and history, and the like. The AIA may prompt the user to confirm or override the receiver/audience and the context the AIA has identified. The user may update the content, context, and receivers at any time during the session. The AIA may detect changes, re-process inputs and adjust its feedback; present general recommendations that the user can react to (e.g., acknowledge, dismiss, mark as helpful or incorrect, and the like); use user feedback on the general recommendations to improve them in the future; present template and/or textual completion options (e.g., the user may preview and select one or none of them); offer completions and continuously update completion suggestions as the user is entering text (e.g., typing or dictating); and the like. In more structured communication use cases, the AIA may guide the user through a single template/outline and have the user answer questions/fill in certain blocks of content. The AIA may generate the edits for the text the user has entered and automatically re-check it and update the edits when the user modifies the text, rewrite the content and highlight changes and allow the user to review and revert individual ones, and the like. The user may interact with and provide feedback on AIA's individual suggestions (e.g., general recommendations, templates, completions, edits, and the like). The AIA may use the data from user interactions (e.g., accepted or dismissed suggestions) and feedback (e.g., incorrect or irrelevant suggestion reports) to improve future suggestions (e.g., by using this data to re-train/tune the corresponding machine, deep, or statistical learning models).

Figure 5:
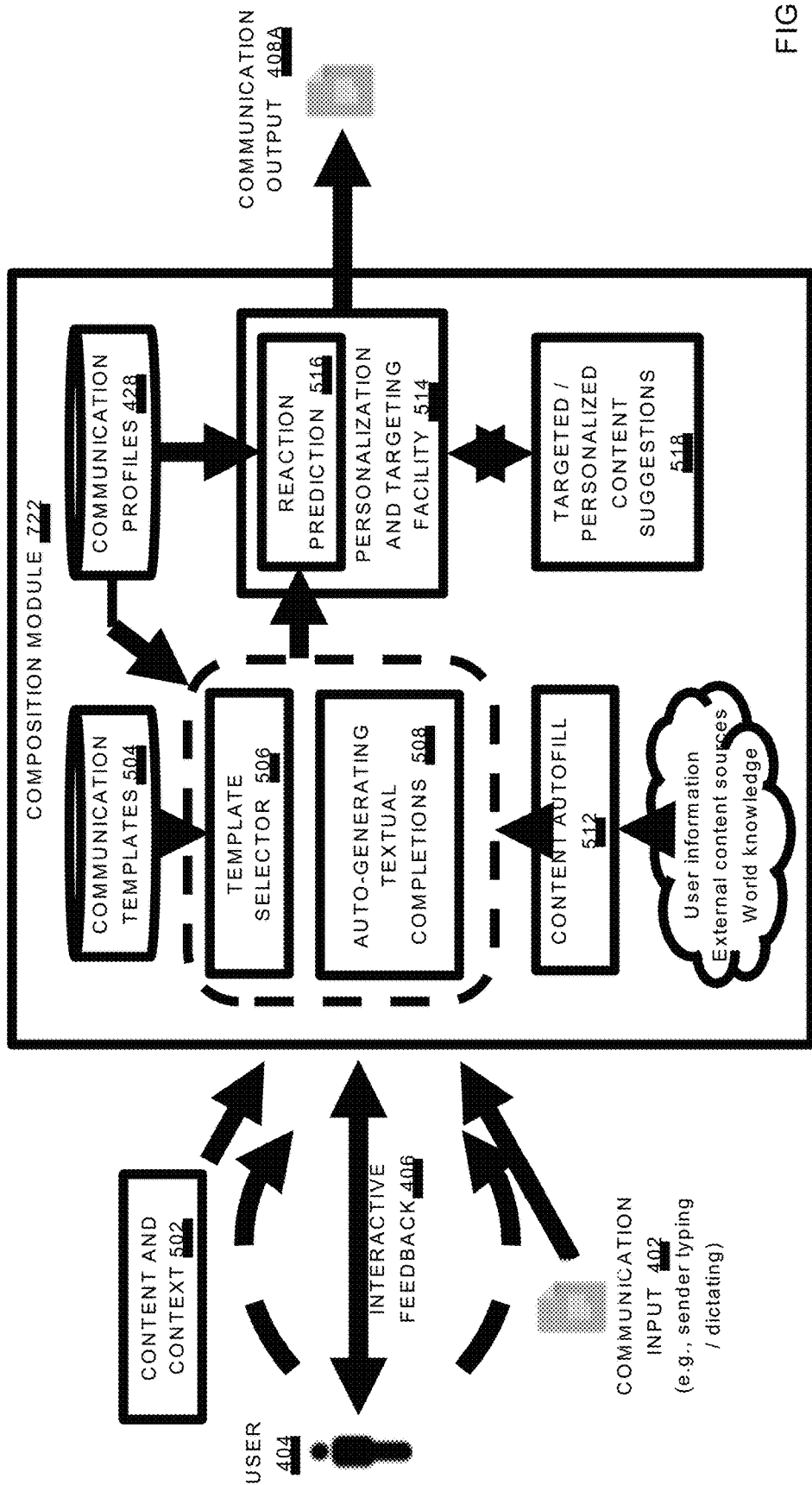
FIG. 5 illustrates an overview of a composition workflow according to exemplary and non-limiting embodiments.

As further depicted in FIG. 5, the composition module 422 helps the user 404 compose communications with less effort and with greater speed, such as by generating (at least a portion of) communication content (e.g., text/language) from a limited communication input 402, guiding the user by suggesting structure and/or placeholders to fill in content, and the like. It may also ensure the quality and effectiveness of communication by optimizing the generated language and structure for specific context and communication receivers. The composition module 422 may implement predictive language generation based on initial communication input 402 and available context, use case, and the like. It may suggest communication templates, generate textual completions, such as predicting the next word, phrase, sentence, paragraph or an entire message/document/communication. It may present options for the user to confirm or select from. It may optimize generated language to a specific receiver (s)/audience, and/or personalize it to mimic the user's communication style. The Composition module 422 may use communication templates 504 for various communication scenarios, statistical algorithms for generating textual predictions (e.g., machine learning, deep learning, language models, and the like), and other (prospective) forms of natural language generation. Language generation by the composition module 422 may optimize compositional suggestions to the user for utility and impact (effectiveness). Utility optimization can be achieved by maximizing the probability of the user 404 accepting the system generated text (or one of the suggestions if multiple options are presented), and penalize compositional selections for inapplicable, irrelevant, or too general suggestions (e.g., penalizing templates with higher percent of placeholders vs. actual text, penalizing suggestions that apply to a broad range of use cases vs. the actual use case, and the like). Impact and effectiveness optimization with respect to the user's communication goals can be achieved by maximizing the probability of a positive outcome or reaction by the receiver given the context, use case, and the like, for the communication. The probability of a positive (desired) reaction may be estimated by a machine, deep, or other statistical learning model trained on a large set of reaction data (records of past communication content with meta-data such as context, senders, receivers/audience and the actual reactions). Variations of content generated by the composition module may be run through the reaction prediction model and filtered or ranked based on the predicted probability of desired reaction before being presented to the user.

The system may accumulate a great amount of content (e.g., messages, documents, and the like) with meta-data: context (e.g., a resume for an engineering position at a startup, or a marketing email in China) and senders/recipients (e.g., identifiers, emails or references to communication profiles). Receivers may be an audience (e.g., IT recruiters, consumers in China). This data may be one general-purpose data set mixing everything or multiple specialized datasets, such as use case-specific (e.g., only marketing emails) or receiver-specific (e.g., email history of a specific user). Meta-data may also include the actual reactions (e.g., the number of interview invitations for each resume, the number of clicks or product purchases triggered by each marketing email, the sentiment of a response to each user email, and the like). The system may train machine learning, deep learning, or other statistical models on this data and use these models in reaction prediction/optimization module of MA. The system may have a model that predicts the reactions to a given user's message, context, and the receiver or audience (e.g., returns the probability of different reactions. The system may also have a model that rewrites a given user's message to optimize for a desired reaction. It may take a draft of the message, context (including the desired reaction), and the receiver as an input and produce a rewrite that maximizes the probability of the desired reaction. These models may be general-purpose (e.g., trained on general-purpose data set) or specialized (trained on specialized datasets). Afterwards, the AIA may capture the actual reaction to the user's communication, construct a reaction data record and feed it into the model(s) to update/retrain them (e.g., online learning).

Communication templates 504 may be especially applicable in frequent or repeated communication scenarios, such as short requests or replies, common communication types (e.g., introductions, greetings, invitations, resumes, applications, or reports) and the like. Communication templates 504 may not be as applicable for creative writing, describing personal experience, communications containing complex ideas or argumentation, and the like. The composition module 422 may select communication templates 804 from clusters of semantically close or equivalent templates for different communication use cases. Communication templates 422 may consist of text and placeholders, or a combination thereof. Some may be ready for immediate use (e.g., short requests and replies), some may be a sequence of placeholders, or an outline defining structural and logical blocks that the user would have to flesh out. Communication templates may include short communications (e.g., requests, replies, greetings, and the like), use-case specific templates (e.g., separate for different channels, communication types, and other context categories/conditions; clusters of variations catering to different communication profiles, and the like). User-specific or group-specific communication templates may be frequently used by the user or by a group that the user belongs to or is targeting (e.g., team- or company-specific templates). Communication templates 504 may contain a mix of manually created and automatically generated templates. Templates may be manually created either by the users (e.g., administrators providing organization-specific templates for all users in the organization) or by AIA developers/maintainers (e.g., a database of professionally edited templates for various common communication scenarios/use cases). Some communication templates 804 may be generated automatically by processing a large body of documents and messages, normalizing and canonicalizing them using different kinds of parsing, chunking or text similarity techniques, and then clustering equivalent ones (e.g., with semi-supervised machine learning). In embodiments, a hybrid approach to template curation may also be utilized, where people manually verify/edit automatically generated templates before making them available.

In embodiments, selection of communication templates 504 may be implemented as a machine, deep, or other statistical learning model/technique that finds the most likely templates given the initial content, such as previous communications in the communication thread, and known context, such as a user's intent. The template selector module 806 identifies a subset of communication templates to consider, such as based on available context, (e.g., communication type, receivers, e.g., team or organization) and applies a machine learning model to score these templates and find the highest scoring one(s). As a post-processing step, the template selector may discard or penalize communication templates 504 that are too general and ensure diversity in a resulting set of communication template candidates, such as for further personalization and targeting and also to provide the user 404 a choice.

In embodiments, automatically generating textual completions 508 may be implemented using machine, deep, or other statistical learning models conditioned on the prefix word sequence (e.g., current communication draft), n previous communication(s) in the thread/conversation, additional context, and the like. They may generate the next word, phrase, sentence, paragraph, or an entire message or document. In embodiments, representations of the previous content and context are fed into a natural language generation model that is trained on large-scale communication data that may be mixed with users' prior communication and/or effective communications of other people similar to the user (e.g., with respect to industry group, and the like), and/or effective examples of communication in the same or similar scenario (e.g., with respect to communication type, use case, and the like) such as giving a higher weight to the mixed-in data. The outputs of the model are ranked based on the receiver's communication profile and other contextual information. Output candidates can be ranked by the probability of them triggering desired reaction or outcome, or based on their similarity to the user's communication style. The highest-ranking outputs are suggested for the user to confirm/select. The user may confirm/select a completion to use as-is or modify.

The composition module 422 may utilize an automatic content fill function 512 in association with the appropriate placeholders utilizing the language generation 510 facility, such as with filling in personal user data (e.g., full name, contact details, addresses, and other data that the user may frequently share in communication), public facts or world knowledge (e.g., filling in the full date when only a day of week is mentioned, filling in the public addresses of meeting places mentioned), and the like. It may also prompt the user to fill in certain placeholders in communication templates suggested by AIA.

The personalization and targeting facility 514, such as in conjunction with targeted and personalized content suggestions 518, may be able to provide personalization and targeting of new content, and filter generated language options (e.g., select variations from a cluster of templates or textual completion candidates) based on the user's communication profile (e.g., to match their communication style) or based on the receiver's communication profile (pick the ones that may appeal more to the receiver to increase the likelihood of a positive reaction). The personalization and targeting facility 514 may provide for reaction prediction 516, such as in conjunction with reaction data stored in communication profiles 428. The personalization and targeting facility 814 may also dynamically modify selected templates, such as by adjusting vocabulary and/or style to mimic the user's communication and/or optimize for a specific receiver or audience. The personalization and targeting facility may use a style transfer module implemented with a machine, deep, or other statistical learning model or models, such as a sequence to sequence model or models that translate generated language variations from generic style into the user's authentic communication style. The personalization and targeting facility may use a reaction prediction module implemented with a machine, deep, or other statistical learning model trained on reaction data (communication records enriched with meta-data including reactions of specific receivers) to estimate the probability of a positive reaction and filter or rank generated language variations based on that. Language generation models may also be trained on reaction-enriched data to generate variations that maximize the probability of positive reaction in the first place.

Figure 6:
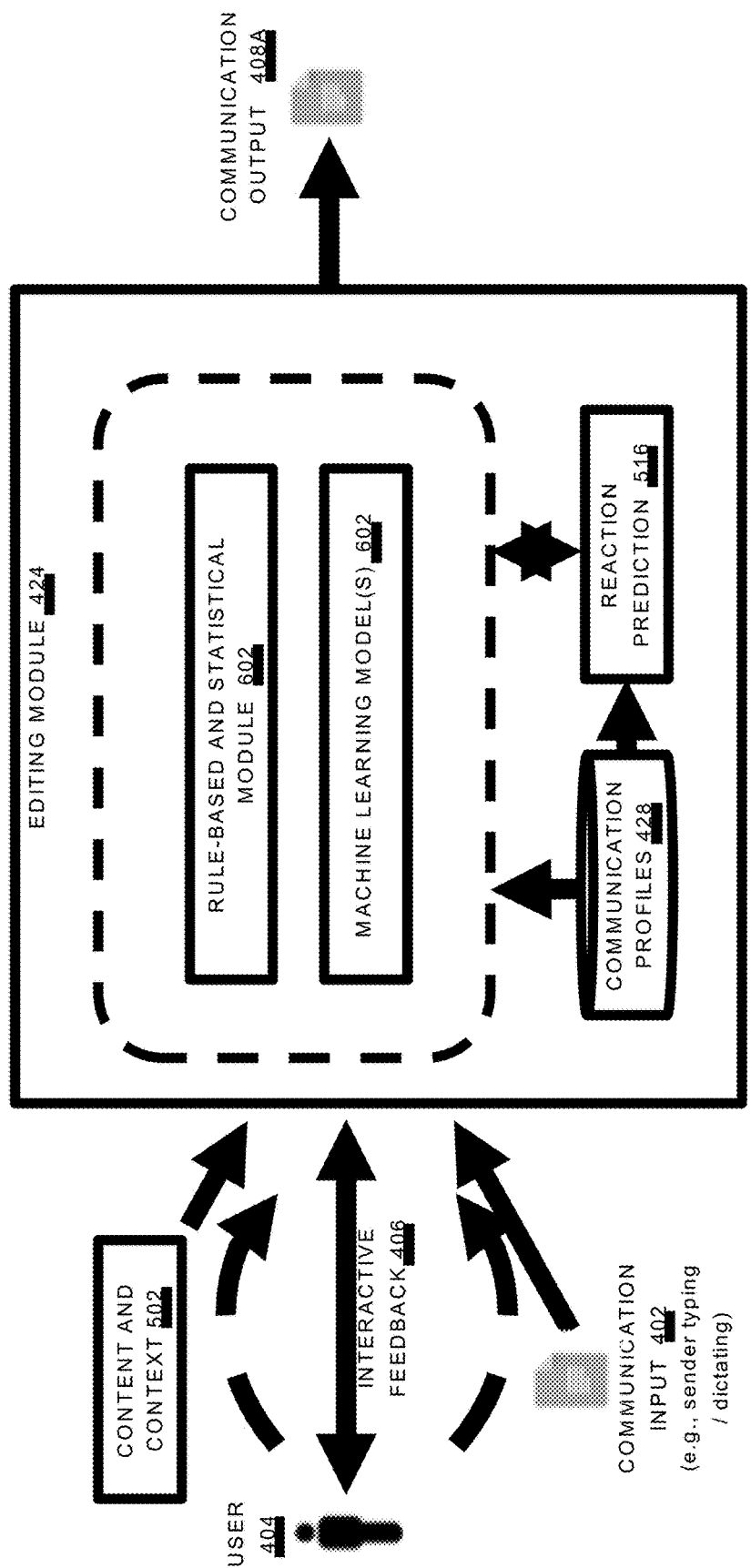
FIG. 6 illustrates an overview of a editing workflow according to exemplary and non-limiting embodiments.

As further depicted if FIG. 6, the editing module 424 analyzes and modifies an existing fragment or the entire communication to optimize it for a specific receiver(s) or audience and use case. The editing module 424 helps the user 404 ensure the quality of their communication by analyzing existing language and generating changes that improve its accuracy, clarity, and effectiveness with respect to communication context and communication profiles. The editing module 424 may include features (checks) that analyze and improve different aspects of communication quality. At least some of these checks may be context- and communication party-dependent. Checks may utilize a rule-based and statistical module 602, a machine learning model(s) 602, deep learning based models, and the like, or hybrid of different processing module functionality. The editing module 424 may generate modifications and present them to the user 404 to review and confirm or reject individually. It may also modify existing language and present (mark or notify of) the changes it has made—and the user may be able to revert individual changes.

The editing module 424 may provide for context- and profile-dependent checks, such as with respect to accuracy, clarity, effectiveness, and the like. Accuracy checks may include spelling and grammar correction by applying the norms of a specific language dialect, such based on the receiver's dialect, spelling, and grammar correction applied to different parameters or models. Accuracy checks may depend on the user's communication profile (e.g., depending on the user's first language and/or language proficiency), and adjust a model's parameters, such as using a model trained on a corpus of texts by the people with same first language/proficiency, resulting in an optimized check for a specific error distribution and frequency. Clarity and effectiveness may include preparing the communication in a way the receiver can listen to (e.g., without shutting down, and building trust), such as by optimizing trigger words (e.g., removing or replacing negative trigger words, adding more positive trigger words, and the like, such as described herein), prompting the user to add positive feedback that the receiver would appreciate (depending on the use case), replacing non-inclusive language that may make the receiver feel excluded, flagging aggressive language (e.g., suggesting the user to wait for a later time to send the communication), applying the style preferred by the receiver, e.g., formal vs. informal, brief vs. detailed, and the like. Clarity and effectiveness may include preparing the communication in a way the receiver can understand (e.g., building clarity), such as by improving the communication for readability/clarity (e.g., adjusting readability (sentence and word complexity) and vocabulary to the receiver's language proficiency level (including native/non-native status), adjusting for formatting based on receiver's preferences, predicting reaction of the receiver (e.g., in the case of direct communication) or audience (in case of a broadcast communication), warning the user when a negative or undesired reaction is likely (e.g., highlighting content language that can cause negative emotions for a specific receiver or group, highlighting content that may not engage the receiver (e.g., too long, irrelevant, and the like), warning when it's not a good time to contact the receiver (e.g., they are unavailable, busy, sick, stressed, such as based on the recent communication history, calendar integration, explicit receiver settings, observed receiver state, and the like), modifying communication to increase the likelihood of a positive reaction (e.g., through recommendations, suggesting changes, or a complete rewrite)), and the like. The AIA may use reaction prediction similar to the one provided in the composition module 422 to rank and filter to generate edits. For instance, if predicted reactions do not match desired reactions and/or match undesired reactions, the AIA may warn the user and suggest modifications to the draft, for example to highlight suboptimal fragments (e.g., identified by the reaction prediction model), offer vocabulary suggestions (e.g., word replacements) that maximize the likelihood of a desired reaction, offer structural changes (e.g., size, outline, transitions, paragraph splitting, and the like) that maximize the probability of desired reaction, offer a complete rewrite of the draft, and the like. In embodiments, the AIA may make corrections to the communication automatically, without user intervention.

The AIA 400 may provide for a reaction capture module 726 to capture the receiver's reaction 410 in order to improve the effectiveness of generated or modified communications using reaction data, such as through updating communication profiles, collecting reaction data for training (in batch or online mode) the models that predict reactions and optimize communication for certain reactions, and the like. The AIA's reaction capture module 426 may capture reactions 410 through a communication platform (e.g., responses, time to respond, sentiment of responses, and the like) or integrations with other systems (e.g., link clicks, or other receiver actions triggered by the communication). Reaction capture module 426 may capture reactions 410 directly from the receiver (e.g., if the receiver is also an AIA user), ask the user 704 to report the receiver reaction 410 as the outcome of a certain communication, and the like. Receiver reaction data may also be obtained and processed in a batch outside of the AIA workflow (e.g., extracted through an integration or an API from an external system, from an archive of prior communication, and the like).

The AIA may include a reaction prediction and optimization facility that may utilize reaction data, such as consisting of records of communication acts (cnt, p, cxt, ro), where cnt is content (e.g., message, document, text, audio, video, in raw form or included meta data such as for formatting, markup, annotations, tags, and the like), p=(s, r) are references/identifiers of communication parties, where s is a user sender and r is a user receiver/audience (e.g., r may be an individual or a group or a category of receivers, s may be a human or a computational system capable of generating natural language, s,r may include properties and characteristics of the parties or link to communication profiles of the parties, r may include the type of relationship between the recipient(s) and the sender, cxt is context (e.g., may include the use case, user goals, references to communication history (such as previous communications in a thread) or related documents, current psycho-emotional state of communication parties, their availability, location, and the like), ro is a reaction or outcome that the content cnt triggered with the receiver(s) r. Reaction/outcome ro may be a response or no response, time to response, number of subsequent communications in the thread (e.g., before the goal of communication was achieved), sentiment or type of the response (positive/negative, confirmation/rejection), receiver emotions, use case-specific response (e.g., containing certain elements/words), receiver actions (e.g., clicks on the link in the communication, signups), additions or deletions of participants in a thread or conversation, and the like. In case r is plural (a group/audience), ro may be an aggregate, such as the total number of receiver actions, positive and negative responses, clicks, and the like. Response data may be one or multiple data sets (e.g., use case or receiver-specific). Reaction data may be used to train a machine, deep, or other statistic learning model that would predict the most likely reaction-outcome ro for a given (cnt, p, cxt).

Figure 7:
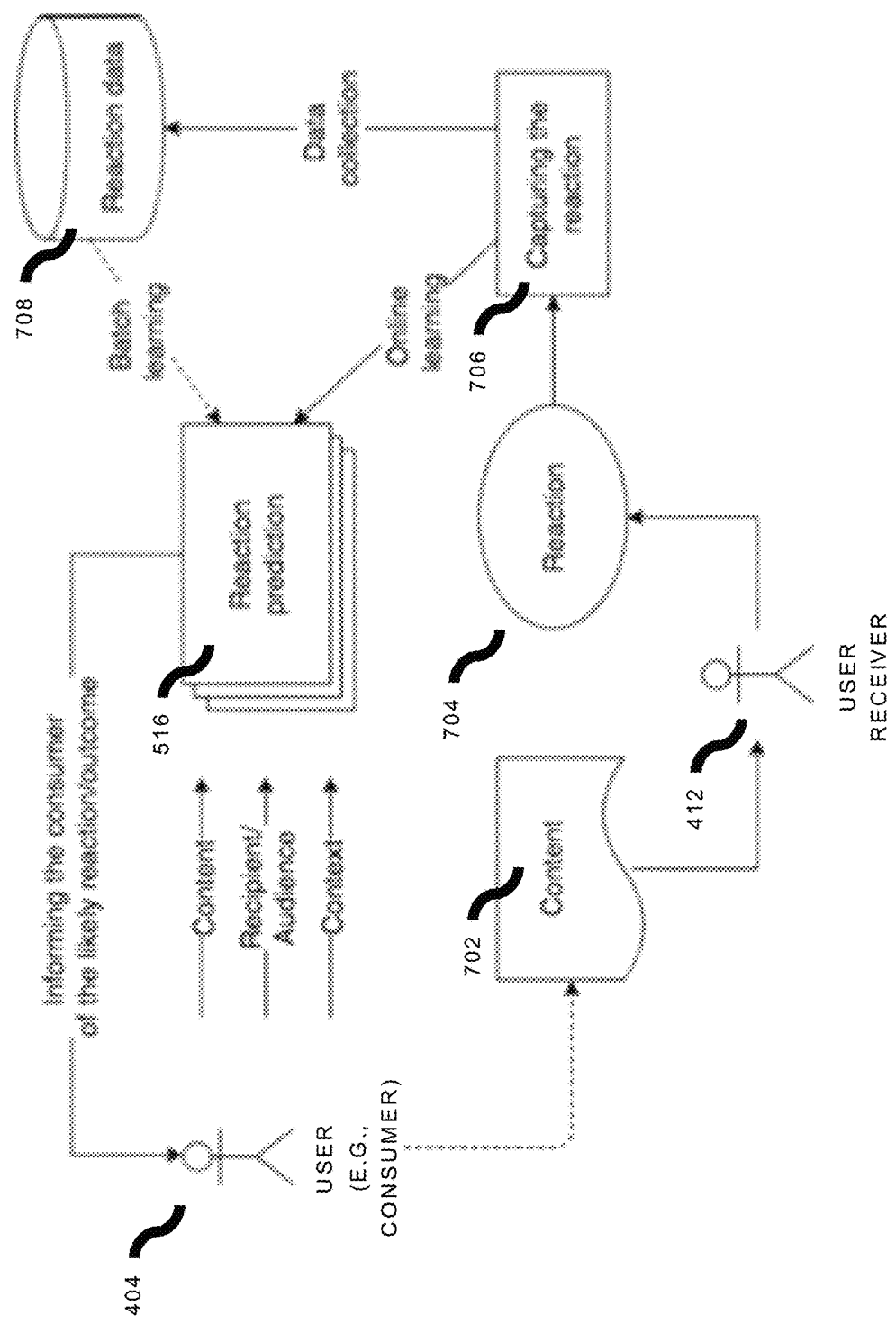
FIG. 7 illustrates a reaction prediction workflow according to exemplary and non-limiting embodiments.
Figure 8:
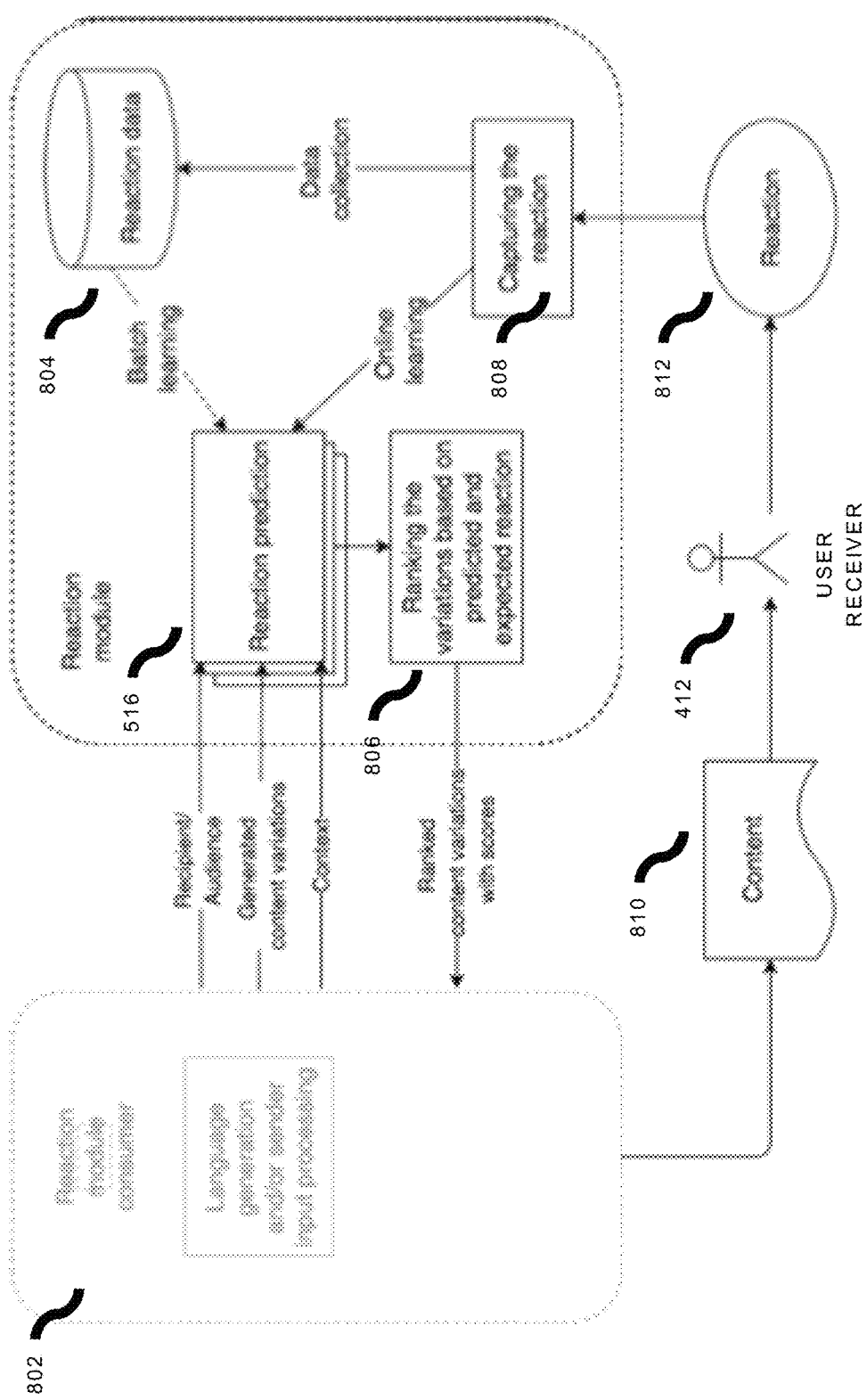
FIG. 8 illustrates a reaction prediction workflow with ranking according to exemplary and non-limiting embodiments.
Figure 9:
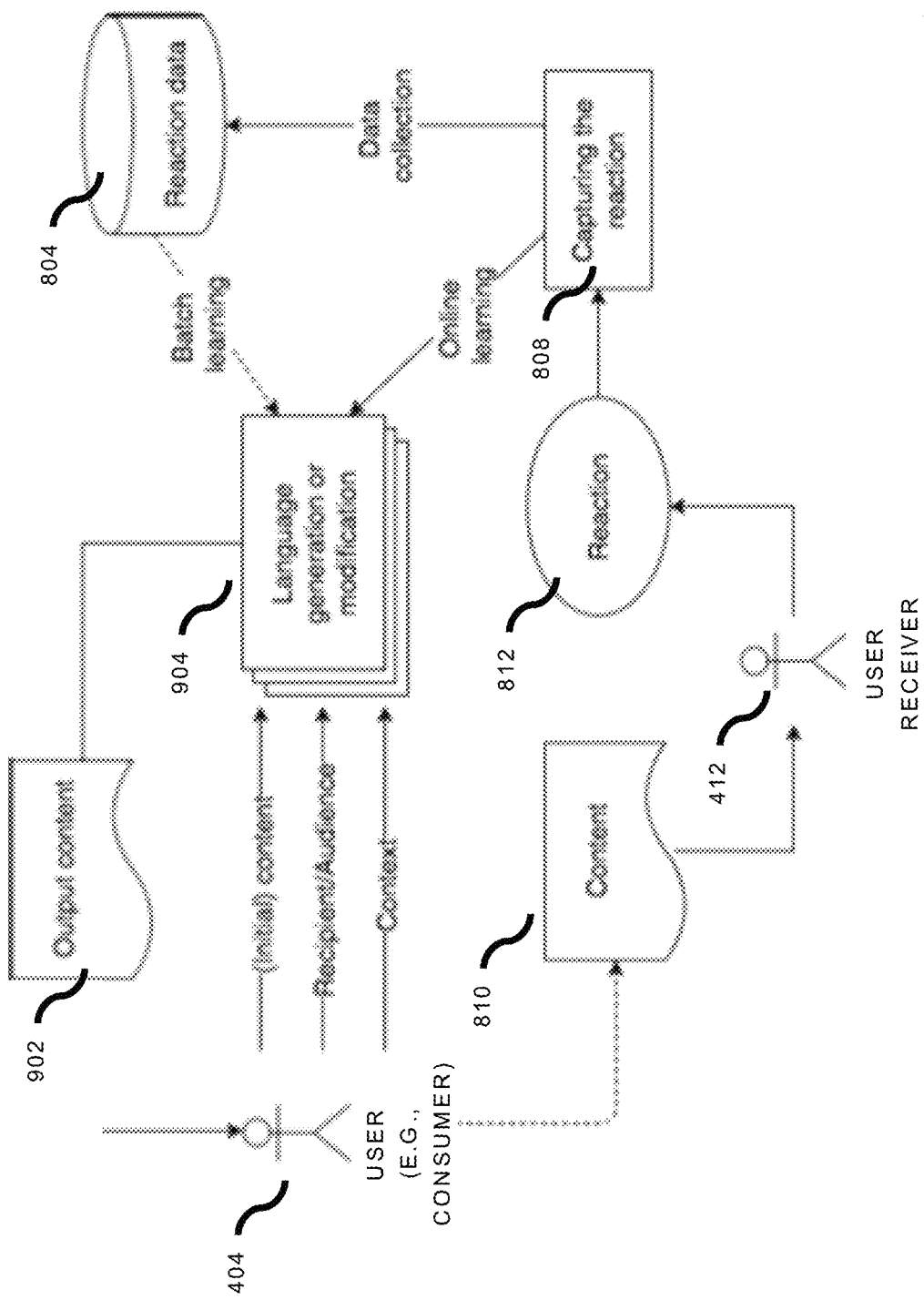
FIG. 9 illustrates a reaction capture workflow according to exemplary and non-limiting embodiments.

Referring to FIG. 7, this reaction prediction 516 may be used to inform the user sender 404 of the likely reaction-outcome, such as from the user sender 404 send content 702 to a user receiver 412. The user receiver 412 then produces a reaction 704 which is then captured 706. The captured reaction 706 may produce reaction data 708 to be stored, as well as being provided for reaction predication 516. Referring to FIG. 8, the reaction prediction may be used to rank different variations 806 of content cnt given a desirable/acceptable set of reactions/outcomes, and the like. In embodiments, the reaction predication 516 may interact with a reaction module consumer, such as for language generation and or sender output processing. Referring to FIG. 9, reaction data may also be used to train a machine learning model that generates or modifies content in a way that maximizes the probability of a certain (set of) ro. For instance, given the communication parties p, context cxt, target reaction(s) ro, and the space of possible content variations CNT, the model could find:

$$cnt^* = \operatorname{argmax} P(cnt_i | p, cxt, ro), cnt_i \in CNT$$

The models may be either general-purpose or context-, receiver- or reaction-specific. E.g., context-specific models may be trained on reaction data sets consisting of records of communication acts in a certain use case. Receiver-specific models may be trained on communication addressed to a specific receiver or audience and representing their reactions. The models may be used in AI-assisted composition, editing, or communication analysis applications. The models may be trained offline (e.g., batch learning using large reaction data sets) or online (AIA's reaction capture module may feed new reaction data records into existing models to improve their accuracy). The models may run on the server side (e.g., in the cloud) or may be embedded on communication devices.

In embodiments, the AIA may provide a receiver with a modified version of a received communication, such as based on the communication profile of the user and the preferences of the receiver, such as described herein. The receiver may benefit from such modification if the user has characteristics and behaviors that causes the communication to be non-optimal in some way, such as because the user tends to communicate in an emotional manner, the user has a language characteristic that makes understanding difficult (e.g., the user is a non-native speaker, uses idioms that are unfamiliar to the receiver, uses slang that is offensive to the receiver), and the like. The AIA may monitor communications being received, and flag those that may need modification, where, such as based on a user's preferences, the communication may be modified before it is presented to the receiver. In embodiments, the AIA may indicate that the communication has been modified, indicate what portions of the communication has been modified, show the modifications in an annotated version of the original communication, present both a clean modified version and an annotated version of the original communication, and the like. Based on past communications from a user, and past reactions and preferences by the receiver, the AIA may implement modifications to a communication without first notifying the receiver. Alternately, the receiver may be notified that a modified version is available, where the receiver may be offered options for reading or listening to the communication. In embodiments, the AIA may implement modifications based primarily on the receiver's communication profile, such as regardless of the user/source of the communication (e.g., modify/augment anything the receiver reads/hears, including incoming communication, online or printed content, and the like). Based on the receiver's language proficiency, the AIA may adjust readability (e.g., simplify vocabulary, rephrase idioms, and the like). Based on the receiver's environment, preferences, available time, and the like, the AIA may condense/summarize content. If the AIA knows the receiver is sensitive to specific content (e.g., based on his/her communication profile), the AIA may alert the receiver or mask this content. In the process, the AIA may observe and collect receiver reactions to various types of content as training data, learn from their feedback and interactions with its functionality that augments the content receivers consume, and the like.

In embodiments, the AIA may augment an incoming communication to a receiver, such as through a user interface, for transforming incoming communications (e.g., emails, instant message, and the like), shared documents, or other content that receivers consume, into a more digestible form. Transformations of incoming communications may include removing wordy or redundant language that does not carry meaning so that reading takes less time and effort; such transformations can take the form of classification machine or deep learning algorithms to strike out words or phrases or sequence to sequence algorithms which automatically convert one text to another (e.g., neural machine translation or paraphrase). Data employed ranges may be transformed from manually or automatically curated lists of commonly overused phrases (either generally, by domain or by communication party) to parallel data sets which consist of original wordy sentences or documents and their less wordy rewrites.

Transformations may provide summarizing longer messages or documents for quick preview. Possible applications include, and are not limited to, providing a summary or set of key points for long emails, messages, or documents, or automatically generating more concise versions of long passages to make it easier for the reader to understand, and the like. Methods may include machine and deep learning techniques which can leverage parallel corpora of long sentences or passages with their summarized rewrites, as well as leveraging vast amounts of unlabeled data.

Figure 10:
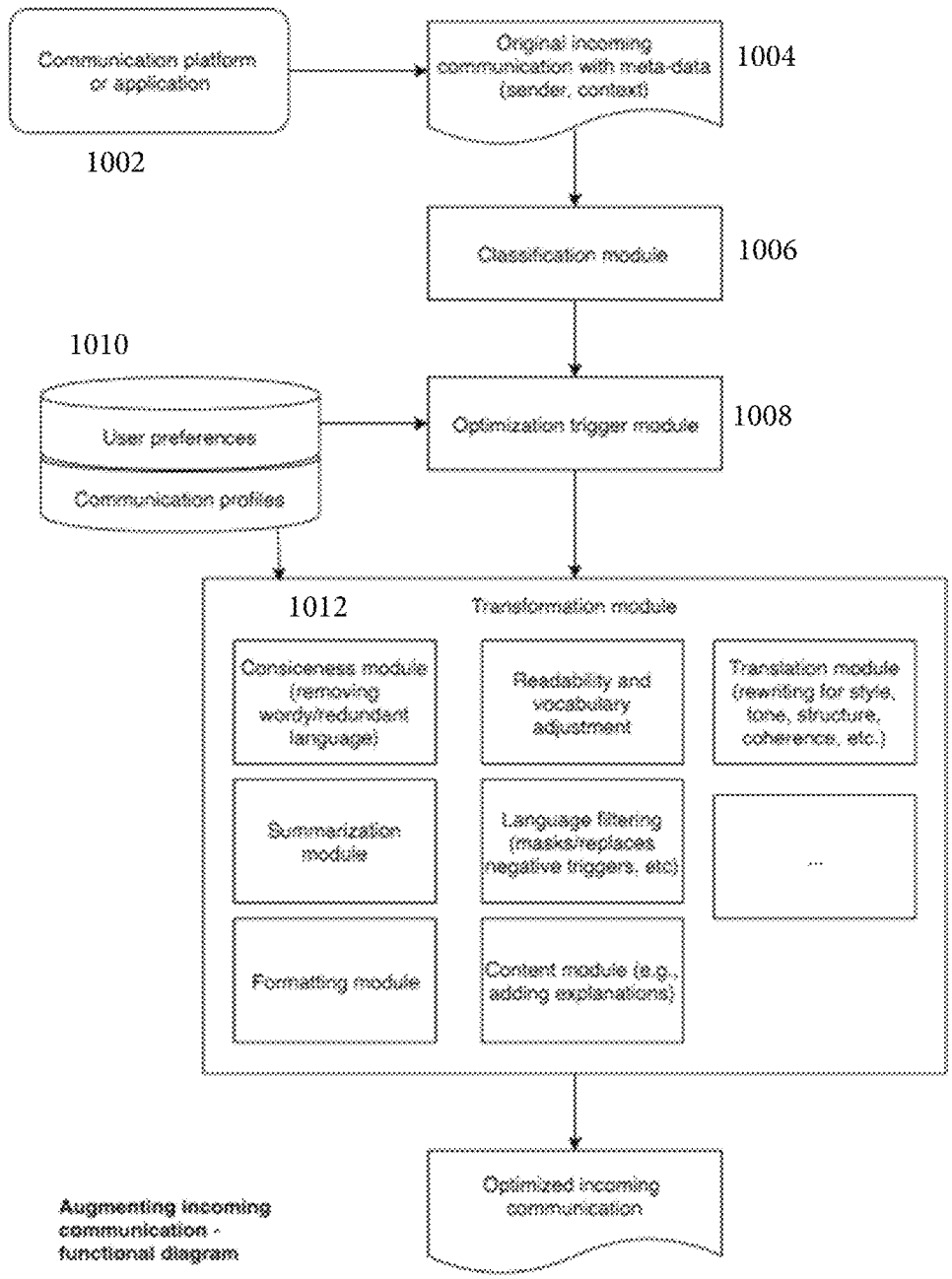
FIG. 10 illustrates a workflow for optimizing an incoming communication according to exemplary and non-limiting embodiments.

In an example embodiment, and referring to FIG. 10, a communication platform or application 1002 may receive an original incoming communication with meta-data 1004, which may be classified with a classification module 1006 and evaluated for triggers with an optimization trigger module 1008, which my take input data from stored user preferences and communication profiles 1010. A transform module may provide a plurality of transformations, as described herein, to produce an optimized incoming communication.

Transformations may include formatting texts and adding structure, such as highlighting key phrases, splitting long paragraphs, converting lists into bullet points. Techniques may include using machine learning or deep learning or other statistical techniques and treating the problem as a classification or sequence labeling task.

Transformations may include rewriting messages or documents using vocabulary and readability (e.g., splitting long sentences; replacing long or rare words with shorter, more common synonyms; replacing idioms with literal/universally understandable equivalent phrases, and the like) to a level that the user would understand, depending on their language proficiency level and background. Methods may include using manually and/or automatically curated dictionaries and reference sources as part of rule or statistical approaches. Methods may leverage a user's profile, user and conversation context and knowledge, and the like, of both conversation parties to automatically identify (e.g., using techniques such as machine or deep learning) types of language, and then employ rule or statistical techniques to generate the appropriate the context.

Transformations may include rewriting messages or documents using style, tone, argumentation, coherence and structure, and the like, that the user would understand and react positively to, such as depending on the context, goals, and recipient background. Methods may include machine and deep learning techniques which can leverage parallel corpora of long sentences or passages with their summarized rewrites, as well as leveraging vast amounts of unlabeled data.

Transformations may include masking or rephrasing the language that the user would not like to see (e.g., offensive language, negative triggers, clichés, and the like) of certain words based on user's stated preferences or previously observed reactions. Such transformations may take the form of classification machine or deep learning algorithms to strike out words or phrases or sequence to sequence algorithms which automatically convert one text to another, such as neural machine translation or paraphrase. Data employed ranges from manually or automatically curated lists of commonly overused phrases may be employed (either generally, by domain, by communication party, and the like) to parallel data sets which consists of phrases, sentences, or documents with the target language and their corrections.

Transformations may include adding missing context, such as explaining terms, abbreviations, slang, idioms, and the like, that can be unfamiliar to the user. Methods may include using manually and automatically curated dictionaries and reference sources as part of rule or statistical approaches. Methods may leverage the user's profile, user and conversation context and knowledge of both conversation parties to automatically identify (e.g., using techniques such as machine or deep learning) parts of communication which need more context, and then employ rule or statistical techniques to generate the appropriate the context.

Transforming incoming communications may methods include, but are not limited to, rule-based, machine learning, deep learning or other statistical supervised, semi-supervised and unsupervised techniques. Readers may choose message or document types that they would like to be automatically modified. Alternatively, users may request the system to modify specific messages or documents on demand, such as by applying specific filters or transformations. Users may be able to view the original version even if the message/document was automatically modified.

Figure 11:
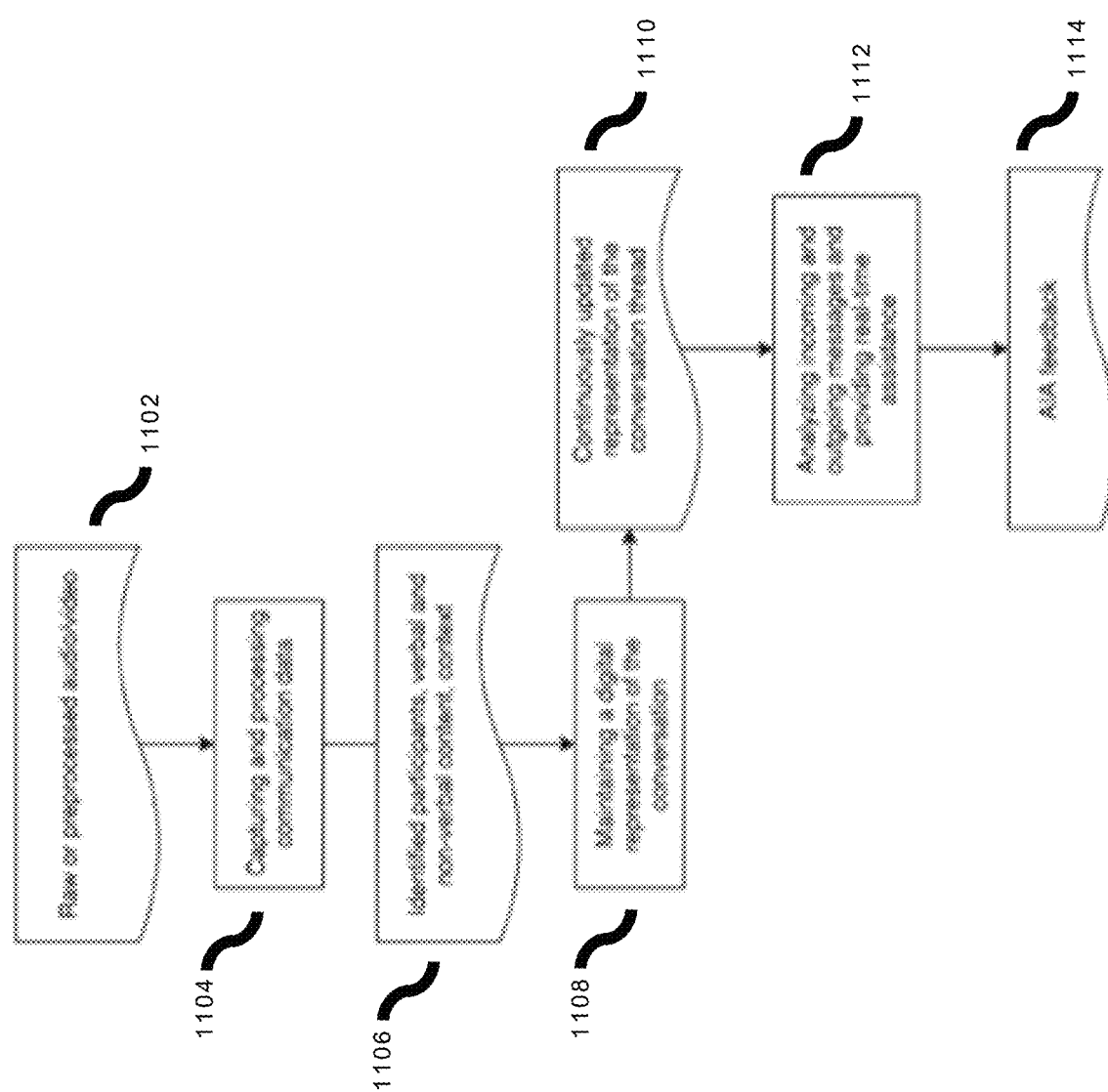
FIG. 11 illustrates a workflow for optimizing an incoming communication and feedback generation according to exemplary and non-limiting embodiments.

In embodiments, and with reference to FIG. 11, the AIA may provide for feedback with regard to communication interactions, such as for audio and/or video communications 1102 being captured and processed 1104: identifying participants, verbal and non-verbal content and context 1106; maintaining a digital representation of the conversation 1108, continuously updating a representation of the conversation thread 1110; analyzing incoming and outgoing messages and providing real-time assistance 1112, providing feedback 1114, and the like.

Figure 12:
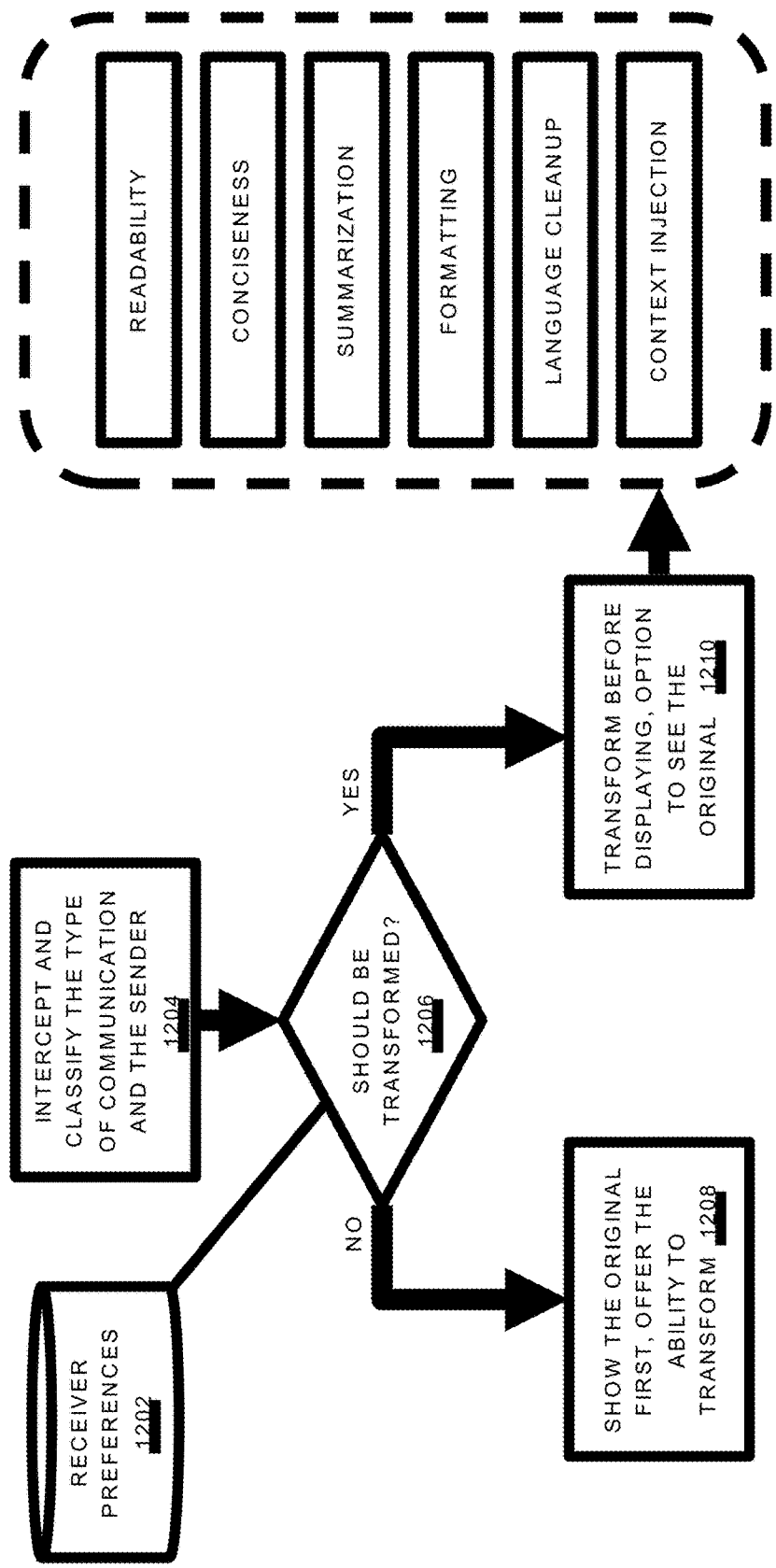
FIG. 12 illustrates a receiver interface workflow according to exemplary and non-limiting embodiments.

In embodiments, the user may be able to specify whether they want to transform incoming communications automatically or manually, showing the original before or after transformation, and the like. In a non-limiting example, and referring to FIG. 12, based on receiver preferences 1202, at first process step 1204, the user interface may intercept an incoming communication to a receiver and classify the communication, such as by a type of communication, who the user is, and the like. In a second process step 1206, the user interface may decide whether to transform the communication, such as automatically based on user preferences or decided by the receiver based on an interaction between the receiver and the user interface. In a third process step 1208, the user interface determines that the incoming communication should not be immediately transformed, showing the receiver the original communication and offering the ability to transform. In a forth process step 1210, the user interface determines that the incoming communication should be immediately transformed before displaying the communication to the receiver and offering to also show the receiver the original communication. This is meant to be merely a non-limiting example of how the AIA may be configured to transform an incoming communication, illustrating some basic features that may be provided to the user. Transformation types, such as described herein, may also be selectable by the user through a user interface, such as improvements in readability, creating greater conciseness, providing summarization, formatting the communication, providing language cleanup, injecting context into the communication, and the like.

Augmenting incoming communications to a user may be provided through a user interface, such as providing the ability for the user to modify the communication after it's sent, ability for the receiver to interact with and provide feedback on or react to any part of the communication, ability for the receiver to transform incoming communications, collecting user preferences in the context of incoming communication, such as through iterative questions and tracking reactions, and the like. The user interface may send the content of the communications as a link reference to an object stored on a server (e.g., in the cloud) that renders on the client side in an interactive form allowing: 1) a user receiving a communication to interact with and provide feedback on the communication or any part of the communication and 2) a user sending a communication to modify the communication at any point after it was sent (e.g., if the user thinks of something else, finds a mistake, calms down and wishes they wouldn't have set the communication, and the like). This would enable users to control their content over time, even when sent through third-party applications (e.g., email applications), where users could change and/or delete their content at any point in the future and provide a receiver with an option to modify communications they receive, such as based on their preferences.

In embodiments, a sender portion of the user interface may provide specific feedback to help users compose communications and to increase effectiveness by targeting communications to the receiver specific profiles and preferences, such as with respect to vocabulary, style, context, accuracy, the best time to send the communication, and the like.

In embodiments, a receiver portion of the user interface may display communications in an interactive format (e.g., embedded or a pop-up web page object) allowing receivers to interact with and provide feedback on the communication even if they are not using the AIA client application, which may also provide users a chance to modify the communication after it's sent. For instance, receivers may react to incoming communications by highlighting any fragment and selecting an emoji or writing a comment to it that would be immediately available to the user (e.g., the user would get notified and be able to see the emoji and/or comment by opening the communication). If nothing is highlighted, the reaction may be applied to the entire communication. If the communication was sent to multiple people or shared with a group, the receiver may choose to share the reaction only with the user, with all receivers, (e.g., everyone on the thread), with a subset of receivers, or keep it private but visible to MA. AIA may process the reactions and use them to improve the rules and models optimizing incoming communication for the receiver and assisting the user(s) in communication with the receiver.

The user interface may enable the receiver to transform incoming messages, providing reader (receiver) with the ability to modify communications they receive, such as with the transformations described herein. Each transformation type, such as described herein, may be provided with a separate filter that can be turned on or off. Additionally, the receiver may specify the types of incoming communication they would like the filters to be applied to automatically, while other communications are modified on demand by applying specific filters. Alternatively, users may request the system to modify specific incoming communications (e.g., messages, documents, and the like, as described herein) on demand, such as by applying specific filters and/or transformations. Users may be able to view the original version of an incoming message even if the communication was automatically modified. In the process, user preferences may be collected in the context of incoming communications through iterative questions and tracking of reactions.

In embodiments, the system may send a message (e.g., content) over a network, sending a link to the message that is stored on AIA servers or cloud. If the receivers have the AIA installed (e.g., as a browser or communication application extension), they will see the actual message instead of the link (e.g., AIA will display the actual message instead of the link). The receivers that don't have the AIA installed, may only see the link but will be able to follow this link to view the message and interact with it (e.g., in the browser). The sender may modify the message at any time, and all the receivers may be enabled to immediately see the updated version. If some receiver has an optimized version of the message open (e.g., a feature of the AIA augmenting incoming communication), this optimized version may automatically re-generate when the sender modifies the original message. Receivers may interact with the message and provide instant feedback (e.g., by selecting a portion of the message and reacting with an emoticon or a comment). Receivers may control who sees the feedback, such as only the sender, everybody on the thread, or just the receiver and AIA (e.g., so that AIA could better optimize future messages for the receiver). Additionally, the users may have all the AIA features for optimizing outgoing communication and augmenting incoming communication.

In embodiments, the user interface may deliver iterative questions to a user with respect to the receiver's communication preferences and/or feedback on specific communications to hone the AIA's understanding of each receiver's preferences. These preferences may be used by the system to modify incoming communications to the receiver and/or to help the sending user(s) optimize their communication with the receiver. Receivers may be motivated to provide feedback so that the AIA could better transform communications to their liking. Receivers may choose to share their feedback on incoming communications with users to provide receivers with improved versions of the modified communications of some communications they receive based on the shared feedback and preferences provided.

In transforming an incoming communication, the AIA may record preferences, it may intercept incoming communication, classify it, and decide whether it should be transformed before being displayed to the reader and what transformations should be applied, as based on the receiver's preferences. Then filters can then be run based on preferences (e.g., may be a combination of rule-based and machine-learning-based filter implementations). The AIA can then present the transformed version to the reader based on the preferences. In embodiments, user preferences may enable the selection of other functions, such as the receiver being able to switch between the transformed and the original versions (e.g., by clicking a link or tab), be able to highlight fragments and react with an emoji or provide a comment, request to modify a specific communication that AIA did not automatically modify, and the like. In embodiments, AIA may learn to modify communications of a certain type based on what the receiver requests to modify most frequently. In that case, AIA may ask whether the receiver wants to always (or never) modify similar communications, or communication from certain users.

In embodiments, the user interface and user experience may be implemented through integration with third-party platforms and communication channels (e.g., as an extension or a plug-in), as a feature of a communication platform or client (e.g., built into a messenger, email app, and the like), through a mobile platform (e.g., communication may be composed in a dedicated mobile app), stored in the cloud, and the like. Implementation may utilize a link sent through a communication channel (e.g., text message), where when the receiver clicks the link, it may launch a dedicated app or open the communication in a web browser. If the receiver is not on the platform or doesn't have the extension/app, they could get a link that would open the communication in a web browser, such as with interactive features.

If the sender modifies a communication that has already been sent, it may be updated on all clients that have it open. Synchronization between the server-side copy and the ones displayed to the sender and the receivers may be implemented using technology such as operational transformation, differential synchronization or conflict-free replicated data types. Transformed receiver-side versions may also be re-generated.

In embodiments, the user interface may capture receiver preferences, such as for contributing to their profiles, through asking a set of questions/presenting settings during user onboarding (e.g., how they would like the texts to be modified, what they would not want to see, which kind of communication they would like to always or never modify, and the like), through prompting the user to provide more answers and settings later, through tracking their communication and reactions and suggesting settings that match their communication style/behavior and reactions, and the like.

The user interface may also provide for tracking communication and content consumption habits and preferences for a receiver, providing insights and recommendations for better productivity and communication impact.

In embodiments, the AIA may augment outgoing voice and video messages. For instance, the AIA may intercept a voice or a video message, check it for correctness, clarity, and effectiveness in the background, and alert the user in case any significant issues are found, and suggest improvements (e.g., via text or voice output). In the process, the system may ask the user for additional details to get more context and identify a receiver if necessary for targeted or more effective suggestions. The AIA may augment conversations, such as to help the user understand the reactions of the receiver(s), interpret hidden and non-verbal signals, suggest what to say next to mitigate or prevent possible tension or misunderstanding, suggest adjusting vocabulary or talking speed based on the receiver's language proficiency, and the like. The AIA may augment incoming communication, such as transforming incoming communications or other content the receiver consumes into a more digestible form. For instance, the AIA may summarize longer texts and messages so that processing them takes less time, rewrite texts and messages using vocabulary and readability level that the receiver would understand (e.g., depending on his or her language proficiency level and background), rewrite texts and messages with respect to communication structure (e.g., prose vs. bullet listings), and the like.

In embodiments, the AIA may provide the ability to augment real-time conversations being carried out through augmented reality (AR) or virtual reality (VR) platforms through an AIA AR/VR communication facility, which provides communication assistance (augmented communication) to users (senders as well as receivers). The AR/VR communication facility may be implemented through an application or application extension for a third-party AR/VR platform or a feature of an AR/VR platform, and support both asynchronous communication (improving communications that are outgoing, recorded, dictated, and the like) and real-time conversations. Although the AR/VR communication facility is described primarily with respect to AR and VR technology platforms, and the sender's point of view, the AR/VR communication facility may work with any wearable device including a microphone to capture dictated or recorded communication(s), a privacy output display capability to provide assistance and suggestions to the user (e.g., an AR or VR display, smart eyeglasses, heads-up display, smart contact lenses, head-worn virtual retina display, and the like), and an in-ear speaker. Optionally, other functional resources may be utilized by the AR/VR communication facility, such as a camera to read body signals in a conversation, identify or recognize specific people in a conversation, recognize speech (from mouth movements), recognize eye movements, recognize written text, intercept video communications, and the like. Body sensors (implantable or not) may be used to capture emotions, level of stress, and the like, that may be associated with communication. A brain-computer interface may be used to capture reactions, intentions, thoughts, and the like. In embodiments, the AR/VR communication facility may be implemented with a smart speaker to intercept voice communications, analyze them, and either translate them into better-formed text and then read back or display them in a target application for confirmation or iterations. The AR/VR communication facility may provide feedback/suggestions via voice or a companion application display (e.g., smartphone, smart-glasses, and the like) before finalizing and sending a recorded communication. The AR/VR communication facility may be implemented with a VR platform to augment conversations between people as avatars in virtual reality through capturing and improving recorded communication and assisting in real-time conversations. In embodiments, observed communication can be tracked and analyzed to generate insights and provide feedback to the user over time, such as processed on the device, processed offline, processed in a hybrid client-server system (e.g., partially processed on the device), and the like, such as with offline or embedded models.

In embodiments, the AR/VR communication facility may augment outgoing recorded or asynchronous voice or video communication. For instance, the AR/VR communication facility may intercept a voice or a video communication the user has recorded through a smart speaker or a smart device camera (e.g., the ability to connect to a network via different wireless protocols can operate to some extent interactively and autonomously, such as by interacting with its user through processing voice commands/input and exchanging the data with other smart devices remotely), extract the content (e.g., text and non-verbal signals from the voice tone, pauses, body language, and the like), analyze correctness, clarity, and effectiveness, alert the user in case of any significant issues, and suggest improvements. In the process, the AR/VR communication facility may ask the user for additional details to get more context and identify a receiver if necessary for targeted or more effective suggestions. For instance, a user may send an audio or video communication through an appropriately equipped headset. The AR/VR communication facility may intercept the audio or video (e.g., through an integration with a message recording application, as a feature of a communication platform that supports devices with built-in cameras or microphones, and the like). The AR/VR communication facility may then process the captured audio or video and extract verbal content. With audio, the verbal content may utilize audio speech-to-text conversion, and with video, the extraction may utilize video speech-to-text conversion (e.g., possibly in combination with audio speech recognition). The system may then extract non-verbal signals, such as with audio, identifying psycho-emotional state (e.g., emotions, mood, stress level, and the like) and implicit intents of the user based on the tone and pitch of the voice, speech patterns (e.g., pauses, interjections and other sounds, and the like, or with video, identifying psycho-emotional state (e.g., emotions, mood, stress level, and the like) and implicit intents of the user (e.g., based on facial expressions, posture, gestures, and the like) for identifying culture-specific body language. This may provide an accounting for possible multiple meanings and misinterpretations of non-verbal signals by the receivers. The AR/VR communication facility may then capture the context of the communication (e.g., level of background noise, visual background, time of day and the like); identify the receiver, such as by obtaining an identifier from the communication platform (or by asking the user); and analyze verbal and non-verbal content for correctness, clarity, and effectiveness, given the receiver and the context of the communication. The AR/VR communication facility may then provide general feedback on the communication, such as suggesting modifications or rewrites to the communication (or parts of the communication). In the case of an asynchronous communication (e.g., not yet interactive with the receiver, the user has more time and available focus, so the AR/VR communication facility may be able to rewrite longer phrases or the entire communication and present them to the user for review with a slight delay without significant disruption to the communication flow. At this point the user may decide to re-record the communication or discard the feedback/suggestions. For instance, if the user discards the feedback (such as repeatedly), the AR/VR communication facility may ask whether the user would like to mute AIA for this type of communication or this receiver and update the preferences accordingly. If the user re-records the communication, the AR/VR communication facility may intercept the new recording, re-analyze, compare to the previous communication, and provide feedback on the new version (e.g., providing encouragement in case of positive changes).

In embodiments, the AR/VR communication facility may augment real-time conversations, such as to help users understand each the reactions, interpret non-verbal signals, suggest what to say next to mitigate or prevent possible misunderstanding or tension, suggest adjusting vocabulary, articulation, or talking speed based on a receiver's language proficiency, and the like. For instance, for the AR/VR communication facility operating in conjunction with a wearable AR device with built-in microphone and camera, the AR/VR communication facility may capture audio and video communication data using the wearable device. The AR/VR communication facility may process the audio and video, separating audio and video signals from individual communication parties (e.g., recognizing faces and bodies in the video, extracting voices from the audio signal), matching audio and video from each communication party (e.g., tracking sound direction and/or lip moves to match individuals' video and audio streams), and filtering voices and video of individuals and objects that don't participate in the conversation. The AR/VR communication facility may apply face and body tracking to the video of communication parties, such as to be able to recognize facial expressions, posture, and gestures, identify the voice of the user, identify other communication parties (e.g., one or more individuals the user is communicating with) using facial or voice recognition or data/identifiers sent by their devices. The AR/VR communication facility may extract verbal content from the captured voice or lip/mouth movements (e.g., using audio speech to text and/or video speech to text conversion), extract non-verbal signals from the captured voice and face/body tracking (e.g., identifying psycho-emotional state of the parties, such as emotions, mood, stress level, and the like) based on the tone/pitch of the voice, speech patterns (e.g., pauses, interjections and other sounds, and the like) based on facial expressions, posture, and gestures, identify culture-specific body language, identify implicit intents of the parties based on their tone, face and body language, and the like. The AR/VR communication facility may recognize other context, such as current characteristics and changes in the environment (e.g., background noise, relative spatial positions of communication parties, location, geography, and the like), identify the characteristics of the users from communication profiles or audio/video (e.g., native/non-native, based on the accent), and process body sensor data.

In another instance, the AR/VR communication facility may operate in conjunction with a wearable VR device, where in this example it is assumed that the conversation happens between avatars capable of speech and body language mimicking human users, controlled by human users, or generated by AI agents. In this instance, the process would begin with capturing data from a VR platform. This may be raw audio and video as in the case of AR, separate speech and visual signals from each participant, parsed data (e.g., textual messages, emotion/intent signals, and the like), and/or meta-data (e.g., as identifiers and characteristics of the avatars or the parties represented as avatars). The AR/VR communication facility may extract identities and characteristics of the parties, verbal content, non-verbal signals, and conversation context from available data. The AR/VR communication facility may maintain a digital representation of the conversation, splitting the verbal content from each communication party into individual communications, maintaining a digital representation of the conversation thread (e.g., updating it in real time) by tracking the sequence and relations between the communications (e.g., who each communication originates from, is addressed to, and which previous communications it references/answers or expands on), and associating captured non-verbal signals with individual communications (e.g., tagging communications with non-verbal clues). The AR/VR communication facility may analyze incoming and outgoing communications and provide real-time assistance. For instance, the AR/VR communication facility may give the user an option to view text transcriptions of others' communications as subtitles via an VR display, such as smart eyeglasses, HUD, contact lenses, virtual retina display, or the like. This may help the user understand the communications in cases of unfamiliar accents, limited listening proficiency (e.g., a user listening in a language that is not a user's native language), or inability to hear well (e.g., due to background noise, hearing impairment, and the like). The AR/VR communication facility may also translate the speech from one or more languages into a language the user can understand and display the translations in a similar way. The AR/VR communication facility may augment what the user sees and/or hears with a representation of non-verbal signals from other communication parties (and possibly the user themselves for a self-check). The AR/VR communication facility may overlay the image of communication parties on a VR display with a label, an emoticon, or an ideogram indicating their psycho-emotional state (e.g., emotion, mood, stress level, and the like), explaining a recent gesture (e.g., a sign of a welcome, gratitude, and the like, such as in the party's culture) or possible implicit intent (e.g., a desire for intimacy, a lack of interest, increase/decrease in domination, and the like), such as based on different kinds of recognized body language.

The AR/VR communication facility may warn the user when there is an increased risk of miscommunication, conflict, or ineffectiveness in the conversation, such as when the user talks too fast to someone who is a non-native speaker, the AR/VR communication facility may suggest lowering the pace or increasing articulation, or when the user uses an idiom that the other party in the conversation may not understand, the AR/VR communication facility may suggest a simpler phrasing or just display the idiom in question and recommend rephrasing it. The AR/VR communication facility may analyze the user's pronunciation and issue a warning in case of incorrectly pronounced words that may lead to a misunderstanding, and suggest the correct pronunciation (e.g., with generated voice or text notation); identify a grammatical error in the user's speech and issue a warning when it may lead to miscommunication or bad perception, and display a corrected version of the phrase so that the user could repeat and correct themselves; detect inappropriate vocabulary or style choices in the user's speech and issue a warning when the other party may not perceive them well (e.g., based on their communication profile), and suggest dynamically adjusting the style or language and/or call out words and phrases to avoid; detect inflammatory language or non-constructive non-verbal signals in the user's speech or body language (e.g., voice tone, proximity change, and the like), and alert the user and suggest taking a pause; detect negative signals from the other party (e.g., mood change, increased stress level, loss of attention/interest, and the like) and alert the user to be aware or attentive, and consider changing the course of the conversation; suggest phrases that would be appropriate at a particular point in the conversation, such as saying thank you; detect unanswered questions from the previous communication(s) and prompt the user to address them; detect when the user (e.g., repeatedly) interrupts the other party and displays a warning when that happens; and the like. The warnings may be a visual or an audio alert with a short communication from AIA. The user may be able to mute/unmute the alerts and adjust the sensitivity. AIA may also adjust sensitivity automatically based on the communication parties involved, the relationship between them, and the type/tone of the conversation (e.g., it may mute all but most critical alerts during a casual chat between good friends and increase the threshold during a business meeting with unfamiliar participants). In embodiments, the AR/VR communication facility may provide feedback and analytics after the conversation, analytics/statistics to the user based on the recent conversation(s), actionable feedback to the user based on how the recent conversation(s) went, and the like.

The AR/VR communication facility may detect a user's emotional or physiological state to correlate with their current communication style and reactions to previous communications, such as through biometric data from the user (e.g., from a wearable device), voice indicators (e.g., tone captured with a built-in microphone), visual indicators (e.g., from facial expressions or body language captured with a built-in camera), and the like. For instance, a user may be wearing a wearable device or multiple devices that monitor temperature, heart rate, galvanic skin response, and blood sugar; voice signals (e.g., vocal inflections, tone/pitch, volume, speech patterns, and the like), facial expressions, and body language. Measurements and changes in this data may be compared to an emotional profile, such as stored in the user's communication profile, and measurements in a population. The AR/VR communication facility may then be able to determine if these indicators are adversely affecting the user's communications, such as when a spike in body temperature, heart rate, and low blood sugar are detected, making a person more likely to communicate in a frustrated or angry manner. The AR/VR communication facility may then prompt the user to be aware of such potential influences, and offer communication adjustment suggestions (e.g., taking a pause, a breath, changing the tone/language, and the like). The AR/VR communication facility may also correlate detected emotions with the content and/or context of the user and use this as training data for modules that predict reactions and also for updating the user's communication profile.

Figure 13:
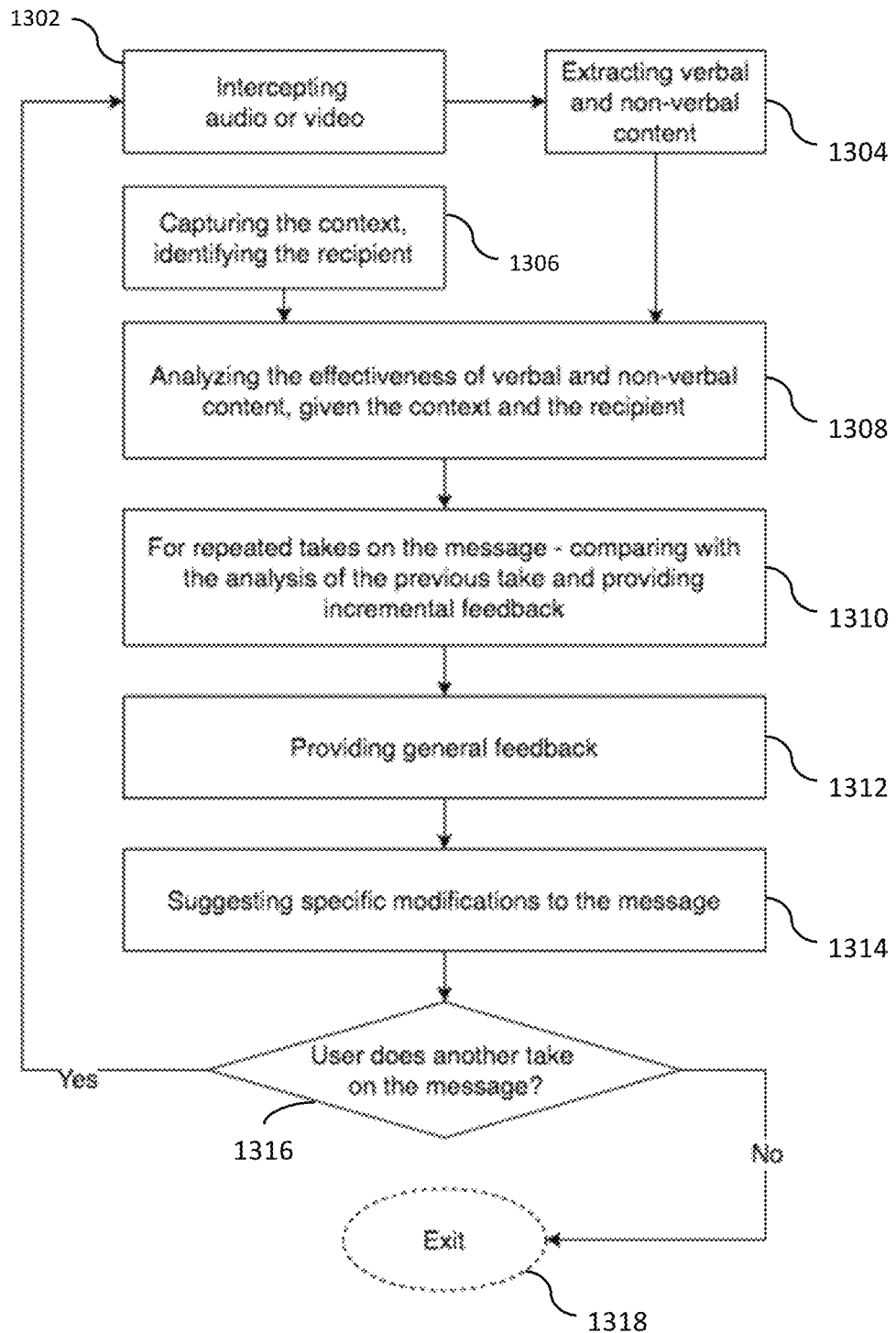
FIG. 13 illustrates an audio-visual communication workflow according to exemplary and non-limiting embodiments.
Figure 14:
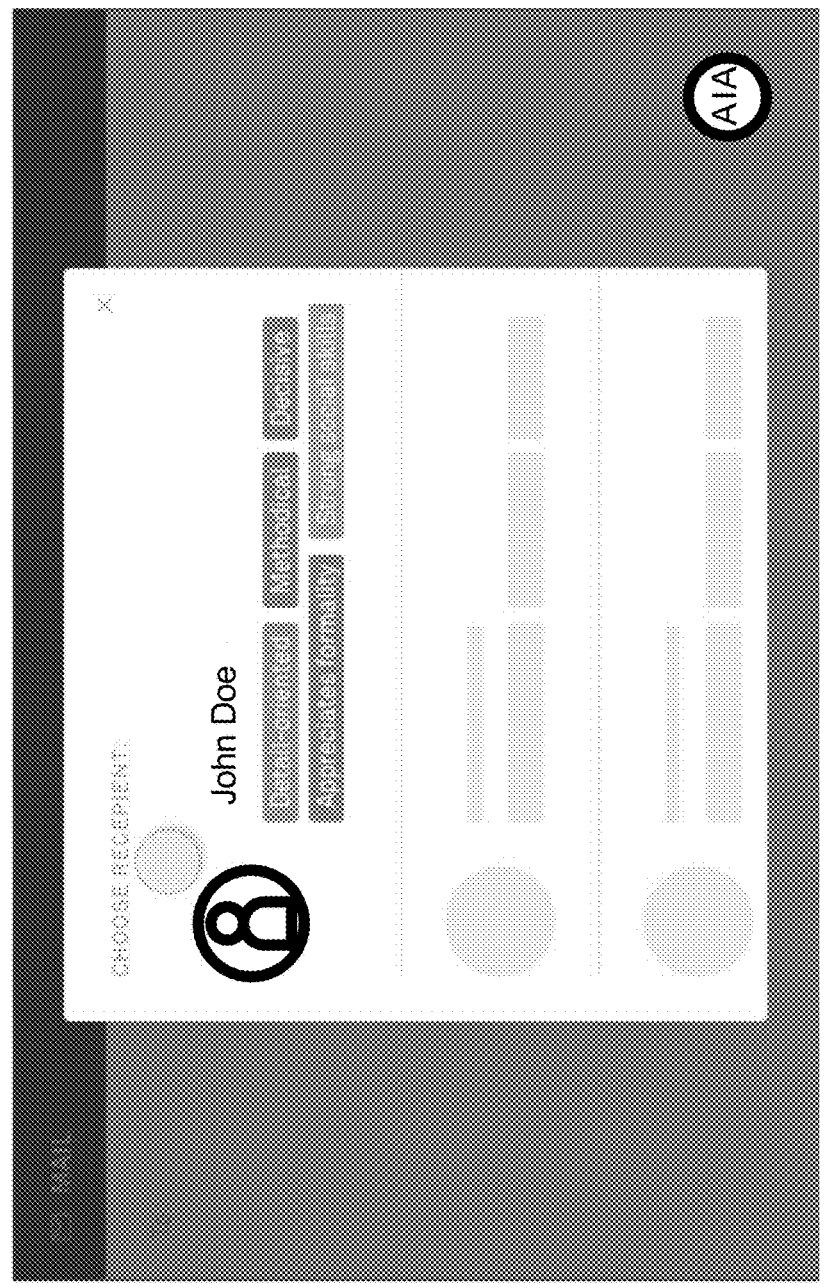
FIGS. 14-20 illustrate user interface views of an artificial intelligent assistant according to exemplary and non-limiting embodiments.
Figure 15:
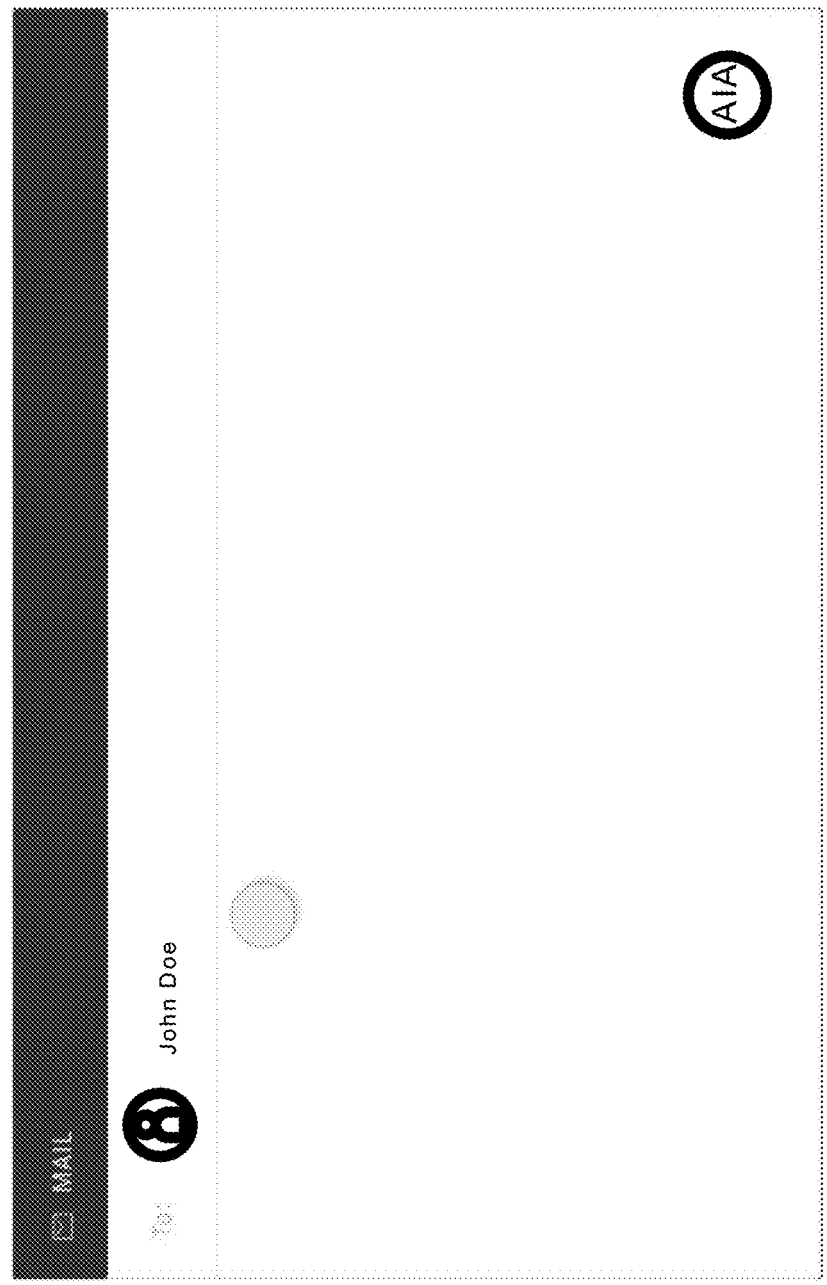
Figure 16:
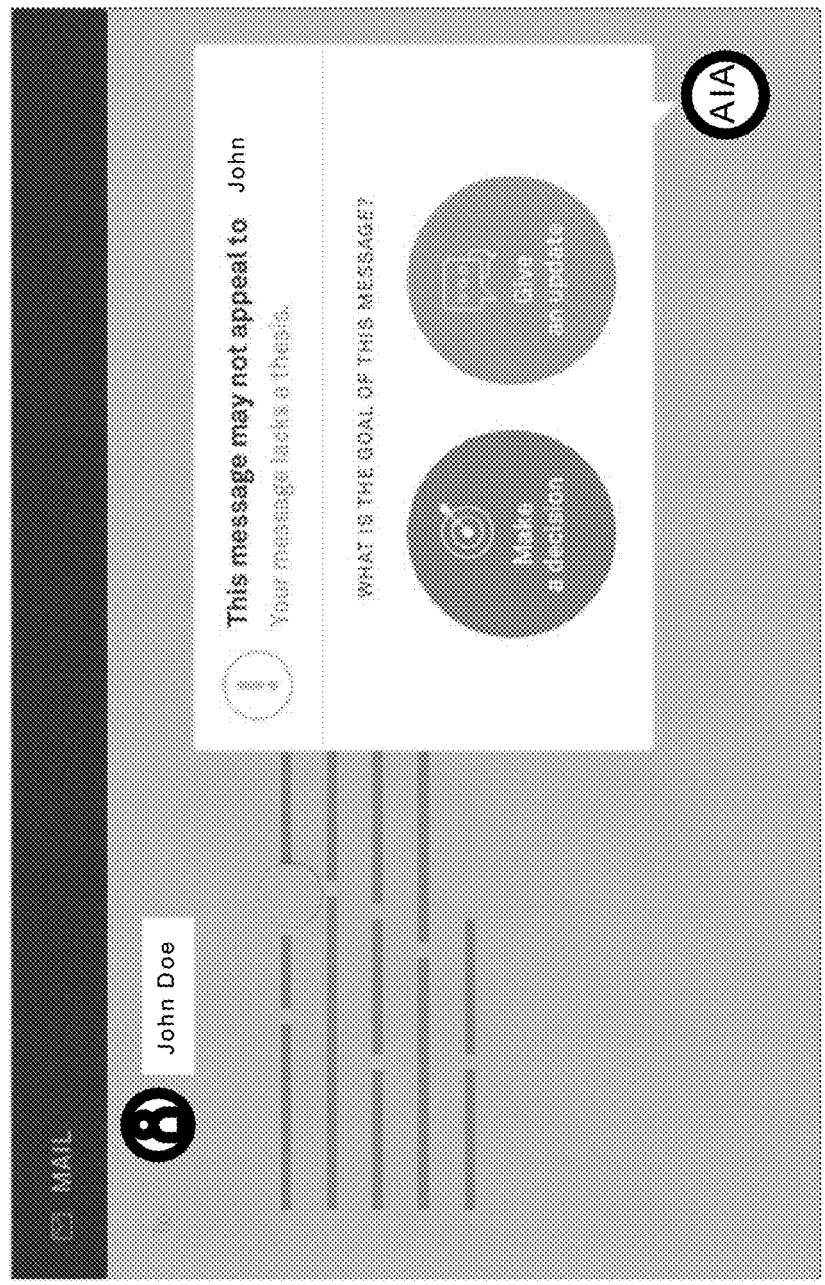
Figure 17:
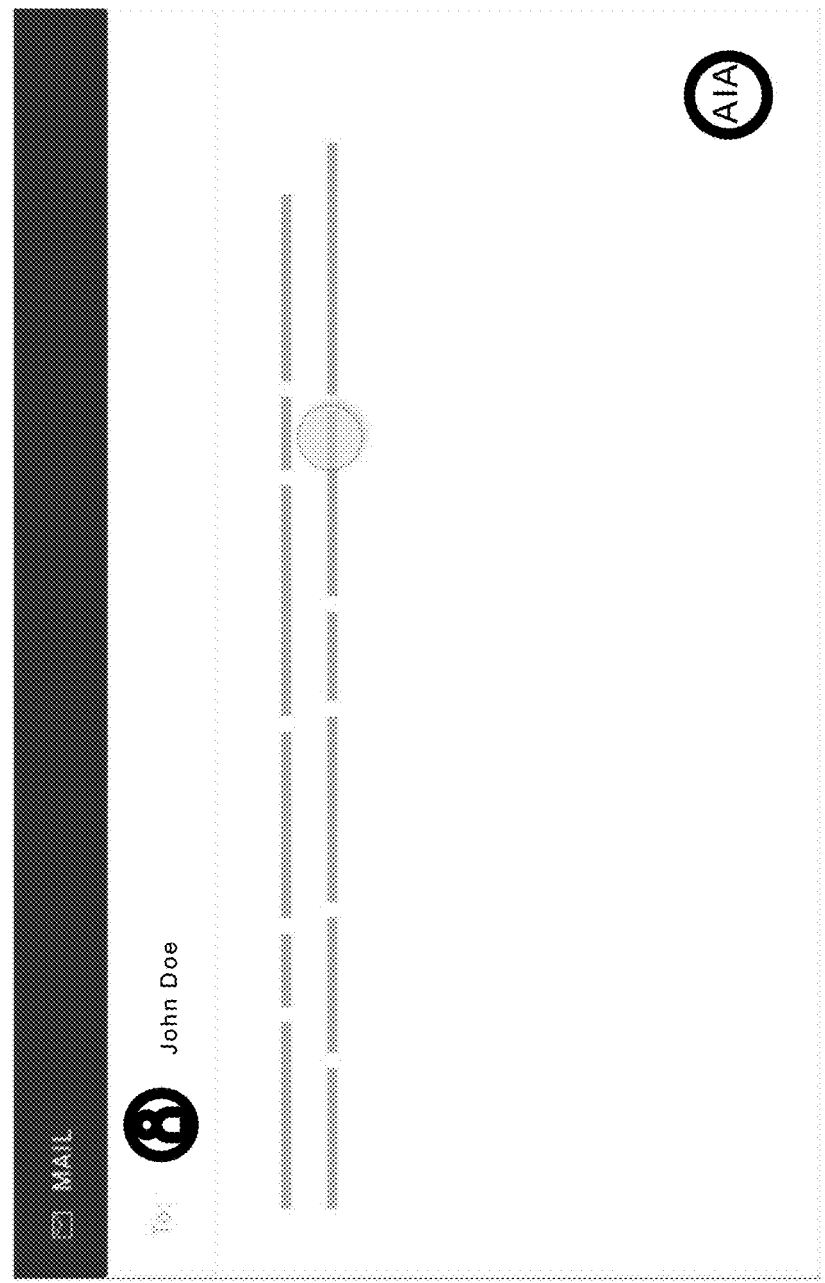
Figure 18:
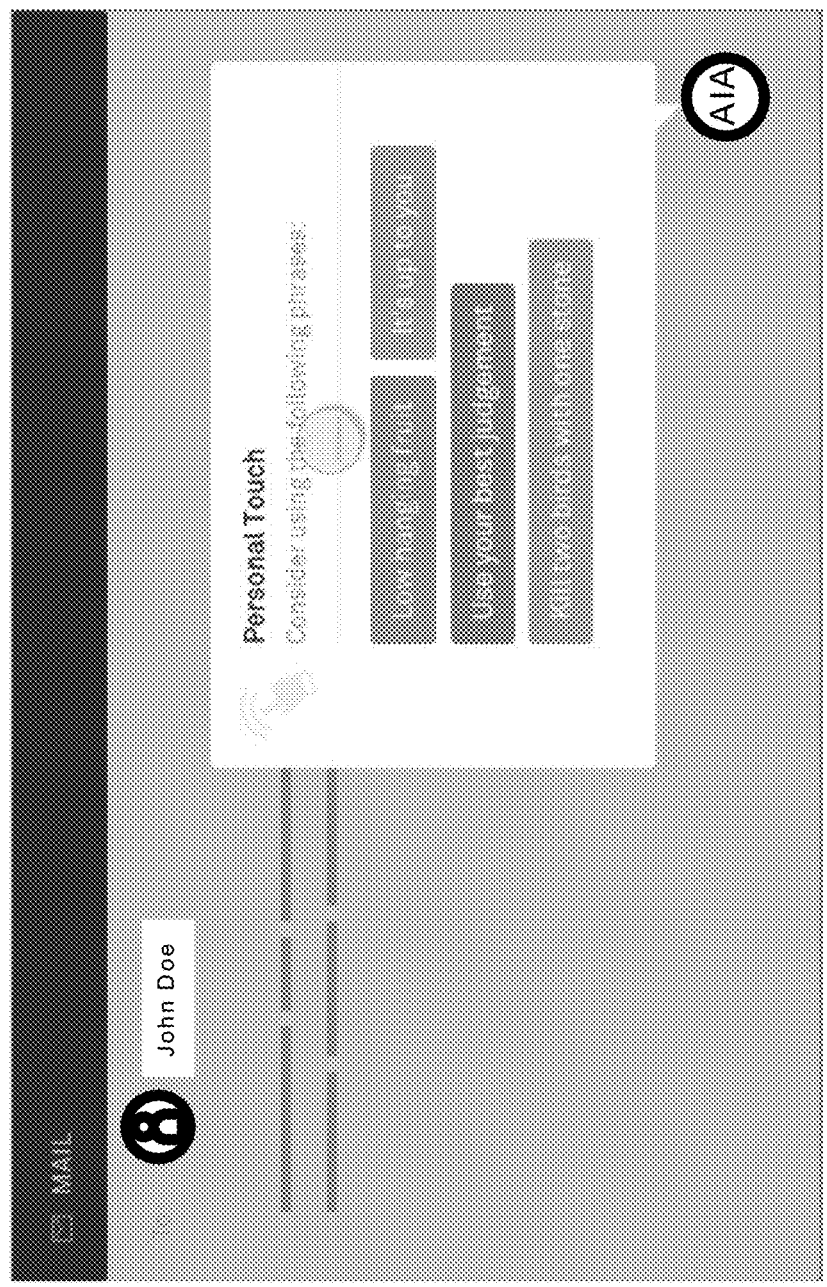
Figure 19:
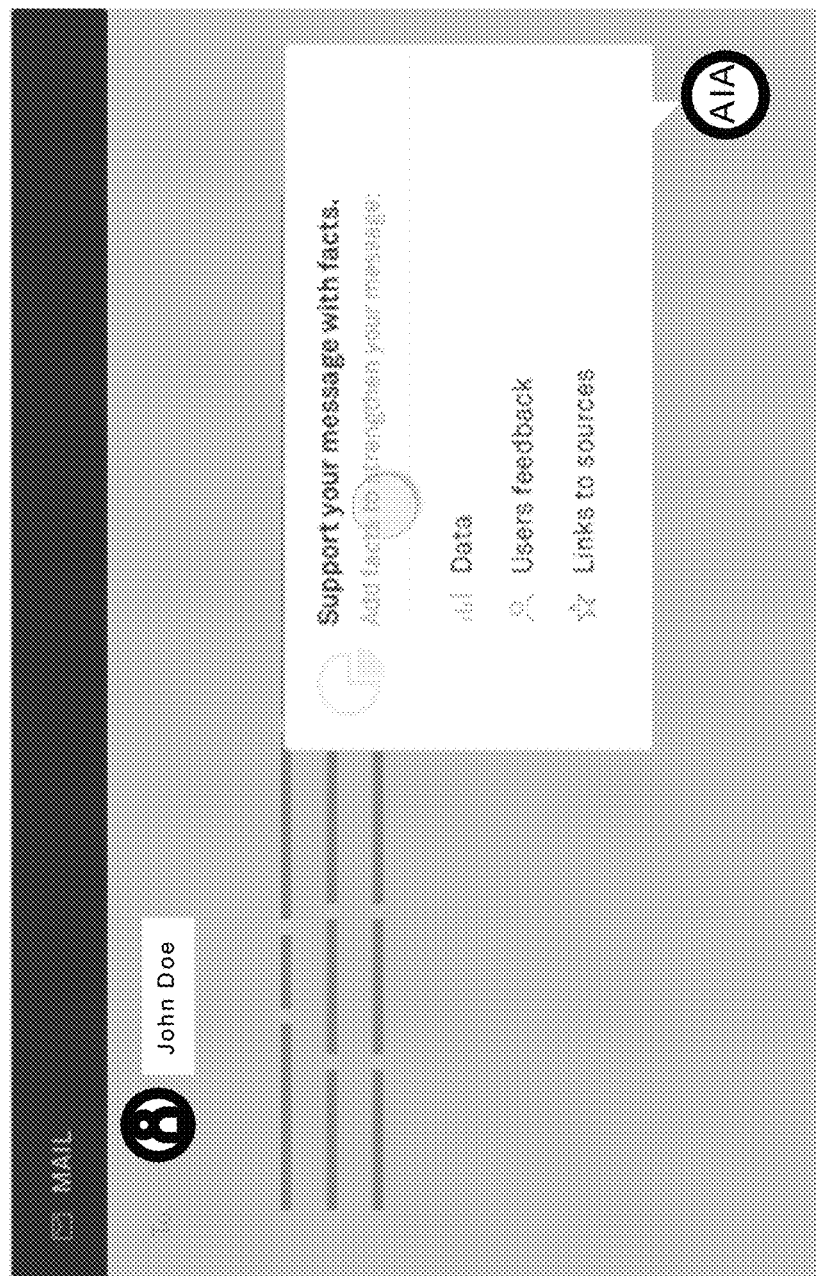
Figure 20:
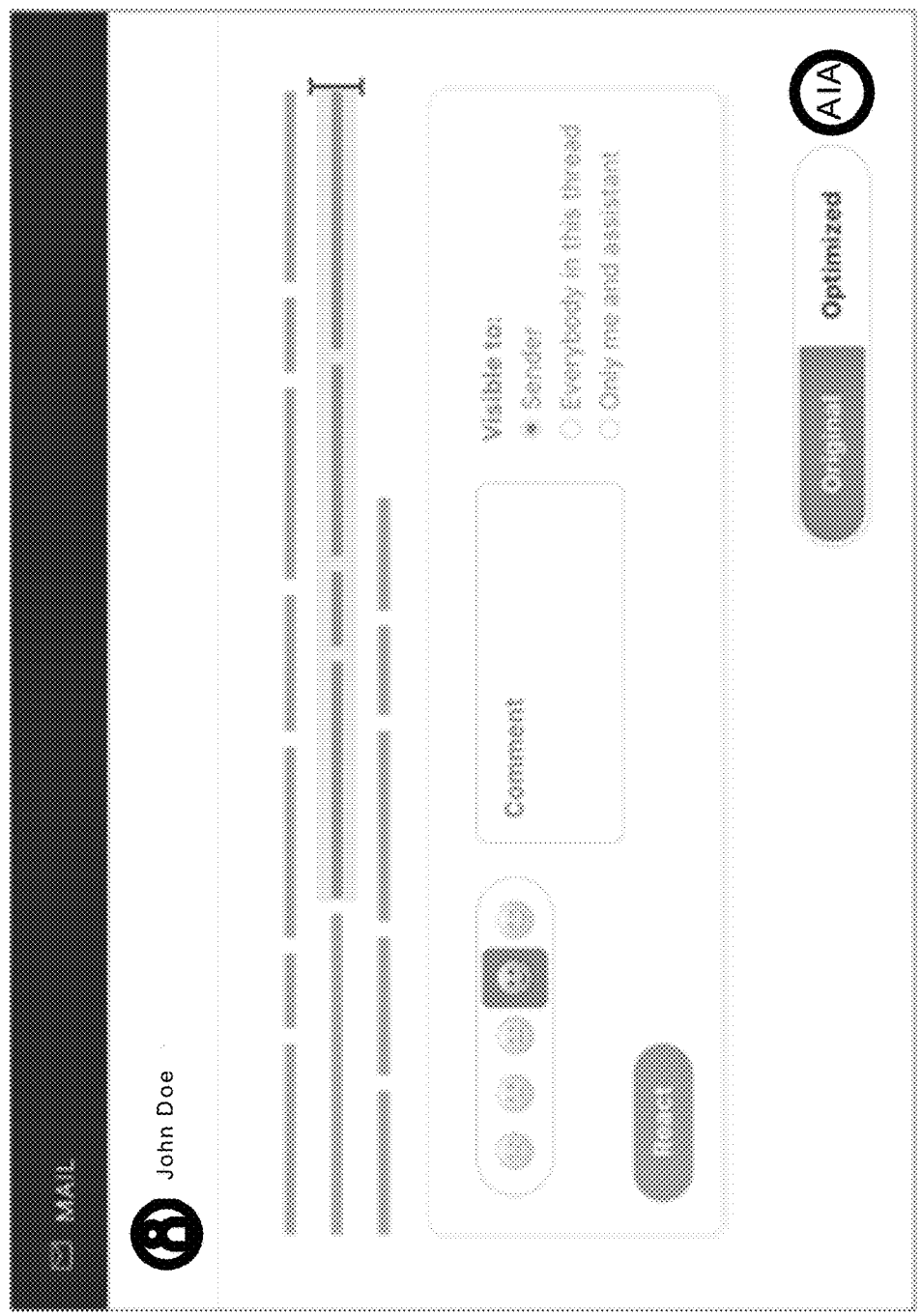
Figure 21:
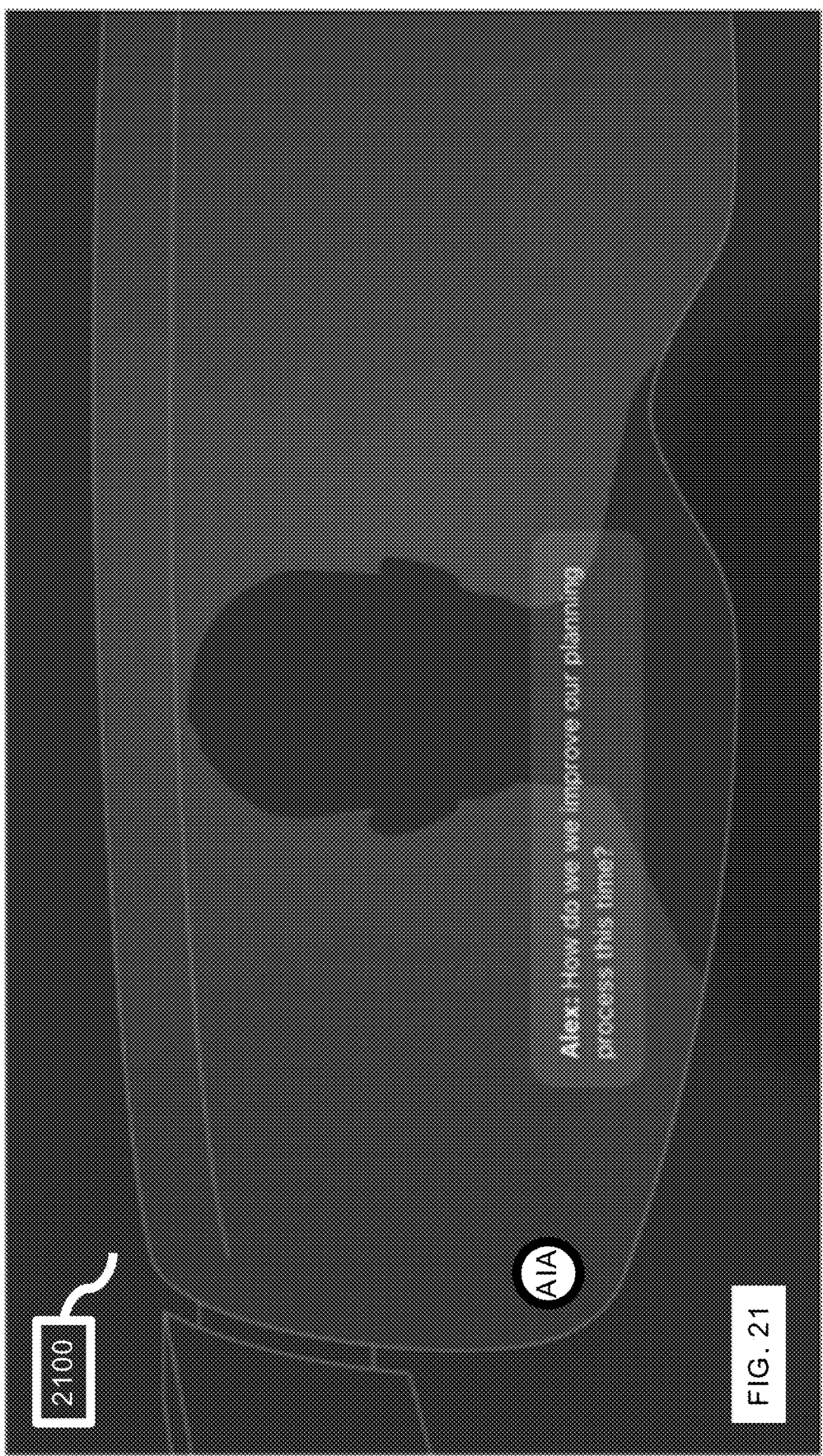
FIGS. 21-27 illustrate an example augmented reality glasses user interface view of an artificial intelligent assistant according to exemplary and non-limiting embodiments.
Figure 22:
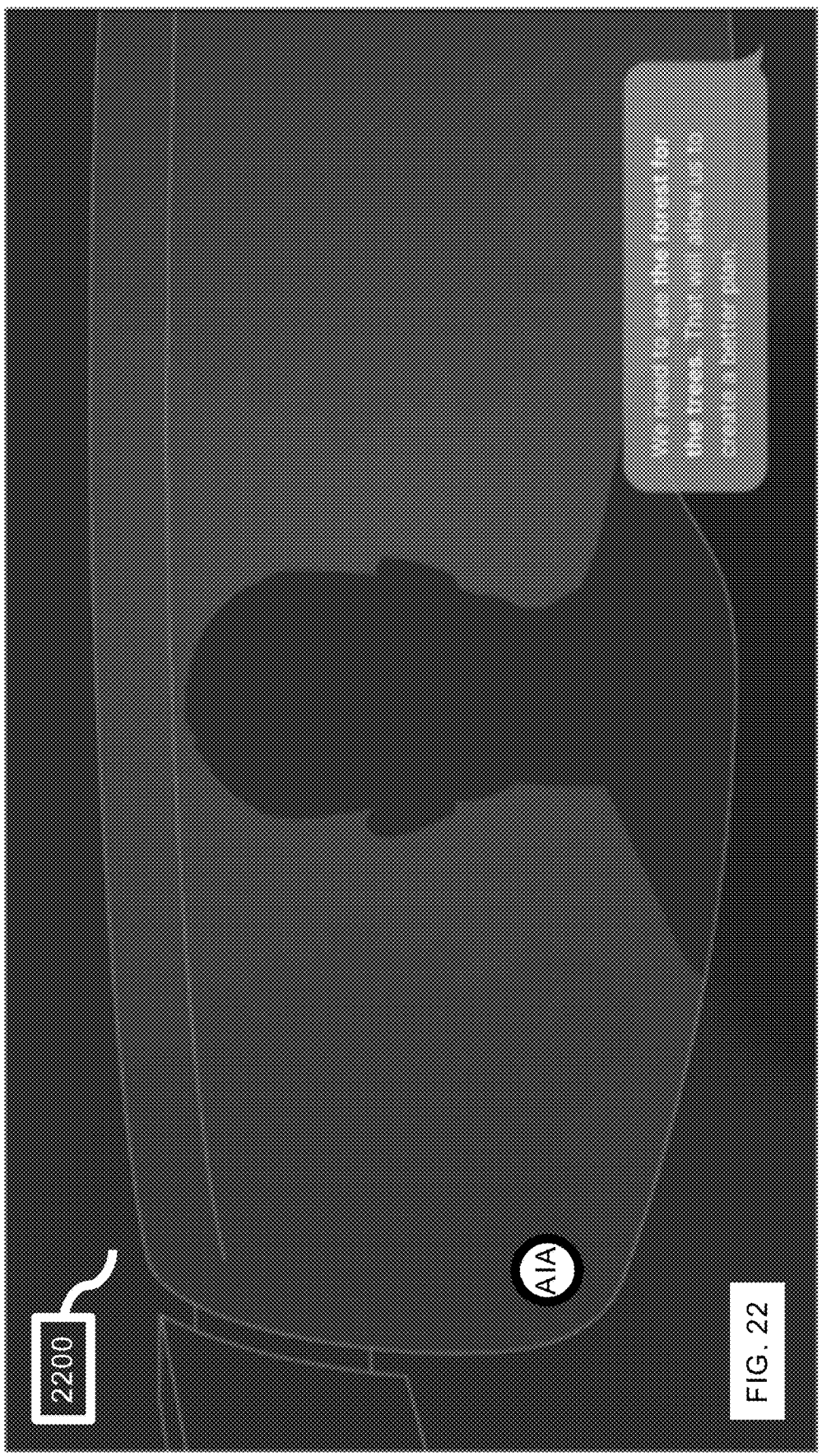
Figure 23:
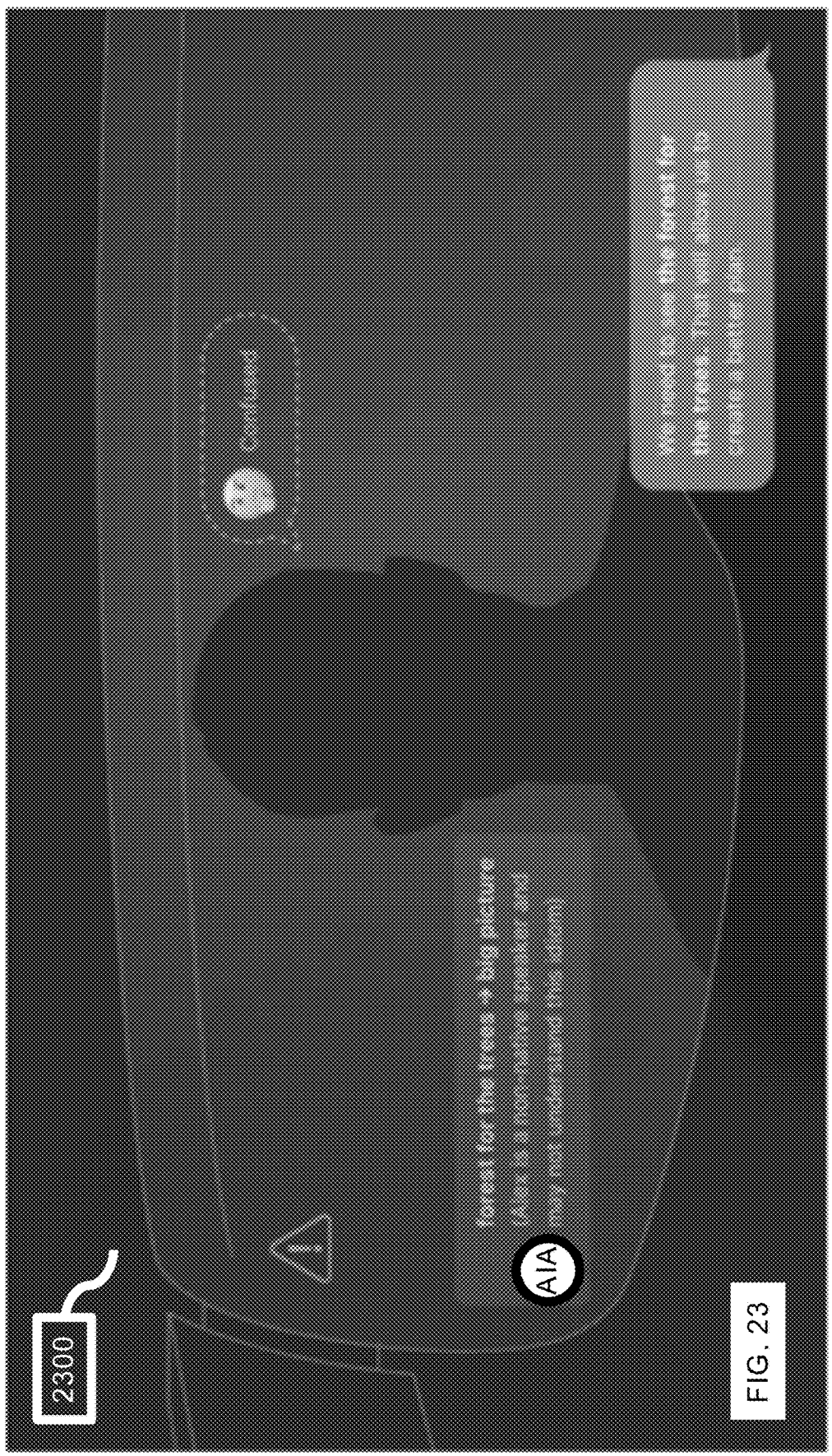
Figure 24:
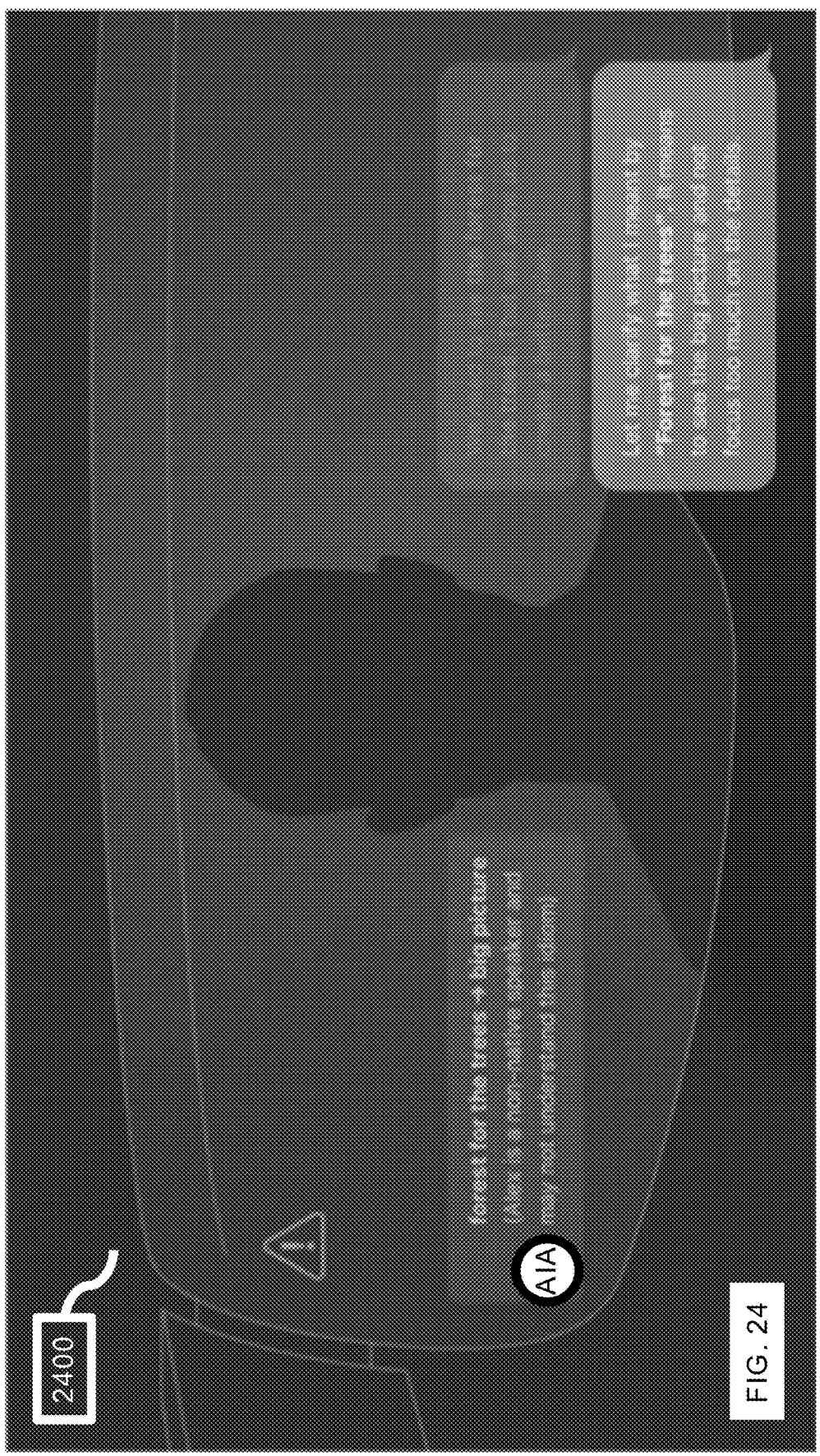
Figure 25:
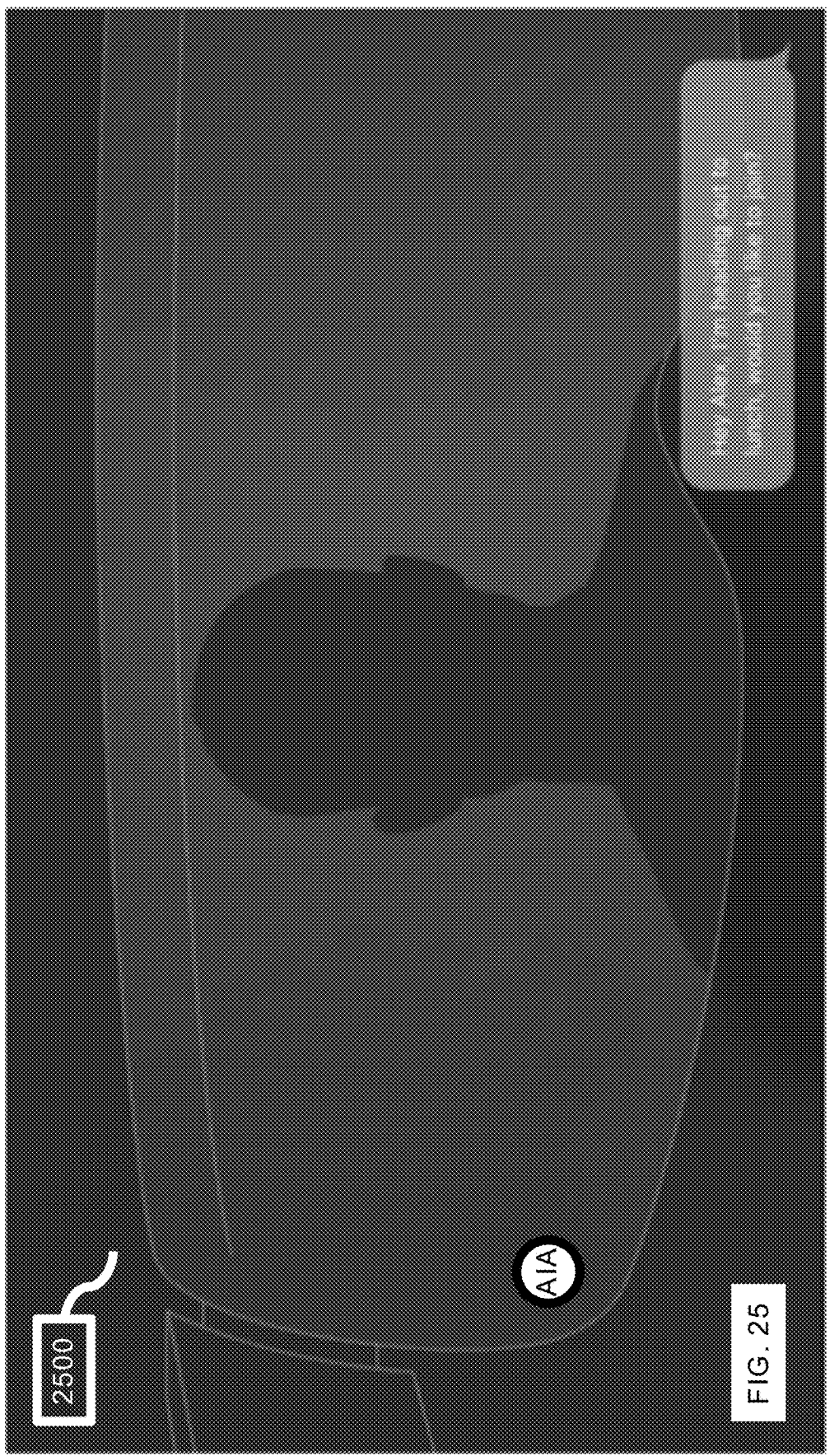
Figure 26:
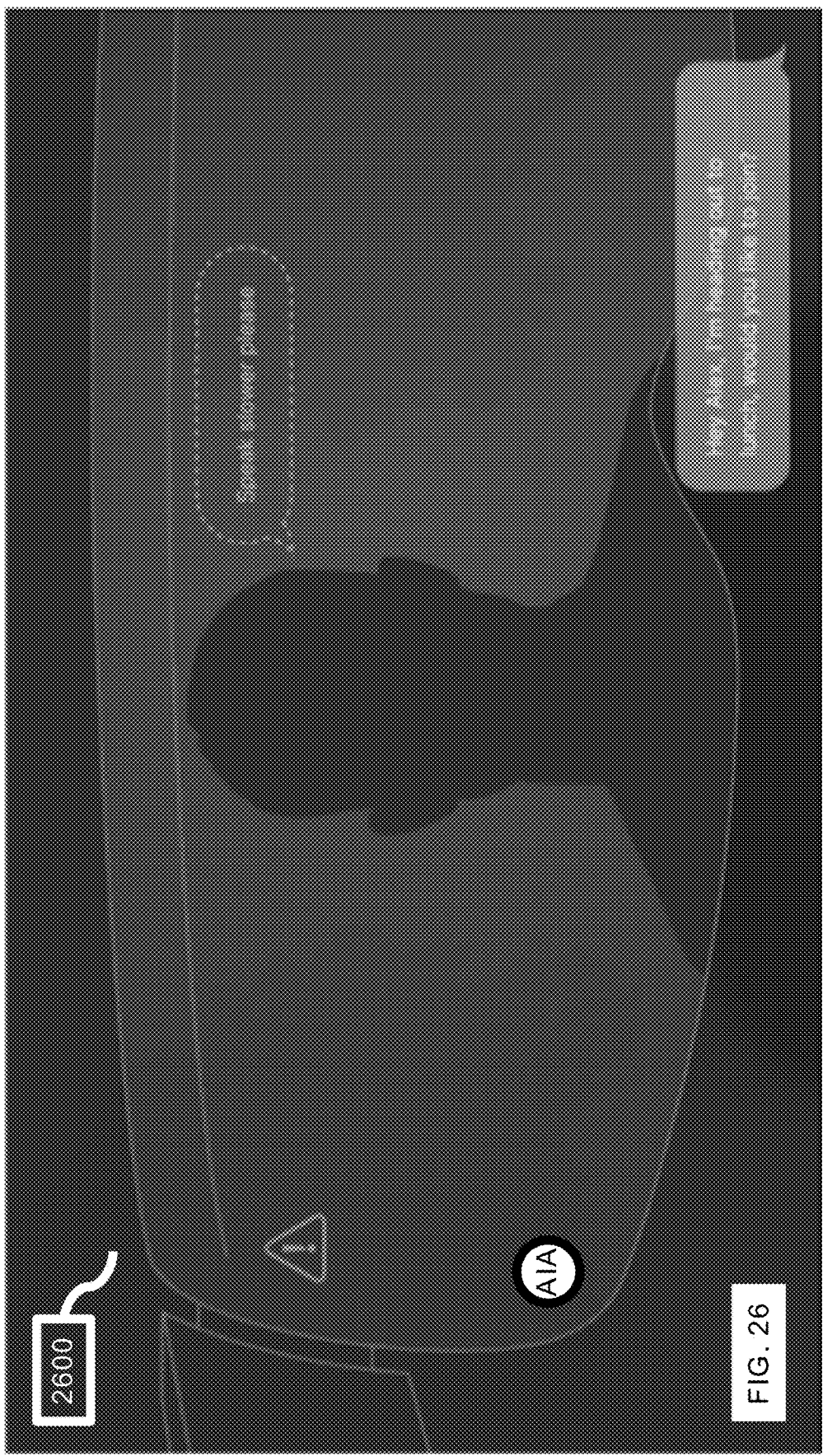
Figure 27:
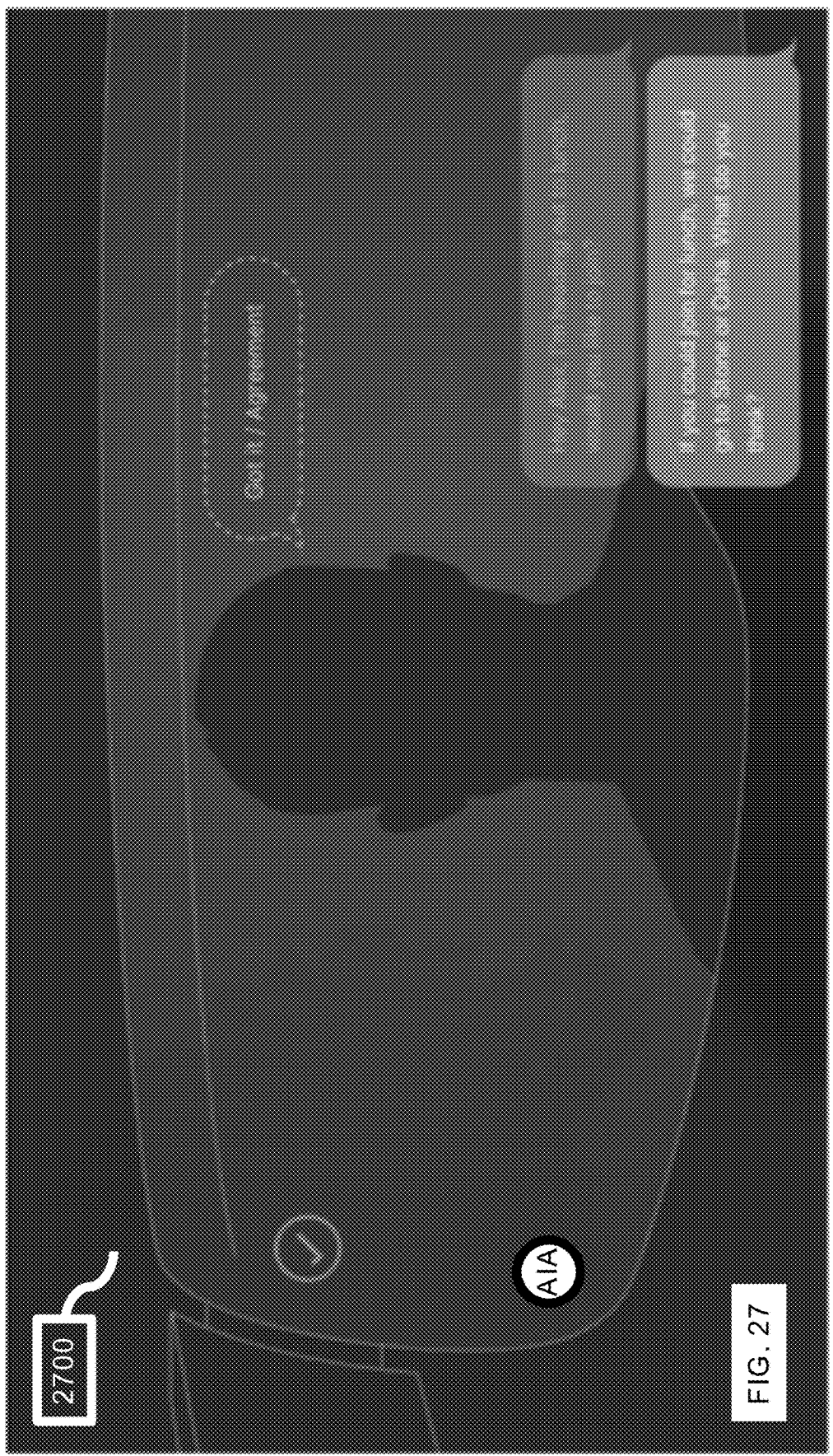

In an example embodiment, and referring to FIG. 13, the AR/VR communication facility may intercept an audio and/or video communication 1302 and extract verbal and non-verbal content 1304, which may be analyzed for effectiveness of verbal and non-verbal content 1308, given the context and the recipient, and capturing the content identifying the recipient 1306. For repeated takes on the message, the system may compare the analysis of the previous take and providing incremental feedback 1310, providing general feedback 1312, and suggesting specific modifications to the message 1314. The user may then decide 1316 whether to take on another message or not, and if yes, run through the process again, and if no exit the routine 1318

FIGS. 14-20 illustrate a non-limiting example of an interaction with a user who is generating a textual message targeted to a receiver 'John Doe', where the AIA is assisting the user based on the receiver's communication profile. In embodiments, the AIA may also be assisting the user through access to the user and/or receiver's communication profile (e.g., how does the user know John Doe), contextual information available from past interactions between the user and John Doe (e.g., how well have interactions gone before), current events (e.g., making a passing comment about an important item in the news where the AIA has determined a level of relevancy between the event and the message), and the like. At a first computer user interface screen view 1400, the user is able to view aspects of John Doe's communication profile, such as including the attributes of being detail-oriented, methodical, decisive, appreciates formality, has strong social skills, and the like. This enables the user to orient themselves before beginning the process of writing the textual message to John.

At a second computer user interface screen view 15000, the user begins to draft the message. At a third computer user interface screen view 1600, the user is well along in the drafting of the message, perhaps even at the end of a first draft. The AIA may automatically evaluate the text, such as continuously as the user types, at periodic points during drafting, when the user pauses, and the like. The user may also have the option of requesting the AIA to evaluate the text at any point in time. In this instance, the AIA provides feedback to the user that indicates "this message may not appeal to John", and offers some indications as to why, including a note that "your message lacks a thesis." The AIA additionally prompts the user to improve the message by asking "what is the goal of this message?", with options, including "make a decision" and "give an update". This feedback is meant to be illustrative, and not limiting in any way, but used as one example of how the AIA might attempt to aid the user in generating a more effective message. In embodiments, the "make a decision" and "give an update" may be buttons to be selected by the user, which would lead the AIA to provide further refined suggestions, such as specific suggestions as to how the message could be improved with a goal in mind. Although this illustrative example shows visual indications and suggestions, feedback to the user could be audible, or be provided as a combination of visual and audible. For instance, the AIA could audibly ask the user about the goal of the message and offer suggestions. In turn, the user could audibly select a choice, such as saying "make a decision."

In a forth computer user interface screen view 1700, the user may view and approve a change in the message due to interaction with the AIA, continue typing, receive additional indications of text content that could potentially improve the effectiveness of the message, and the like. In a fifth computer user interface screen view 1800, the user may receive an additional suggestion from the MA, where in this case the AIA suggests adding a "personal touch" and for the user to "consider using the following phrases", including "low hanging fruit", "it's up to you", "use your best judgement", "kill two birds with one stone", and the like. Alternately, the AIA may make suggestions that target the receiver's language, geographic location, culture, and the like, such as suggesting idioms that the receiver is familiar with based on prior usage, geographic indicators, and the like. In embodiments, the user may accept one of the suggestions by having the AIA insert a selected phrase into an appropriate place in the message, choose from a number of options as to where the selected phrase could be inserted, manually insert the message, and the like, where the interchange between the user and the AIA may be through visual and/or audible communication. In a sixth computer user interface screen view 1900, the AIA provides another feedback to the draft message that includes "support your message with facts", and to "add facts to strengthen your message", such as with data, feedback, links to sources, and the like. In a seventh computer user interface screen view 2000, the user, having improved the message through interaction with the AIA, emails the message to John Doe. Through the process of feedback and interactive suggestions, the AIA has thus enabled the user to improve the message.

In embodiments, the AIA may provide feedback and suggestions to the user in an automatic interactive step-wise process such as illustrated through FIGS. 21-27. Alternately, the user may elect to have the process provided in a more immediate manner, such as where the AIA analyzes the message and provides options all at once for the user to select. Further, the user may be limited by time, and thus enable the AIA to suggest an improved message without options, such as where the MA utilizes previous interactions with the user to determine what the user is likely to select, or utilizing previous interactions with the user to select a different set of options than has been previously selected (e.g., to keep the user's messages diverse), and the like.

FIGS. 21-27 illustrate a non-limiting example of an interaction of a user in an exchange with a second user (e.g., face-to-face with message content and AIA feedback displayed to the user, texting with a remote receiver showing the text dialog along with MA feedback). Although the depiction is of a textual exchange as viewed on glasses (e.g., augmented reality glasses, or any glasses enabled content display facility), the exchange is more generally representative of an exchange that could be implemented an any of a variety of computer platforms, such as on a smart phone, a smart watch, a tablet, a laptop computer, and the like. Further, although the exchange is depicted as a visual presentation of the exchange, the exchange could also have been at least in part verbal, such as where the conversation between the users is verbal (e.g., a phone call over a cellular network), but where the AIA feedback is presented in a visual text format for the user to read during the verbal exchange. Further, the entire exchange, including the exchange between users, and the feedback presented from the AIA, are both verbal, such as the MA providing verbal feedback to the user as the conversation between users takes place.

In a first computer user interface screen view 2100, the user initiates a conversation with another user, saying "Alex: How do we improve our planning process this time". In a second computer user interface screen view 2200, the user transmits a portion of conversation, "we need to see the forest for the trees. That will allow us to create a better plan." In a third computer user interface screen view 2300, the MA provides feedback to the user, "'Forest for the trees" is an idiom that Alex might not understand, as he is not a native speaker. In this instance, the AIA, having access to the receiver's communication profile, reminds the user that the receiver is a native speaker, and as such should modify the conversation appropriately. As a result, as shown in a forth computer user interface screen view 2400, the user follows up with a clarifying statement, "Let me clarify what I meant by 'Forest for the trees'. It means to see the big picture and not focus too much on the details." In a fifth computer user interface screen view 2500, the user tells the receiver (by voice) "Hey Alex, I'm heading out to lunch, would you like to join?" In a sixth computer user interface screen view 2600, the AIA presents feedback to the user to "Speak slower please" to alert the user to the mismatch between the speed of the user's speech and the ability of the receiver to comprehend. In this instance, the AIA may have been monitoring the speed of the user's speech because the AIA had access to the receiver's communication profile that identified the receiver was a non-native speaker, and where the AIA then flagged speed of user speech for monitoring. Alternatively, the AIA may have determined the receiver to be a non-native speaker by monitoring the speech of the receiver. As a result of the AIA monitoring the user's speed of speech, in a seventh computer user interface screen view 2700, the user restates the passage more slowly as "If you could join for lunch, we could go to Stone or Osha. What do you think?" Throughout the conversation, the AIA, through interactive feedback, enabled the user to make real-time adjustments to the conversation to accommodate the receiver being a non-native speaker, such as where the non-native speaker may be unfamiliar with idioms of the non-native language, limited to a speed of conversation in their non-native language, and the like.

In embodiments, the AIA may suggest a message template and/or modality based on a given goal and context. For instance, the AIA may compose a message asking whether 'x' will show up for dinner and deliver the message through an appropriate communication channel (e.g., email, text message, and the like). In embodiments, a communication channel may be selected based on the communication profile of the receiver, such as including data pertaining to preferences and behavior. For instance, the system may select a communication channel that the receiver uses most often or is most likely to respond to, such as based on a statistical analysis of observed behavior. In embodiments, a message may be modified based on feedback from the AIA to the user, and then transformed or adjusted in format as necessary to accommodate the selected communication channel. Multiple formatted versions of the message may be created for multiple communication channels, such as when a user wants to broadcast a message to multiple receivers on multiple communication channels.

In embodiments, the AIA may apply a style 'filter' based on a desired impact and audience. For example, a humor filter may be applied when composing a text on a smart phone to make a friend laugh, or a formality filter may be applied to improve the effectiveness of an email applying for a job. The AIA may also adjust the style or tone of a message, such as adjusting the tone of an emotionally charged message, so it is less likely to offend the receiver. For example, the AIA may help the user rewrite a message using a non-violent communication framework to alleviate conflict. The AIA may also suggest a fact or a clarifying point to a message based on world knowledge (e.g., current news, historical context, and the like), shared context of the sender-receiver pair (e.g., conversation history), and the like. The AIA may render the message differently and/or deliver it through different filters, styles, clarifying points, and communication channels, to different receivers (e.g., sending a dinner invitation to N people in a personalized form, or rendering several versions of a news article for a number of different audiences), depending upon the goals associated with the different receivers.

In embodiments, the AIA may provide multiple modes and levels of feedback, such as through making predictions relative to receiver reaction, message impact, and success, given the content (e.g., message draft), targets (e.g., goals/desired impact, audience/receiver, style/format restrictions, and the like), and context (user's communication profiles, relationship, current states/emotions, prior communication history, the environment, world knowledge, and the like) of the message. In embodiments, the AIA may provide for a default set of messaging goals with regard to providing feedback, such as that a message should be accurate (e.g., error-free), not ambiguous (e.g., clear), not harmful or offensive, doesn't cause or escalate conflict, minimizes the risk of misunderstanding, and the like. Explicit goals, such as to inform, persuade, entertain, and the like, may be selected by the user.

In embodiments, the AIA may be able to identify parts of a message that can be improved, generate alternatives, rank them, and suggest those that maximize achieving the desired outcome. For instance, the message may be determined to be too informal, and the AIA may identify plausible corrections with varying levels of formality, rank them all based on how formal they are, and present the rankings to the user for selection. In embodiments, the AIA may provide personal communication analytics and coaching, such as including quantification and tracking of information consumption, communication patterns, and health-productivity-relationship effects, and provide advice a as a global means of providing feedback to the user.

In embodiments, the AIA may be implemented through a number of natural language processing and machine learning methods, such as support vector machines (SVM), random forest, boosting machines, ensemble methods, matrix factorization, deep learning (e.g., seq2seq models, bi-LSTMS, CNNs, RNNs, and the like), generative adversarial networks, pointer networks, unsupervised learning approaches, reinforcement learning, and the like. The AIA may use collected, acquired, or artificially created training data for training the corresponding learning algorithms. In certain embodiments, the AIA may collect, generate or annotate training data for training the corresponding learning algorithms. These methods will cover aspects of the AIA such as a general model of language effectiveness, genre-domain model, group model (e.g., groups of individuals), individual model (e.g., a single targeted individual), pipelined-ensemble model structure, predictive impact modeling, language correctness model (e.g., to check and correct rewrites), meaning consistency model (e.g., to ensure rewrites do not alter meaning), individual-authentic style models (e.g., to personalize generated language), world knowledge model, and the like. The AIA may utilize multi-layer neural networks (e.g., for transferring a writing style from informal to formal using neural techniques). In embodiments, models may be updated or retrained automatically or manually, where training data may utilize a corpus of original messages tagged with contextual information as meta-data (e.g., domain and message type, message goals, user identifier, target audience or receiver identifier, modality, communication channel, triggered outcomes, and the like, such as actions and emotions), a corpus of conversations and related reactions of participants, a parallel corpus of original and revised/enhanced messages, communication history of users, feedback from users, such as the applied and rejected suggestions, survey results, and the like.

In embodiments, the AIA may provide for automatic writing correction, which may be utilized by the AIA in providing improved communications between individuals such as described herein. For instance, in embodiments the AIA may optionally utilize a cloud-sourced plurality of human editors in a managed human augmented automatic system, where the AIA may automatically send at least a portion of a message to the cloud-sourced plurality of human editors, such as when the MA encounters a writing element that exceeds a perception threshold during automatic processing (e.g., a threshold over which the MA cannot acceptably understand the meaning of a passage). The AIA may manage the cloud-sourced plurality of human editors, or interface with a management system that manages the cloud-sourced plurality of human editors. For example, the AIA may evaluate a user text and encounter three portions of the user text that may benefit from enhancement with respect to the capabilities of the AIA, as described herein. However, the first portion is evaluated and determined to exceed a perception threshold, at which point the AIA distributes the first portion amongst the cloud-sourced plurality of human editors for determination of a writing enhancement. Once the AIA receives a response, the AIA may then incorporate the response, together with automatic modifications due to the second and third portions, into a feedback to the user.

The AIA may provide a service to users where a combination of automatic and human interaction improves the user's communications as described herein. This human augmented AIA service may utilize a cloud-sourced plurality of human editors, a team of dedicated writing specialists familiar with the user's writing style and target audience, and the like, to provide the user with rapid response communication refinement that leverages the automatic capabilities of the AIA and the deep experience of a human writing expert. The human augmented AIA service may provide a range of combined automatic-human augmented writing enhancement, such as ranging from an augmented enhancement that relies entirely on the automated capabilities of the AIA as described herein, to a blended automation and human augmentation, to the use of a human writing expert reacting in real-time without utilizing the automatic capabilities of the AIA. In embodiments, the AIA may manage the use of human writing experts based on user and/or receiver preferences and past behavior. For instance, when a user is composing a written communication they may indicate a preference for an extent of human personalization vs. automation, such as depending on the topic and goal of the communication, based on lead time, based on personal preferences, and the like. In embodiments, the AIA may determine this through the user's communication profile and behavior, or as directed by the user.

In an example use-case of the human augmented AIA service, suppose the user begins composing an email to a customer and is using the AIA to work through refinements, as described herein. But then the user is interrupted and doesn't return to the drafting until the end of the business day. When the user returns to the email drafting the AIA detects that the user is behaving in a manner that indicates that the email drafting is now more urgent (e.g., through a voice tone, use of language, change in editing technique, and the like), and the AIA moderates the process by incorporating a human writing expert into the process. For instance, a human writing expert could act as a monitor to the automated AIA interchange with the user and interject as needed, the human editor could interject themselves more fully into the interchange such as interacting directly with the user but utilizing the automated AIA capabilities as a tool, the AIA and/or human editor could sense a high-level of urgency from the user and have the human writing expert take over the recommendations process in order to expedite the process, and the like.

In another example use-case of the human augmented AIA service, suppose the user wants to utilize all the capabilities of both the automated AIA (as described herein) and the deep experience of a team of human writing experts (e.g., that are assigned to work with the user). In this instance, the user benefits from all the historical, global, and predictive capacity of the AIA, plus the interaction with a human writing expert. Based on user preferences, a custom human augmented AIA service may be developed and maintained, such as to the extent the user wants the automatic AIA system or human editor to dominate in the interaction. For instance, the user may prefer the automatic AIA process as the default, where the AIA system only accesses a human writing expert when a perception threshold is exceeded (e.g., a level of understanding for a particular passage or writing issue, a level of confidence in a refinement choice), or the user may prefer a human editor lead the process. In embodiments, when a human editor is involved in a message refinement process, the human editor may utilize the AIA as a tool, acting as 'a user' as described herein. That is, a user may prefer a human writing expert to interfacing with, but where the human writing expert utilizes the AIA as described herein. In this user-editor-AIA configuration, the human writing expert may act as a user-proxy between the user and the AIA.

The AIA, through access to user communication profiles, goals, context, world knowledge, modality, and the like, may be able to affect modifications to a user's communications, either directly or indirectly, to increase the user's effectiveness in communications with a receiver, and thus provide a valuable facility to the user in communications amongst a diverse population of receivers and audiences.

The programmed methods and/or instructions described herein may be deployed in part or in whole through a machine that executes computer software, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, or communication co-processor) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

Additional details of exemplary and non-limiting embodiments are recounted in Appendix A attached hereto and filed herewith.

All documents referenced herein are hereby incorporated by reference.

What is claimed is:

1. A method of electronic communication assistance, the method comprising:
   obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user;
   extracting a communication context from the electronic communication;
   encoding the electronic communication for processing creating an encoded electronic communication;
   retrieving from a communication profile database a communication profile for the second user utilizing the second electronic identifier, wherein the communication profile comprises a second user communication attribute;
   receiving electronic reaction data from a second electronic identifier of the second user, wherein the electronic reaction data is generated in response to the second user receiving the electronic communication;
   encoding the electronic reaction data for processing creating an encoded electronic reaction data;
   processing the encoded electronic communication and the encoded electronic reaction data to extract a reaction context with a processor to generate a response feedback communication using at least one of the communication content, the extracted communication context, or the second user communication attribute;
   sending the response feedback communication to the first electronic identifier; and
   sharing the reaction context with a subset of other users who received the electronic communication;
   wherein the electronic reaction data corresponds to an emoji selected by the second user after highlighting a fragment of a sentence of the electronic communication.

2. The method of claim 1, wherein the response feedback communication is derived at least in part from representations of previous electronic communications from a plurality of user profiles stored in the communication profile database which are similar to the-communication profile for the second user.

3. The method of claim 1, wherein the response feedback communication is derived at least in part from representations of previous electronic communications from a plurality of user profiles stored in the communication profile database which are similar to a communication profile of the first user.

4. The method of claim 1, wherein the processor utilizes at least one of a machine learning language model or a statistical algorithm for creating the response feedback communication.

5. The method of claim 1, wherein the electronic communication further comprises a communication goal, and the processor generates the response feedback communication at least in part by computing and utilizing a reaction difference attribute derived from determined differences between the communication goal and the electronic reaction data.

6. The method of claim 1, wherein the electronic reaction data comprises at least one of location information for the second user, or an action taken by the second user.

7. The method of claim 1, wherein the reaction context comprises an emotional state of the second user.

8. The method of claim 1, wherein the electronic reaction data is used to generate an updated second communication profile.

9. The method of claim 8, wherein the updated second communication profile is used to predict a most likely reaction outcome in a second electronic communication.

10. The method of claim 1, wherein the electronic reaction data is used to train a machine learning model that is configured to at least one of generate a communication content or modify a communication content.

11. A system comprising:
    a server computer comprising a processor and a computer-readable storage device that stores instructions that, when executed by the processor, cause the processor to perform operations comprising:
    obtaining a copy of an in-transit electronic communication at an artificial intelligence assistant computing facility, wherein the electronic communication was transmitted from a first electronic identifier associated with a first user to a second electronic identifier associated with a second user, the electronic communication comprising a communication content and comprising or associated with the first electronic identifier associated with the first user;
    extracting a communication context from the electronic communication;
    encoding the electronic communication for processing creating an encoded electronic communication;
    retrieving from a communication profile database a communication profile for the second user utilizing the second electronic identifier, wherein the communication profile comprises a second user communication attribute;
    receiving electronic reaction data from a second electronic identifier of the second user, wherein the electronic reaction data is generated in response to the second user receiving the electronic communication;
    encoding the electronic reaction data for processing creating an encoded electronic reaction data;
    processing the encoded electronic communication and the encoded electronic reaction data to extract a reaction context with a processor to generate a response feedback communication using at least one of the communication content, the extracted communication context, or the second user communication attribute;
    sending the response feedback communication to the first electronic identifier; and
    sharing the reaction context with a subset of other users who received the electronic communication;
    wherein the electronic reaction data corresponds to an emoji selected by the second user after highlighting a fragment of a sentence of the electronic communication.

12. The system of claim 11, wherein the response feedback communication is derived at least in part from representations of previous electronic communications from a plurality of user profiles stored in the communication profile database which are similar to the-communication profile for the second user.

13. The system of claim 11, wherein the response feedback communication is derived at least in part from representations of previous electronic communications from a plurality of user profiles stored in the communication profile database which are similar to a communication profile of the first user.

14. The system of claim 11, wherein the processor utilizes at least one of a machine learning language model or a statistical algorithm for creating the response feedback communication.

15. The system of claim 11, wherein the electronic communication further comprises a communication goal, and the processor generates the response feedback communication at least in part by computing and utilizing a reaction difference attribute derived from determined differences between the communication goal and the electronic reaction data.

16. The system of claim 11, wherein the electronic reaction data comprises at least one of location information for the second user, or an action taken by the second user.

17. The system of claim 11, wherein the reaction context comprises an emotional state of the second user.

18. The system of claim 11, wherein the electronic reaction data is used to generate an updated second communication profile.

19. The system of claim 18, wherein the updated second communication profile is used to predict a most likely reaction outcome in a second electronic communication.

20. The system of claim 11, wherein the electronic reaction data is used to train a machine learning model that is configured to at least one of generate a communication content or modify a communication content.

* * * * *